US012288478B2

(12) United States Patent
Kumar et al.

(10) Patent No.: US 12,288,478 B2
(45) Date of Patent: Apr. 29, 2025

(54) CLOUD PROJECTION

(71) Applicant: LEARNINGMATE SOLUTIONS PRIVATE LIMITED, Maharashtra (IN)

(72) Inventors: Mailarangam Ramani Ganesh Kumar, Mumbai (IN); Deepak Nadar, Maharashtra (IN); Samudra Sen, Maharashtra (IN); Prasanna Mohit Bhargava, Vancouver (CA)

(73) Assignee: LEARNINGMATE SOLUTIONS PRIVATE LIMITED, Maharashtra (IN)

( * ) Notice: Subject to any disclaimer, the term of this patent is extended or adjusted under 35 U.S.C. 154(b) by 801 days.

(21) Appl. No.: 17/021,764

(22) Filed: Sep. 15, 2020

(65) Prior Publication Data

US 2020/0410885 A1 Dec. 31, 2020

Related U.S. Application Data

(63) Continuation of application No. 16/829,419, filed on Mar. 25, 2020, now Pat. No. 10,810,898, which is a
(Continued)

(30) Foreign Application Priority Data

Aug. 10, 2011 (CA) ................. CA 2748698

(51) Int. Cl.
*G09B 5/00* (2006.01)
*G09B 7/00* (2006.01)
*H04L 65/40* (2022.01)

(52) U.S. Cl.
CPC ............... *G09B 5/00* (2013.01); *G09B 7/00* (2013.01); *H04L 65/40* (2013.01)

(58) Field of Classification Search
CPC .............. G09B 7/00; G09B 5/00; H04L 65/40
See application file for complete search history.

(56) References Cited

U.S. PATENT DOCUMENTS

| 5,002,491 A | 3/1991 | Abrahamson et al. |
| 6,790,045 B1 | 9/2004 | Drimmer |

(Continued)

FOREIGN PATENT DOCUMENTS

| WO | 0109789 | 2/2001 |
| WO | WO2013020233 A1 | 2/2013 |

OTHER PUBLICATIONS

M. M. Rahman et al., "WebELS e-learning system: Online and offline viewing of audio and cursor syncronised slides," 2007 10th international conference on computer and information technology, Dhaka, Bangladesh, 2007, pp. 1-6, doi: 10.1109/ICCITECHN.2007.4579376 (Year: 2007).*

(Continued)

*Primary Examiner* — Christopher B Robinson
*Assistant Examiner* — Angela Widhalm De Rodriguez
(74) *Attorney, Agent, or Firm* — SNELL & WILMER L.L.P.

(57) ABSTRACT

A method of managing an interaction of a student with a class about a subject, the subject having at least one lesson having at least one topic, the topic having at least one of exposition content, demonstration content and test content, the test content having a query and a scheme for mapping a response to a result, comprising: presenting content to the student and storing the interaction of the student with the content presented.

24 Claims, 37 Drawing Sheets

Related U.S. Application Data continuation of application No. 15/803,757, filed on Nov. 4, 2017, now Pat. No. 10,672,285, which is a continuation of application No. 13/571,292, filed on Aug. 9, 2012, now abandoned.

(56) References Cited

U.S. PATENT DOCUMENTS

| | | | |
|---|---|---|---|
| 6,978,115 B2 | 12/2005 | Whitehurst et al. | |
| 7,003,576 B2 | 2/2006 | Bjornestad et al. | |
| 7,293,025 B1 | 11/2007 | Harouche | |
| 7,558,853 B2 | 7/2009 | Alcorn et al. | |
| 8,549,076 B2 * | 10/2013 | Mizrahi | A63F 13/12 709/205 |
| 10,672,285 B2 | 6/2020 | Kumar et al. | |
| 11,062,615 B1 * | 7/2021 | Speciner | G09B 5/06 |
| 2004/0143603 A1 | 7/2004 | Kaufmann | |
| 2004/0143630 A1 | 7/2004 | Kaufmann | |
| 2004/0153473 A1 | 8/2004 | Wright | |
| 2004/0153504 A1 * | 8/2004 | Hutchinson | G06Q 10/10 709/204 |
| 2004/0180317 A1 | 9/2004 | Peterson | |
| 2004/0191744 A1 * | 9/2004 | Guirguis | G09B 7/02 434/322 |
| 2005/0010639 A1 * | 1/2005 | Long | G06Q 10/06 709/204 |
| 2005/0027696 A1 * | 2/2005 | Swaminathan | G06Q 10/06 |
| 2005/0047424 A1 | 3/2005 | Wright | |
| 2005/0202392 A1 | 9/2005 | Vance | |
| 2006/0235948 A1 | 10/2006 | Stenerud | |
| 2007/0005795 A1 * | 1/2007 | Gonzalez | H04N 21/23412 375/E7.006 |
| 2007/0166688 A1 | 7/2007 | Leonard et al. | |
| 2007/0178433 A1 | 8/2007 | Leonard et al. | |
| 2007/0239828 A1 | 10/2007 | Patton et al. | |
| 2008/0004904 A1 * | 1/2008 | Tran | A61B 5/411 340/286.07 |
| 2008/0044802 A1 | 2/2008 | Leonard et al. | |
| 2008/0052156 A1 | 2/2008 | Brenner | |
| 2008/0239994 A1 * | 10/2008 | Xiong | H04M 3/567 370/260 |
| 2009/0031215 A1 | 1/2009 | Collier, II | |
| 2009/0042177 A1 | 2/2009 | Davis et al. | |
| 2009/0150480 A1 * | 6/2009 | Xia | H04L 67/02 709/203 |
| 2009/0222318 A1 * | 9/2009 | Anelevitz | G06Q 30/016 705/1.1 |
| 2009/0249244 A1 * | 10/2009 | Robinson | G06F 3/04817 715/781 |
| 2009/0325142 A1 * | 12/2009 | Beavers | G09B 5/02 434/365 |
| 2010/0179428 A1 | 7/2010 | Pedersen et al. | |
| 2010/0318323 A1 | 12/2010 | Wommack | |
| 2011/0010470 A1 * | 1/2011 | Hulbert | G06F 13/4282 710/63 |
| 2011/0039242 A1 | 2/2011 | Haug | |
| 2011/0039244 A1 | 2/2011 | Packard | |
| 2011/0039245 A1 | 2/2011 | Haug | |
| 2011/0039246 A1 | 2/2011 | Packard | |
| 2011/0055329 A1 * | 3/2011 | Abt, Jr. | G06F 16/958 709/205 |
| 2011/0126127 A1 * | 5/2011 | Mariotti | H04M 7/0027 715/753 |
| 2011/0279638 A1 * | 11/2011 | Periyannan | H04N 7/141 348/14.09 |
| 2012/0284644 A1 * | 11/2012 | Sitrick | G06Q 10/103 715/753 |
| 2014/0337223 A1 | 11/2014 | Kapoor | |
| 2014/0362165 A1 * | 12/2014 | Ackerman | G06Q 10/10 348/14.07 |

OTHER PUBLICATIONS

USPTO, Non-Final Office Action dated Dec. 8, 2022 in U.S. Appl. No. 17/570,672.
USPTO, Non-Final Office Action dated Feb. 23, 2021 in U.S. Appl. No. 16/860,497.
USPTO, Final Office Action dated Mar. 11, 2021 in U.S. Appl. No. 16/860,497.
USPTO, Advisory Action dated Apr. 22, 2021 in U.S. Appl. No. 16/860,497.
USPTO, Non-Final Office Action dated Aug. 4, 2021 in U.S. Appl. No. 16/860,497.
USPTO, Notice of Allowance dated Dec. 2, 2021 in U.S. Appl. No. 16/860,497.
USPTO; Final Office Action dated Nov. 13, 2020 in U.S. Appl. No. 16/860,497.
USPTO; Advisory Action dated Dec. 7, 2020 in U.S. Appl. No. 16/860,497.
USPTO; Notice of Allowance dated Dec. 9, 2020 in U.S. Appl. No. 16/860,858.
USPTO, Notice of Allowance dated Feb. 21, 2023 in U.S. Appl. No. 17/570,672.
USPTO, Non-Final Office Action dated Mar. 9, 2023 in U.S. Appl. No. 17/122,245.
USPTO, Non-Final Office Action dated Mar. 9, 2023 in U.S. Appl. No. 17/149,885.
USPTO, Notice of Allowance dated Jun. 28, 2023 in U.S. Appl. No. 17/122,245.
USPTO, Final Office Action dated Jun. 27, 2023 in U.S. Appl. No. 17/149,885.
USPTO, Advisory Action dated Aug. 28, 2023 in U.S. Appl. No. 17/149,885.
USPTO, Non-Final Office Action dated Jan. 17, 2024 in U.S. Appl. No. 17/149,885.
USPTO; Notice of Allowance dated May 28, 2024 in U.S. Appl. No. 17/149,885.
USPTO; Non-Final Office Action dated Jun. 6, 2024 in U.S. Appl. No. 18/496,737.
USPTO, Final Office Action dated Apr. 16, 2024 in U.S. Appl. No. 17/149,885.
USPTO; Corrected Notice of Allowance dated Jul. 19, 2024 in U.S. Appl. No. 18/496,737.

* cited by examiner

*Figure 34*

CLOUD PROJECTION

CROSS-REFERENCE TO RELATED APPLICATIONS

This application is a continuation of, claims priority to and the benefit of, U.S. Ser. No. 16/829,419 filed Mar. 25, 2020 and entitled "MANAGING EDUCATION WORKFLOWS." The '419 application is a continuation of, claims priority to and the benefit of, U.S. Pat. No. 10,672,285 issued Jun. 2, 2020 (aka U.S. Ser. No. 15/803,757 filed Nov. 4, 2017) and entitled "SYSTEM, METHOD AND APPARATUS FOR MANAGING EDUCATION AND TRAINING WORKFLOWS." The '757 application claims priority from Canadian patent application CA2,748,698 filed on Aug. 10, 2011, entitled "System, Method and Apparatus for Managing Education and Training Workflows". In jurisdictions that permit incorporation by reference, Canadian patent application CA2,748,698 is expressly incorporated herein by reference, to the fullest extent permitted. The '757 application is also a continuation of, claims priority to and the benefit of, U.S. Ser. No. 13/571,292 filed on Aug. 9, 2012. All of which are incorporated herein by reference in their entirety for all purposes.

BACKGROUND

1. Field

The present invention relates to systems, methods and apparatuses for managing education and training workflows.

2. Description of Related Art

In education, including training, as in other fields of human endeavour, digital computing and communication technology is increasingly intermediating interactions, both between participants and with resources. This intermediation presents both benefits and challenges.

Beneficially, participants can be less constrained by space and time, having the opportunity to interact otherwise than face-to-face. Digitization provides participants with the opportunity to interact with a vastly wider variety of learning resources—wider in terms of subject matter, authorship and media-richness for example.

However, there are challenges as well. The typically open nature of these technologies can encourage unfocussed and chaotic interactions; whereas, education benefits from a carefully controlled environment, where students concentrate on lessons under the direction and guidance of teachers.

A further challenge is that digital interactions can be ephemeral, or at least difficult to record in a way that preserves their richness yet enables efficient and effective subsequent retrieval. However, in education, subsequent retrieval can be critical to allow students to review, teachers to grade, guardians to supervise and auditors to audit, so that students can learn under the guidance of teachers and guardians and so that that learning can be documented and if needed audited.

Accordingly, what is needed is a better way to obtain these benefits while overcoming these challenges.

SUMMARY

The present invention is directed to this need.

According to one aspect of the present invention, there is provided a method of managing an interaction of a student with a class about a subject, the subject having at least one lesson having at least one topic, the topic having at least one of exposition content, demonstration content and test content, the test content having a query and a scheme for mapping a response to a result, comprising: presenting content to the student and storing the interaction of the student with the content presented.

In this regard, presenting content might further include: at least one of projecting and broadcasting the exposition content, at least one of projecting, broadcasting and distributing the demonstration content, or at least one of projecting, broadcasting and for a predetermined time distributing the test content.

Storing the interaction might include storing a metric, for example storing at least one of a usage and a result, which result might include at least one of a response and a mark. Storing a mark could include applying a scheme to map a response to a mark.

Storing the interaction might include storing a history, for example storing at least one of a transcript and a personalization. In this regard, storing a transcript could include storing at least one of a transcript of real interactions and a transcript of virtual interactions. Storing a personalization might include storing at least one of an annotation and a collaboration.

The method might further include any or all of reviewing the interaction, supervising the interaction, and auditing the interaction, such auditing including auditing the performance of the interaction and auditing the propriety of the interaction.

According to another aspect of the invention, there is provided a manufacture, for example a storage medium, a signal, a processing apparatus or a processing system, the manufacture being encoded with processor-readable instructions for directing a processor to perform a method of managing an interaction of a student with a class about a subject, the subject having at least one lesson having at least one topic, the topic having at least one of exposition content, demonstration content and test content, the test content having a query and a scheme for mapping a response to a result, comprising: presenting content to the student and storing the interaction of the student with the content presented.

In this regard, presenting content might further include: at least one of projecting and broadcasting the exposition content, at least one of projecting, broadcasting and distributing the demonstration content, or at least one of projecting, broadcasting and for a predetermined time distributing the test content.

Storing the interaction might include storing a metric, for example storing at least one of a usage and a result, which result might include at least one of a response and a mark. Storing a mark could include applying a scheme to map a response to a mark.

Storing the interaction might include storing a history, for example storing at least one of a transcript and a personalization. In this regard, storing a transcript could include storing at least one of a transcript of real interactions and a transcript of virtual interactions. Storing a personalization might include storing at least one of an annotation and a collaboration.

The method might further include any or all of reviewing the interaction, supervising the interaction, and auditing the interaction, such auditing including auditing the performance of the interaction and auditing the propriety of the interaction.

According to yet another aspect of the invention, there is provided a method of managing an interaction of a student with a class about a subject, the subject having at least one lesson having at least one topic, the topic having at least one of exposition content, demonstration content and test content, the test content having a query and a scheme for mapping a response to a result, comprising presenting content to the student by: projecting and broadcasting the exposition content; projecting, broadcasting and distributing the demonstration content; and projecting, broadcasting and for a predetermined time distributing the test content.

Further aspects and advantages of the present invention will become apparent upon considering the following drawings, description, and claims.

DESCRIPTION

The invention will be more fully illustrated by the following detailed description of non-limiting specific embodiments in conjunction with the accompanying drawing figures.

The drawing figures are, in general, presented in the Unified Modeling Language (UML). Those skilled in the art will recognize that the UML is a very expressive language and that its expressions can easily become so dense as to become difficult to comprehend. For this reason, many of the following figures highlight certain aspects of the invention while deemphasizing or omitting others, so that a reader will be able to better comprehend the highlighted aspects, while being able to appreciate the deemphasized or omitted aspects with reference to other of the figures and ordinary skill in the art.

BRIEF DESCRIPTION OF THE DRAWINGS

FIG. 34 is a UML 2 user interface diagram of an exemplary user interface of a Propriety Audit operation for enabling an Auditor at an Auditor Client to audit the propriety of Interactions between a Student and other Participants in a Class.

DETAILED DESCRIPTION OF SPECIFIC EMBODIMENTS

Figure 1:
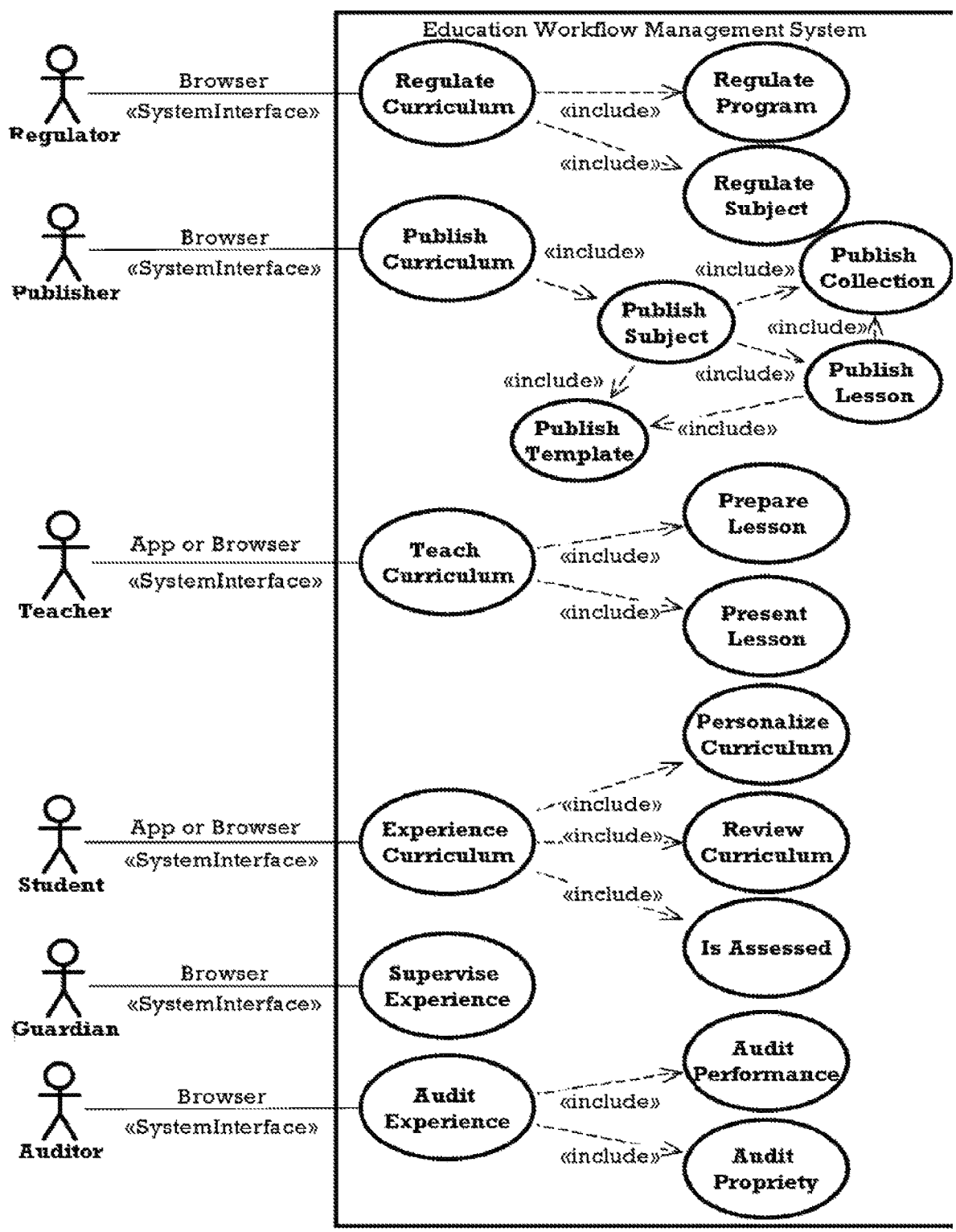
FIG. 1 is an exemplary UML 2 use case diagram depicting how an embodiment of an Education and Training Workflow Management System according to the present invention could be used by a Regulator, a Publisher, a Teacher, a Student, a Guardian and an Auditor.

Aspects of the present invention will now be illustrated by explanation of specific, non-limiting, exemplary embodiments shown in the drawing figures and described in greater detail herein.

1. Use Cases

FIG. 1 shows how a variety of exemplary users might interact with an Education and Training Workflow Management System that embodies aspects of the present invention.

A Regulator might use the System to regulate a curriculum, including regulating requirements for programs (for example "grade 4", "high school" or "Bachelor of Science degree") and the subjects that are taught in the program (for example "social studies", "grade 10 math" or "quantum mechanics"). In this regard, a Regulator might be a government Department, Ministry or Board of Education or a government or private certification or funding body, with authority to set requirements for curricula, programs, or subjects, or requirements for certifying recognition of such, or requirements for funding such, as in the case of a federal Department of Education that provides funds to schools under the jurisdiction of state Departments of Education when such schools teach curricula, programs or subjects to Federal requirements.

A Publisher might use the System to publish publications, including publications that support a curriculum or provide extra-curricular content, for example collections of content or testing materials for a whole subject or just a lesson, teaching outline templates for a whole subject or just a lesson, or comprehensive combinations of outlines, content and testing materials for a whole subject or just a lesson. In this regard, a Publisher might be any source or owner of content that might usefully advance the broader education or training of Students.

A Teacher might use the System to teach a curriculum (or to teach extra-curricular matters), including preparing a lesson and presenting the lesson to a class. One advantage of the System is that it helps Teachers to prepare lessons in compliance with curriculum requirements. Another advantage of the System is that it helps teachers to easily incorporate relevant Teacher-created and third-party content into the lessons they prepare, including both free and licensed content, including licensed content protected by digital rights management techniques and technologies. Yet another advantage of the System is that it helps a Teacher to discover what aspect of a Lesson have been learned, to document that accomplishment, and to focus on what aspects of a Lesson remain to be learned.

A Student might use the System to experience a curriculum or extra-curricular concepts, including personalizing aspects of the curriculum (lessons) that are presented during a meeting of a class of Students and Teachers and reviewing such aspects after a class meeting. Such personalization might include experiencing a lesson virtually subsequently to a physical meeting of the class, which the Student may have missed attending, including experiencing a lesson virtually and asynchronously with other students. A Student might also use the System to be tested on his learning of the lessons and to document that testing, both to prove his accomplishments and to help him focus on aspects of the curriculum that remain to be learned.

Another manner in which the System may be used is in training a set of users in skills, behavior or other capabilities. In this case, there may or may not be an alignment of content to any standard curriculum. Further, the goal in this situation would be to help the Student learn, practice and be tested in a skill, thought process or behavioural manner. The judgment of quality of outcome, in this case, does not come from standards set by a state or a district, but may be independently defined by the content creators or content teachers or some other regulatory body In general, a group of Students can collectively interact with the System as a unified entity—as a Student Group. In this way, the information made available to, the actions made possible by, the experiences made available to and the judgment applied to a Student Group is tracked both for the group as a unified entity and associated with each member Student as an individual. A Teacher might moderate a Student Group either by association with the Student Group or as a member of the Student Group, depending on implementation preferences.

A Guardian of a Student (for example a parent) might use the System to supervise the Student's experience with the lessons in a curriculum, to make sure that the Student is making appropriate progress in his studies and that the learning environment for the student is appropriate.

Finally, an Auditor might use the System to audit experience with the curriculum or content, either for an individual Student (to audit that Student's experience) or for a set of Students (to audit the collective experience of the Students in a class, in a school or in a jurisdiction for example) or to audit the experience (for example teaching outcome) of a Teacher. The Auditor might for example audit for performance or propriety as evidenced by a record of experiences.

While the System has clear application for public and private education, including at the preschool, kindergarten, elementary school, middle school, junior-high and high school (generically secondary), college and university (generically post-secondary) levels for example, it also has wider application, for example in compliance training, continuing education and professional education. For example, the System can be used for vocational training or corporate training or executive training without being limited by the need to adhere to any standard curriculum, for example classic academic curriculum.

Each of these uses will be described in greater detail below.

2. System Network Overview

Figure 2:
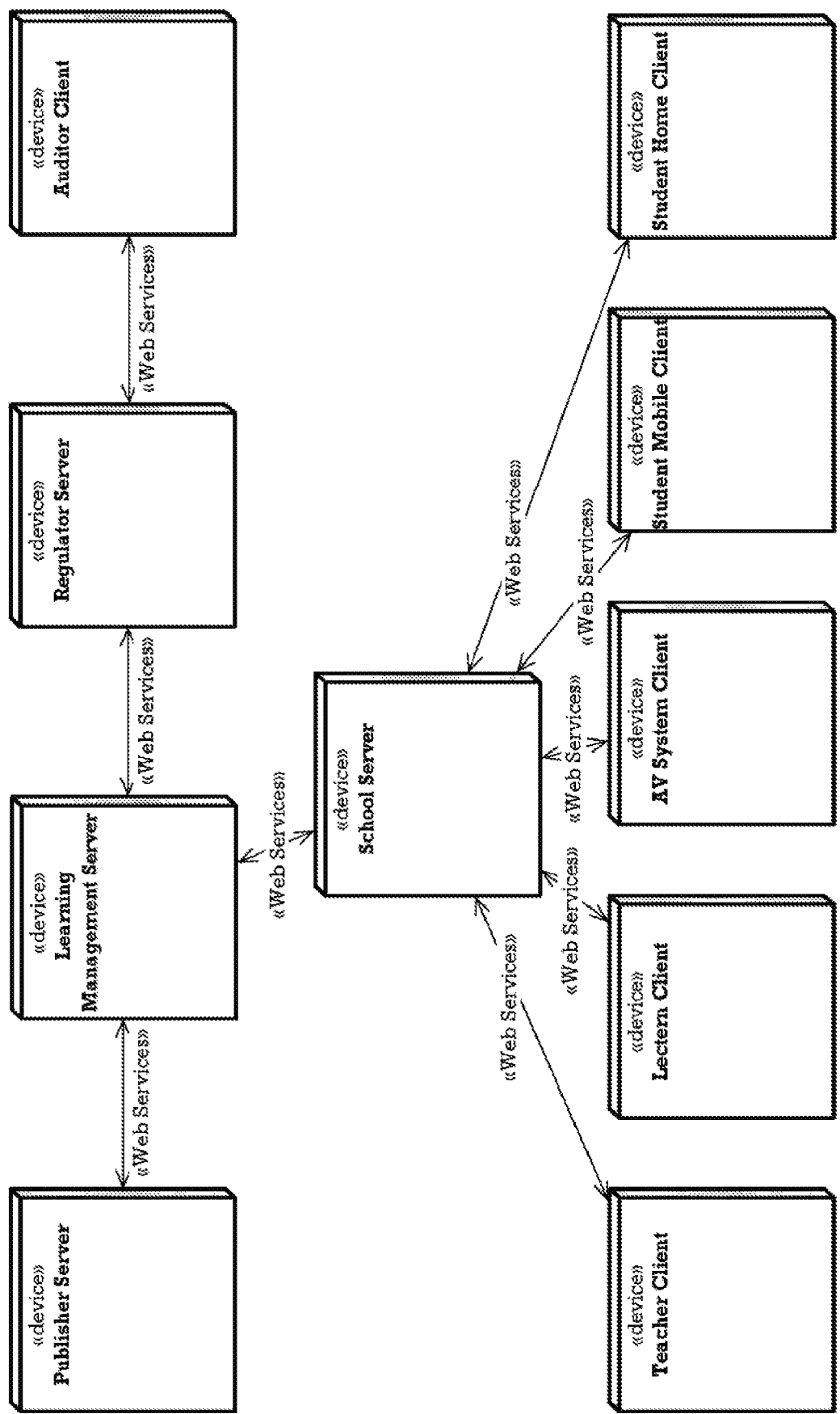
FIG. 2 is an exemplary UML 2 deployment diagram depicting an internetwork of communication and computing devices configured as the embodiment of the Education and Training Workflow Management System of FIG. 1, the communication and computing devices including a Learning Management Server, a Regulator Server, a School Server and a Publisher Server, and further including a Teacher Client, a Lectern Client, a Student Mobile Client, a Student Home Client, an AV System Client and an Auditor Client.

FIG. 2 shows an internetwork of communication and computing devices connected together to provide the System.

The hub of the System is a Learning Management Server that routes data between the other nodes on the internetwork and provides application services, for example using a Web Services framework.

The Regulator and Publisher might for example connect to the System through a Regulator Server and a Publisher Server respectively. In some embodiments, the System might further include a School Server located in a particular school to serve teachers, students, guardians and audiovisual (AV) systems associated with a particular school.

The particular existence and configuration of servers will depend on the specific needs of a System being deployed. For example, legal requirements (for example privacy laws) regarding data (for example Student or Teacher data) or business practices (for example protection and control of Publisher content using digital rights management technologies and techniques) may dictate that specific data or services reside on distinct servers. Furthermore, internetwork transport requirements may dictate whether Teachers and Students data and application needs can be met by a remote server (for example a Learning Management Server) or whether a local server (for example School Server) is needed. These constraints aside, it will often be preferable to provision most services and data on a well-scalable, and even virtualized and distributed, Learning Management Server so that others, for example Schools, need not acquire, maintain, update and scale their own infrastructure or at least infrastructure with the capacity to handle the loads and requirements of the System.

Those skilled in the art will recognize that the network topology depicted in FIG. 2 has been simplified for clarity. For example, the network could be scaled to include multiple Regulator Servers, Publisher Servers and School Servers so that multiple Regulators, Publishers and Schools could be served by the Learning Management Server. Furthermore, a particular Server might be spread across multiple physical locations (or jurisdictions), which might increase, decrease or change over time, including on-the-fly, depending on resource demands. In the same regard, those skilled in the art will recognize that not only servers, but also services provided by the System can be similarly deployed across distributed networks and scaled as need dictates.

The Teacher might connect to the System through either a Teacher Client, for example a personal computer used at home, at school, in-transit or elsewhere for class administration and lesson planning, or a Lectern Client, for example a mobile device such as a tablet or a smart phone used for preparing and presenting a lesson in class. In some embodiments, the Lectern Client might be a device mounted at a physical lectern in a classroom, but it need not be in general, and is instead likely to be a Teacher's own mobile device for example, provisioned with the appropriate System components as will be described further below. The distinction between a Lectern Client and a Teacher Client is made only because there may be circumstances where the tasks of presenting a lesson on one hand and preparing a lesson or administering a class on the other hand argue for different device characteristics. For example, a Lectern Client might beneficially be portable (with small input and output devices) and have a limited but optimized feature set (such as presenting content smoothly in real-time). In contrast, a Teacher Client might have a more conventional full-size keyboard and screen and connect to Servers using a less optimized general purpose browser for performing a wider assortment of less performance dependent tasks.

The Student might connect to the System through either a Student Mobile Client, for example a mobile device such as a tablet or a smart phone used for experiencing a lesson in class, or a Student Home Client for reviewing a lesson after class. The distinction between Student Mobile Client and Student Home Client is analogous to the distinction between Lectern Client and Teacher Client. It also bears mentioning that the System capabilities offered by the Teacher Client and Lectern Client may be different, albeit related and designed to function as a complementary whole. Likewise, the Student Home Client and the Student Mobile Client may offer different functionality to the Student.

Those skilled in the art will recognize that either the Teacher or a Student may thus use the System to participate in a class without being in a classroom, and may even participate while in transit between physical locations by connecting to the System wirelessly.

It is important to note that the concept of a class session (a meeting of a Class) is bounded not by the geographical co-location of its participants, but by the temporal co-location of its participants. Put simply, the participants don't have to be in the same place, but can gather together from different locations at the same time. Having said that, it is important to recognize that the System also enables participants to experience a class session after the original class session has completed, almost entirely as experienced by the temporally co-located participants (i.e. those who were present, even if virtually, in the class session originally, when the class session was occurring).

An AV System Client can also form part of the System. The AV System Client may be simply a television or projector directly or wirelessly connected to Client devices (for example the Lectern Client or a Student Mobile Client) to provide an enlarged display of the connected Client's screen. Alternatively, the AV System Client can be a complex system of playback and recording devices connected to a media server, to play AN content at one or more locations within a classroom and beyond and to record AN content of class participation within a classroom and beyond.

Those skilled in the art will understand that in an internetworked system an action is often the result of coordinated activities occurring at multiple nodes in the system. In the case of a system built on the Internet, these nodes are often distributed ad hoc and unpredictably across multiple jurisdictions. The actions as described and claimed herein are intended to encompass at least: (a) actions performed directly and completely within the jurisdiction of the patent, (b) actions coordinated within the jurisdiction but with at least some activities performed outside the jurisdiction, (c) actions coordinated outside the jurisdiction but with at least some activities performed within the jurisdiction, and (d) actions performed for the benefit of a node within the jurisdiction or a person using that node. An example of such coordination would be serving a layout for a web page from one node and serving content for insertion into the layout from one or more other nodes, including through the use of server-side scripting, client-side scripting, and AJAX techniques. Another example of such coordination would be to serve some of the Lesson content from within the System's jurisdiction, but some other parts of the Lesson content (such as media) from a completely different, even securely protected jurisdiction (such as an external publisher network) or an open resource center like an internet site.

In general, each of the Clients might be a duly configured general purpose programmable computer or a more purpose-specific device, such as a tablet, a smartphone, a microbrowser, or portable media viewer with a wireless modem. Each Server might similarly be a duly configured general purpose programmable computer, but might also be a farm of such computers or one or more virtualized computers embodied as processes operating on a physical general purpose programmable computer. Such farmed or virtualized computers might themselves be distributed over their own local or wide area network, not shown.

In essence, the Servers and the Clients are roles or functions performed in the System by properly configured devices. Multiple roles or functions could be performed by one device and one role or function could be distributed over multiple devices. The specific character of a device (and more generally the hardware) and the network topology is important to the extent that it supports the performance of the assigned roles or functions. What is also important is that the Clients in the System communicate with the Servers in the System's jurisdiction, which in turn may marshal and provide resources from within itself and from outside of itself, provided these Servers have the proper permission and authenticity to do so.

Figure 3:
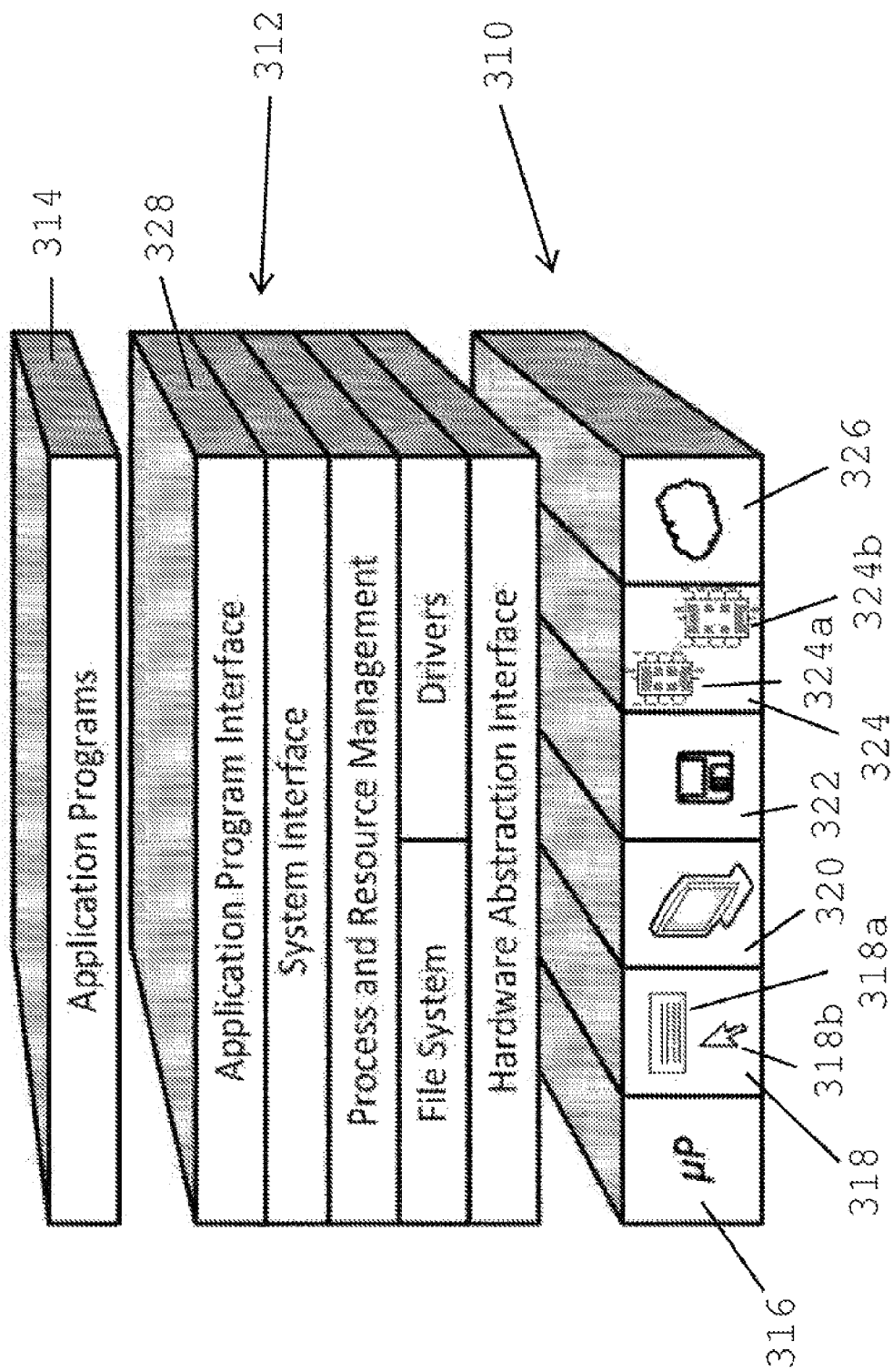
FIG. 3 is an exemplary abstraction layer diagram of a communication and computing device of FIG. 2, illustrating a hardware layer, operating system layers and an application program layer.

FIG. 3 shows an exemplary architecture for the communication and computing devices of FIG. 2. These devices have a bottom hardware layer generally illustrated at 310, a middle operating system layer generally illustrated at 312 and a top application program layer 314. Those skilled in the art will recognize the aspects in which like virtualized hardware and devices depart from like physical ones.

The hardware layer 310 provides the device with computing and communication hardware, including: (a) a processor 316 to execute processes of instructions and compute data, (b) user-input hardware 318 such as a keyboard 318a (real or virtual) and a selection device 318b (for example a mouse or touchscreen, voice-recognition or video-recognition) to receive input from a user, (c) user-output hardware 320 such as a video display to provide information to a user, (d) mass storage 322 such as electromagnetic, optical or nonvolatile solid-state media to store data and processing instructions, (e) memory 324 such as read only memory 324a (ROM) and random access memory 324b (RAM) to store data and processing instructions, and (f) a network interface 326 to support communication with other devices in accordance with known protocols such as TCP/IP, all interconnected by buses such as address and data buses and control lines such as interrupt and clock lines and such other connections and components as is conventionally required and known in the art.

Stored in a portion of the read only memory 324a and the mass storage 322 are the components of the operating system layer 312, for example LINUX® or Microsoft® Windows® Server® or Mac® OS X Server® for a device such as general purpose programmable computer configured as a Server or for example LINUX® or Microsoft® Windows® or Mac® OS X® for a general purpose programmable computer configured as a Client or for example Microsoft® Windows Phone®, Apple® iOS®, Google® Android®, BlackBerry® QNX® or Symbian®, for a portable such Client device. The operating system layer 312 provides the basic instructions to direct the processor 316 how to interact with the other hardware described above and more generally how to perform the functions of a communication and computing device, including storing, accessing and computing data, and communicating with other devices. In particular, the operating system layer 312 has been configured or extended to provide a web services framework, such as for distributed computing, such as the Windows Communication Foundation application programming interface in the .NET Framework.

The operating system layer 312 presents an application program interface 328 to the application program layer 314, so the processor 316 can execute more sophisticated combinations of processes under the direction of higher level application programs stored in mass storage 322 and loaded into random access memory 324b for execution, for example the processes that will be elaborated below.

The structure of software aspects of the System will now be described using an object-oriented paradigm. Those skilled in the art will recognize that there are many programming paradigms and analogous Systems can be programmed in accordance with such paradigms without departing from the spirit of the present invention. For example, other programming paradigms include: Agent-oriented, Automata-based, Component-based (including Flow-based and Pipelined), Concatenative, Concurrent computing (including Relativistic programming), Data-driven, Declarative (including Constraint, Functional, Dataflow (including Cell-oriented and Reactive) and Logic (including Abductive logic, Answer set, Constraint logic, Functional logic, Inductive logic, and Uncertain inference (including Markov logic and Probabilistic logic))), Event-driven (including Service-oriented and Time-driven), Expression-oriented, Feature-oriented, Function-level, Generic, Imperative (including Procedural), Language-oriented (including Discipline-specific, Domain-specific, Grammar-oriented (including Dialecting) and Intentional), Metaprogramming (including Automatic, Reflective (including Attribute-oriented) and Template (including Policy-based)), Non-structured (including Array and Iterative), Nondeterministic, Parallel computing (including Process-oriented), Programming in the large/small, Semantic, non-object oriented Structured programming paradigms (including Modular and Recursive) and Value-level.

3. Education and Training Domain

Figure 4:
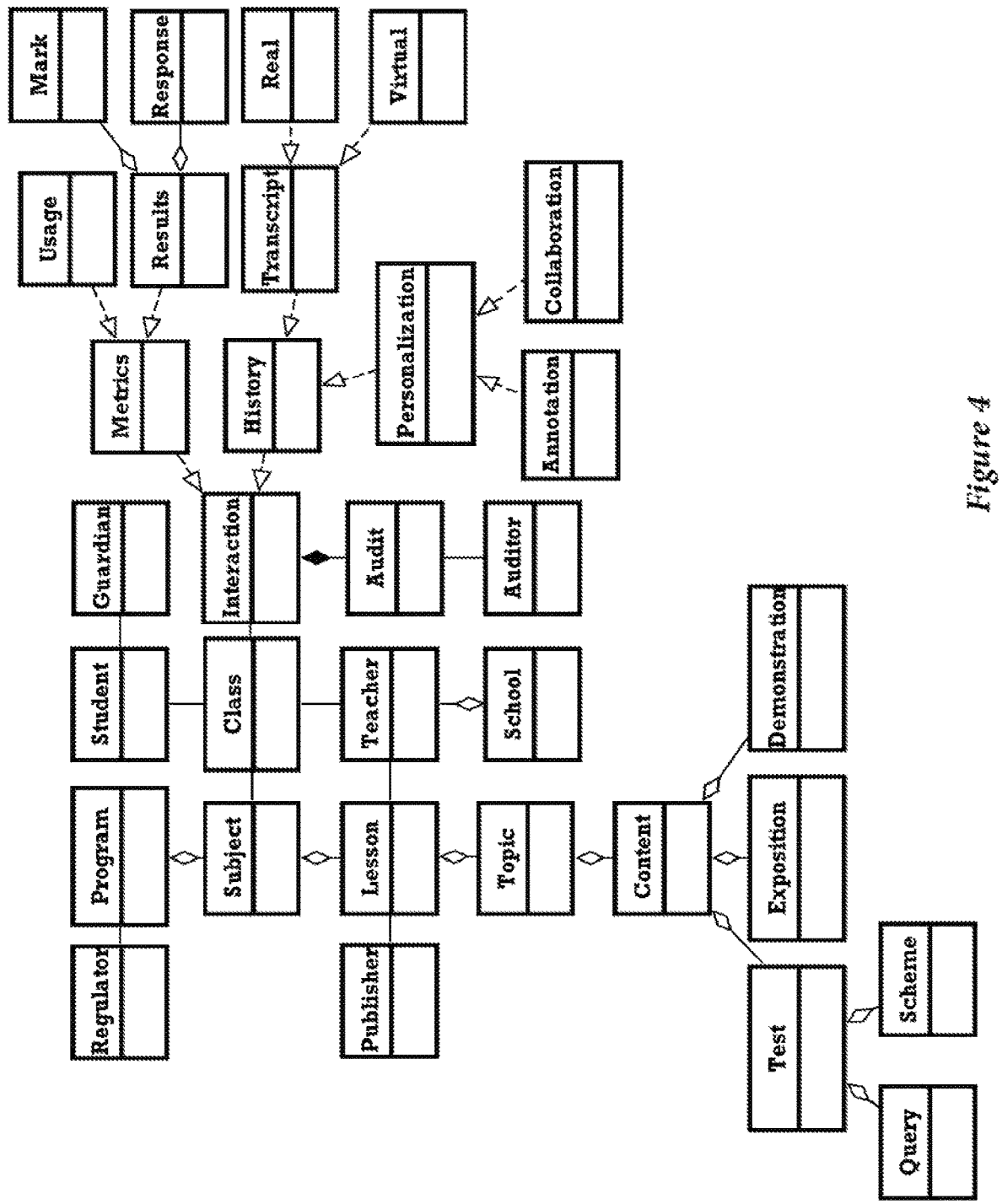
FIG. 4 is a UML 2 class diagram depicting exemplary domain classes representing the education and training workflows embodied in the Education and Training Workflow Management System of FIG. 1 and exemplary associations between the domain classes.
Figure 5:
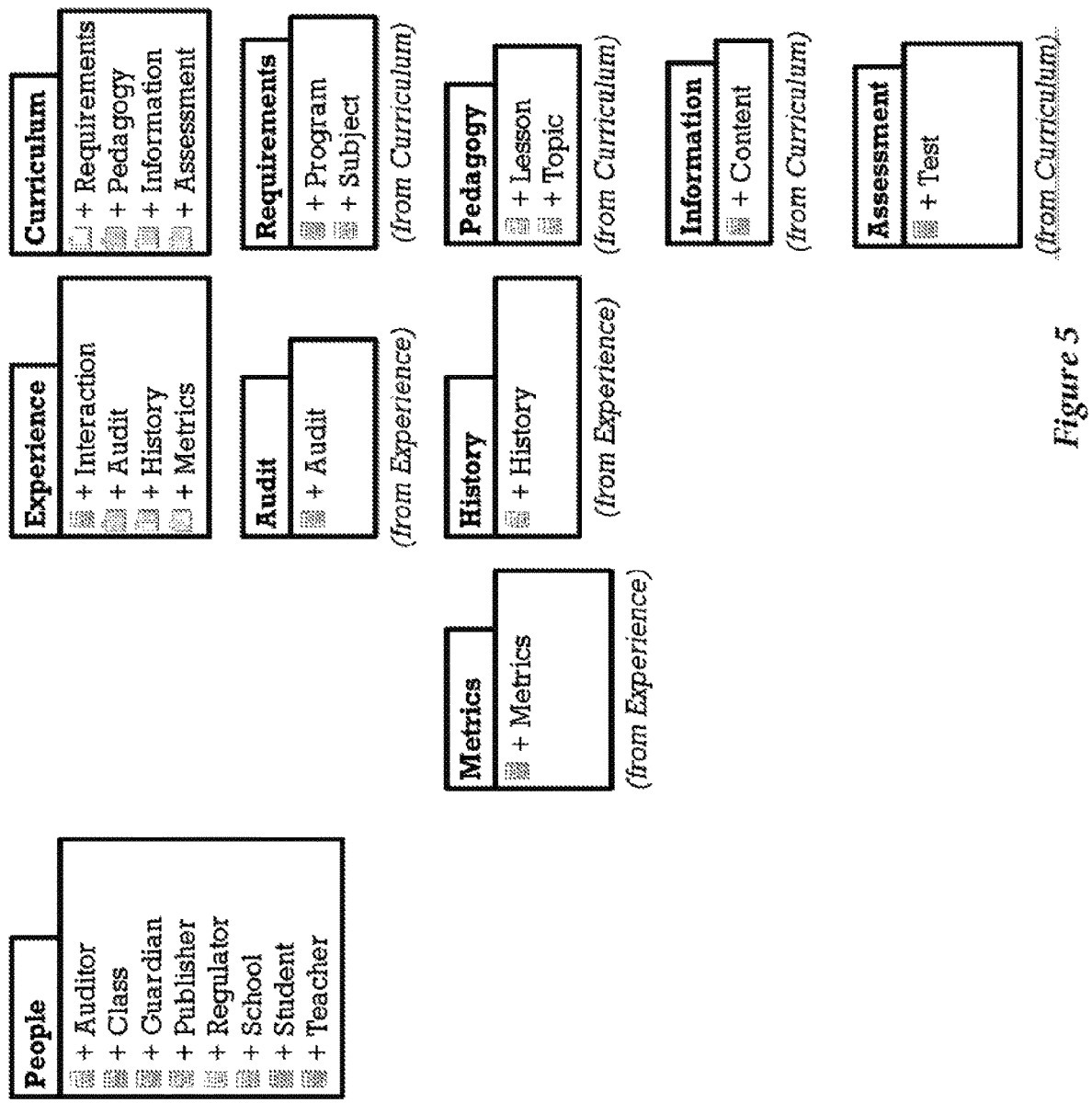
FIG. 5 is a UML 2 package diagram depicting exemplary domain packages packaging the domain classes of FIG. 4.

FIGS. 4 and 5 provide an overview of exemplary classes and packages for representing the domain of the System.

A People package includes classes representing the people and roles discussed above, namely a Regulator class, a Publisher class, a Teacher class, Student class, a Guardian class and an Auditor class. A School class is an aggregation of the Teacher class. A Class class represents an association of at least one Student and at least one Teacher interacting about a subject, as will be described further below.

In general, a group of Students can collectively interact with the System as a unified entity—as a Student Group—on an ad hoc, project or more permanent basis. In this way, the information made available to, the actions made possible by, the experiences made available to and the judgment applied to a Student Group could be tracked both for the group as a unified entity and for each member Student as an individual. This arrangement might be implemented using attributes in the Student class. Those skilled in the art will recognize that there are other ways to implement a Student Group, for example by creating a new class—a Student Group class (not shown)—for example intermediate the Student class and the Class class.

A Curriculum package includes packages and classes representing the curriculum in an education workflow, or the set of goals and content required to meet the requirements of a program in a training workflow, or the set of goals and content required to meet the requirements of an extracurricular endeavour in an education workflow, including a Requirements package, a Pedagogy package, an Information Package and an Assessment package. In order to avoid confusion and awkward repetition, in this document, Curriculum refers to the sum total of the learning outcomes required to be achieved as part of a program—whether it be an educational or training program. The content that is required to enable such outcomes aggregate to become the realization of that Curriculum.

The Requirements package includes a Program class, which is an aggregation of Subjects. The Regulator regulates the Curriculum by specifying requirements in the Program and Subject classes.

The Pedagogy package includes a Lesson class, which is an aggregation of a Topic class. The Teacher teaches Lessons to a Class as a sequence of Topics. A Subject is an aggregation of Lessons.

While a Teacher may also choose to prepare Lessons, some may prefer to focus on teaching, teaching Lessons that have been published by a Publisher. The Teacher may prepare Lessons based on her own personally created content, using Publisher published or approved content, or free open content available on the Internet or any combination of the above.

The Information package includes a Content class, which is an aggregation of an Exposition class, a Demonstration class and a Test class that help a Teacher to respectively explain, show and ask about aspects of a Topic. A Content object might be associated with zero or more Exposition objects, zero or more Demonstration objects and zero or more Test objects; however normatively it can be associated with one of each.

Broadly, the Teacher presents Content to the Class to elucidate a Topic. By presenting Content through each of Exposition, Demonstration and Testing, the Teacher teaches multiple aspects of the Topic using multiple teaching modes. For further clarity, an Exposition object would help a Teacher to explain a Topic, and might take the form for example of a set of bullet points explaining the Topic. A Demonstration object would help a Teacher to demonstrate a Topic, and might include for example a media clip, an interactive geographic map, an interactive virtual model of an engine or an interactive simulation of a chemical reaction.

The Test class, being different from the Exposition class and Demonstration class, is included in an Assessment package. The Test class is an aggregation of a Query class and a Scheme class, where a Query represents a test question posed to Students and a Scheme represents a mapping of Student responses to test marks and subject grades, as will be discussed further below.

The Lesson, Topic and Content classes may include playback control operations (for example, Play, Pause, Stop, Rewind, Fast-forward, Cue-To-Mark, Slower, Faster, and the like) for automated or semi-automated presentation in the case of Lesson and Topic objects and for presentation of sequential Content such as media clips.

An Experience package includes packages and classes representing the outcome of People, in particular Students, engaged in learning using the System. The Experience package includes an Interaction class and an Audit package, a History package and a Metrics package.

The Interaction class is the primary representation of the engagement of a Class of Students and Teacher(s) interacting over a Subject. Many Interactions objects will be associated with just one Student object; some Interaction objects that represent collaborative activities will be associated with multiple Student objects.

Each Interaction object has an associated Audit object of an Audit class. The Audit object may include both automatically generated audit trail data and data generated manually by an Auditor. The Audit class is included in the Audit package.

The Interaction class is a generalization of a Metrics class included in the Metrics package and a History class included in a History package. The Metrics class represents quantitative metrics of a Student's Interaction with the Subject. The History class represents more qualitative Interactions with the Subject and other members of the Class, including Teachers.

The Metrics class is a generalization of a Usage class and a Results class, which is in turn a generalization of a Response class and a Mark class. The Usage class represents quantitatively a Student's engagement with the Curriculum, documenting for example which Lesson objects the Student has interacted with, when and for how long. The Results class represents a Student's success with Test Queries, in particular documenting each of his Responses and the associated Mark awarded in accordance with the Test Scheme, either automatically or manually by a Teacher. Where Test Queries are more in the nature of assignments than quizzes, Responses can be relatively more rich, for example Student-generated content such as text files (including heavily formatted documents), media clips and virtual models and simulations.

The History class is a generalization of a Transcript class and a Personalization class. The Transcript class represents a sequential record of real world Interactions of the Class and of a Student's virtual Interactions with Lessons. For this reason, the Transcript class is a generalization of a Real class and a Virtual class. The Personalization class represents Student personal contributions to the Class, and is a generalization of, for example, an Annotation class and a Collaboration class. The Annotation class represents annotations that a Student overlays on Lessons, much likes margin notes, bookmarks and highlighting that students of another time placed in text books, but also including Student-generated content such as text files (including heavily formatted documents), media clips and virtual models and simulations. The Collaboration class represents collaborative activities, for example white boarding or discussion threads, engaged in by multiple Students working on a Lesson, sometimes joined by one or more Teachers.

Considering Personalization objects more broadly, those skilled in the art will recognize that it is very helpful to a Student studying in a virtual System to be able to (a) freely overlay annotations (in the broadest sense) of his own choosing and meaning on any Lesson object or other object directly or indirectly associated with a Lesson or more broadly his learning experience, but also to (b) have designated virtual spaces (modes of communication) for creating his own communications and records of such, whether a communication is with himself (for example notes, whether text, markup text, audio or video or otherwise) or with Teachers or other Students (or Student Groups) of his or the Teacher's choosing (for example chats/discussion threads, whiteboards, video chats, audio chats, podcasts). Those skilled in the art will recognize that in some embodiments a Student might overlay annotations on his own or another Student's communications in the designated virtual space (communication mode).

In this regard, annotations and communications and more generally Personalizations might include handwriting, typing, drawings (freeform or otherwise) and general scribbles, for example. In some embodiments and scenarios, it will be advantageous for Students to be able to share such Personalizations with a Teacher, other Students, Student Groups or a whole Class, whether during a meeting of the Class or as reviewed afterward, whether on a Student Mobile Client, a Lectern Client, a Teacher Client, a Student Home Client, or the AV System Client, for example. In the case of such shared Personalizations, they may be developed or evolve collaboratively as Collaborations, contributed to by a variety of People and associated with them in the System.

Those skilled in the art will also recognize that any of these Personalizations might be desirably available for marking (associated with a Test or a Mark), for example as or associated with a Response.

Broadly, Personalizations such as scribbles and whiteboards may allow both 'free-hand' equivalent interactions, keyboard-typing and touch-device interactions. Personalizations may be recorded, stored, retrieved, reported on, graded and shared.

The Interaction Class provides features that differentiate it from a traditional 'Clicker'-type interaction between Teacher and Student in several ways, for example:

1. The variety of responses possible—a clicker only allows selection from a set of given choices. The Interaction classes allow for a variety of interactions such as drag&drop, matching, drawing, scribbling, clicking on image hot-spots, pan&zoom, moving and may be providing textual narratives, or even sophisticated audio and video responses.

2. Clickers do not allow for collaborative interaction by multiple participants over the same piece of content.

3. Clickers do not allow for the Student to pose questions to the Teacher, project their own responses to the Class or in any other manner actively respond to the stimulus provided by the Teacher in any method other than passive selection from choices.

Figure 6:
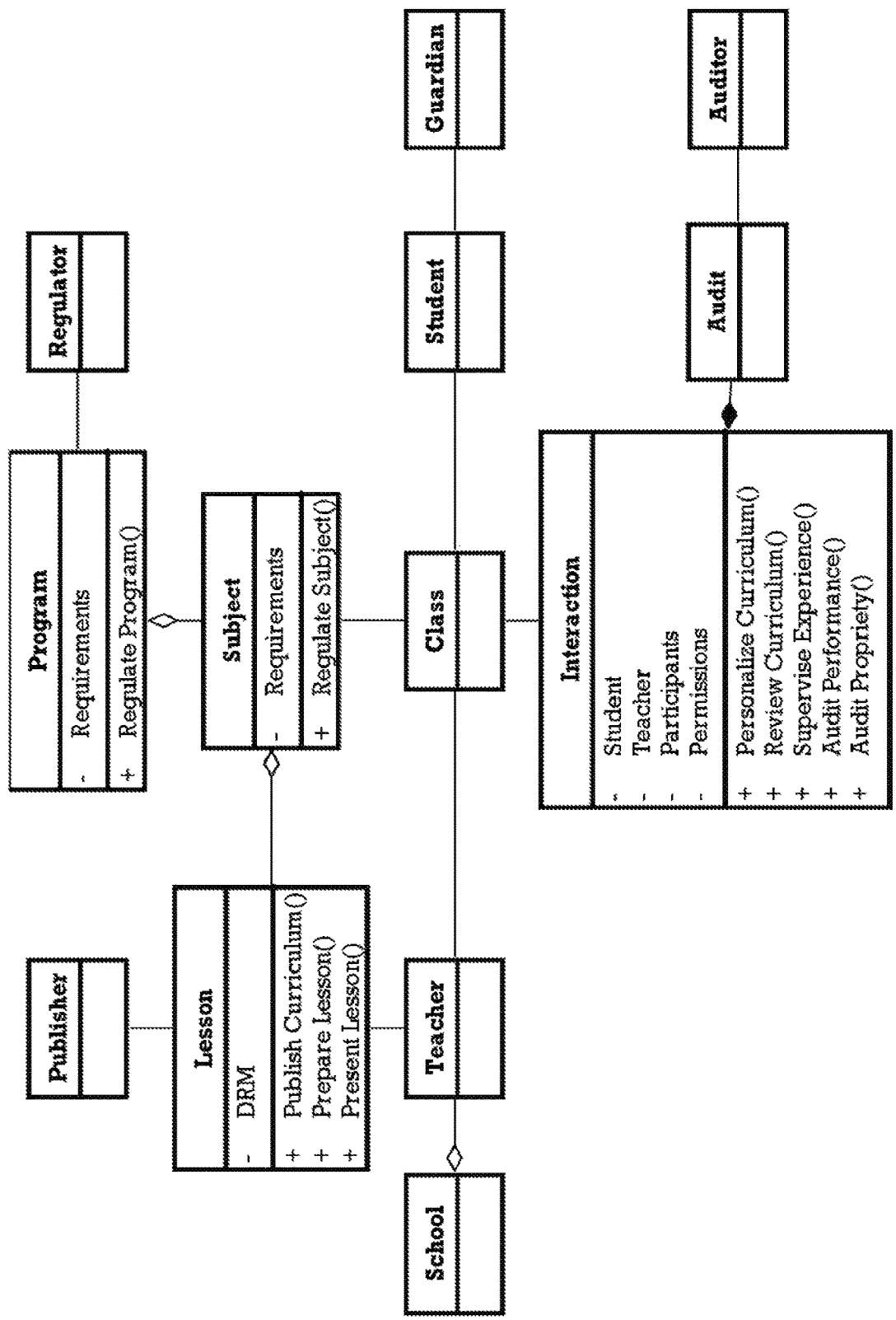
FIG. 6 is a UML 2 class diagram detailing some of the domain classes of FIG. 4.

FIG. 6 provides further detail about some of the Domain classes.

The Program and Subject classes each has a Requirements attribute and a corresponding operation to enable a Regulator to specify the attribute, respectively a Regulate Program operation and a Regulate Subject operation.

The Lesson class has a DRM attribute for specifying digital rights management and Publish Curriculum operation to enable a Publisher to publish Lesson objects to the System for use by Teachers and Students in accordance with the DRM attribute. The Lesson class may also have other metadata (attributes) like learning objectives and Curriculum mapping (government standards code) that may be provided by the Publisher or entered by the Teacher to place a specific Lesson within a Curriculum. The Lesson class also has a Prepare Lesson operation to enable a Teacher to create Lesson objects using the System and a Present Lesson operation to enable a Teacher to present Lesson objects to Classes via the System.

The Interaction class has Student, Teacher and Participants attributes to represent the Student and Teacher at the center of an Interaction and any other relevant Participants in the Interaction, for example other Students in a collaboration. In the case of a collaborative Interaction, each Student who was a Participant in the Interaction might be associated with his own Interaction object in which he was designated as the Student by the Student attribute and the others were designated merely as participants by the Participant attribute. The Interaction class also has a Permissions attribute to set who (Teacher, Student, Guardian, Auditor) can access the Interaction and in what manner. Depending on the type of Interaction (Metric, History . . . ) there would be additional attributes to record the nature of the Interaction.

The Interaction class also has a number of operations that will be described further below. These operations include a Personalize Curriculum operation and a Review Curriculum operation that a Student can invoke respectively during a meeting of the Class to engage a Lesson and after a meeting of the Class to review the Lesson. Also included is a Supervise Experience operation that a Guardian can invoke to review the Student's experience with the Class through the Student's Interactions. Also included are an Audit Performance operation and an Audit Propriety operation that an Auditor can invoke to examine respectively quantitative Interactions (Metrics) and qualitative Interactions (History) to audit respectively the performance of a Student (or Class, or Teacher, or School) and the propriety of related Interactions, for example to document that a Teacher dedicated quantitatively and qualitatively excellent efforts to help Students meet the Requirements of a Subject. The latter could be documented, for example, by the Transcripts of Class meetings, by the record of online Interactions between Teacher and Student(s), and by the aggregate Metrics of success for a Class of Students.

Figure 7:
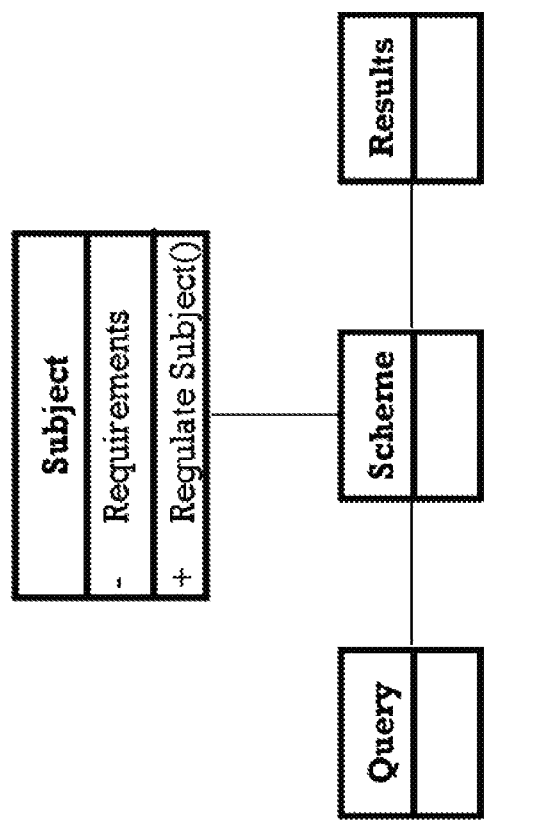
FIG. 7 is a UML 2 class diagram detailing domain classes related to grading students.

FIG. 7 provides further detail about the domain classes concerning testing and grading. FIG. 7 shows that the Scheme class is associated with all of the Query, Results and Subject classes, so as to map a Student's Response to a Query both to a Mark that indicates how well the Student understood the Query and the Topic that it supports and to the grading Requirements for the Subject, wherein a Student must demonstrate a level of mastery of a Topic (or more broadly the Lesson it conveys) to complete the Subject as a whole.

This mapping can support a number of scenarios. In a first scenario, the Student's Results do not contribute whatsoever to meeting the Subject Requirements, and so the Query is posed for purely pedagogical purposes—as a poll—to help a Class of Students to test their knowledge of a Topic and to help a Teacher to determine what portion of a Class (or who in a Class) has grasped the Topic.

In a second scenario, the Student's Result contributes to meeting the grading Requirements of a Subject in a pooled manner, in which the Student is required to obtain a total grade above a predetermined threshold and the total grade is calculated as the sum of all grades mapped from all the Student's Responses.

In a third scenario, the Student's Result contributes to meeting the grading Requirements of a Subject in a weighed manner, in which the Student is required to obtain not only a total grade above a predetermined threshold but also to obtain grades corresponding to respective Lessons or Topics above respective predetermined thresholds.

While the System can provide for automated marking and grading as described above, a Teacher is often key to assessing a Student's learning. The System therefore also supports more manual arrangements and so a Result may derive its values from a Teacher's subjective (or objective) grading of a Student's Interactions as well! For example, the Student may take part in a group discussion Collaboration, which the Teacher may monitor and use her discretion to assign a mark. This mark may contribute to the final grade of the Student for the Subject.

4. Server and Client Deployment

Figures 8, 9:
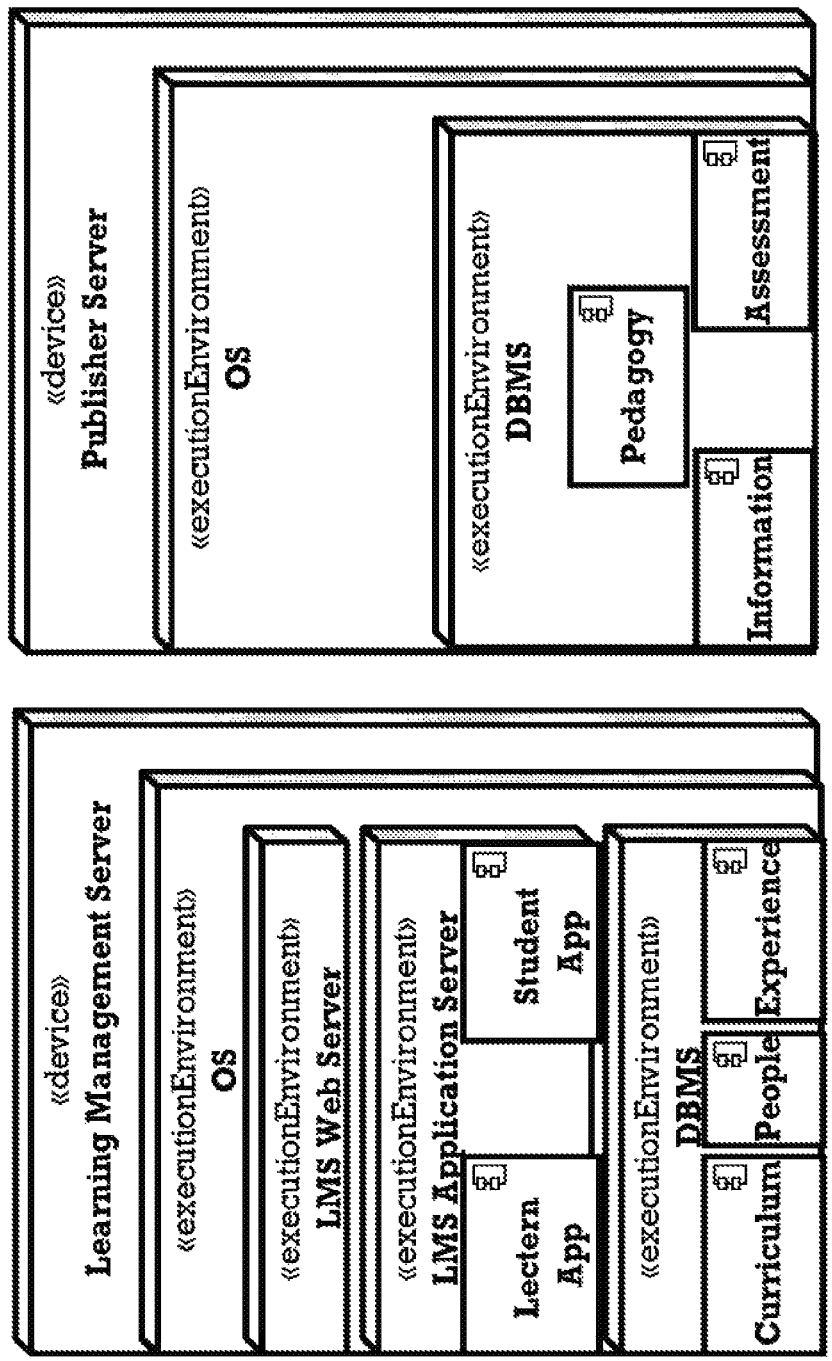
FIG. 8 is a UML 2 deployment diagram depicting an exemplary configuration of the Learning Management Server of FIG. 2.
FIG. 9 is a UML 2 deployment diagram depicting an exemplary configuration of the Publisher Server of FIG. 2.

FIG. 8 provides further detail about the configuration of the Learning Management Server.

The Learning Management Server includes a Database Management System for maintaining, accessing, and updating objects belonging to the Curriculum, People and Experience packages. More specifically, the Database Management System maintains information about where an object is maintained, whether at the Learning Management Server itself or remotely, for example on the Publisher Server, the Regulator Server or the School Server. The decision about where objects should be maintained includes factors of System operating characteristics, privacy rights and digital rights management. Therefore, this particular distribution of the objects among the Servers is merely exemplary.

The Learning Management Server also includes a Web Server to provide Clients with access to data and services via their web browsers. The Web Server might be an Apache Software Foundation Apache HTTP Server® or a Microsoft Corporation Internet Information Services® web server for example.

The Learning Management Server also includes an Application Server to provide Lectern Clients with services related to a Lectern App and Student Mobile Clients with services related to a Student App, as will be described further below.

FIG. 9 provides further detail about the configuration of the Publisher Server.

The Publisher Server includes a Database Management System for maintaining, accessing, and updating objects belonging to the Pedagogy, Information and Assessment packages.

More specifically, the Database Management System maintains information about where an object is maintained, whether at the Publisher Server itself or remotely, for example on the Learning Management Server, the Regulator Server or the School Server. The decision about where objects should be maintained considers such factors as System performance and other operating characteristics, privacy rights and digital rights management. Therefore, this particular distribution of the objects among the Servers is merely exemplary. For example, a Publisher might find it useful for the Publisher Server to have access to objects belonging to the Pedagogy and Assessment packages; however those objects might actually be stored on the Learning Management Server with the Curriculum package as a whole, and the Database Management System on the Publisher Server may merely be enabled to access those objects on the Learning Management Server through services exposed by the Learning Management Server.

Figure 10:
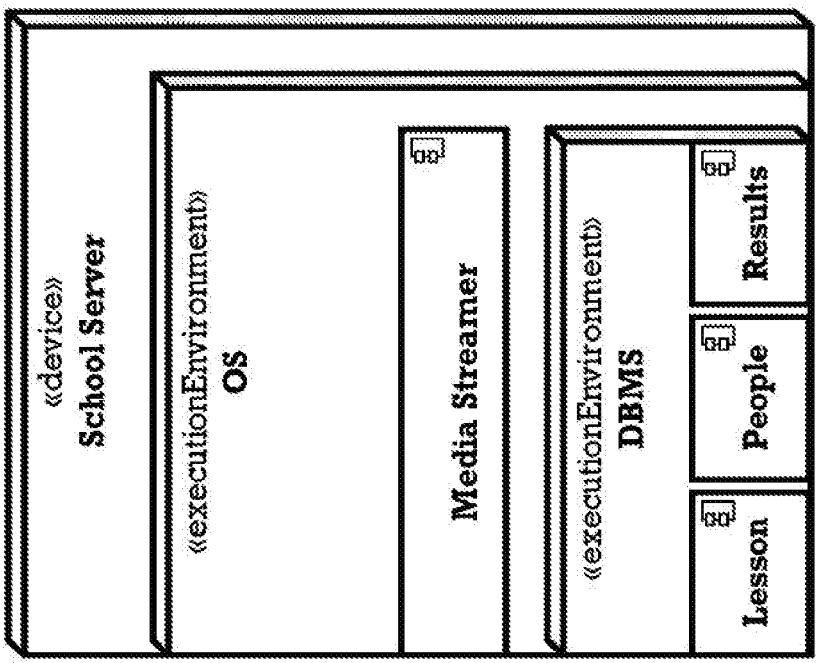
FIG. 10 is a UML 2 deployment diagram depicting an exemplary configuration of the School Server of FIG. 2.

FIG. 10 provides further detail about the configuration of the School Server.

The School Server includes a Database Management System for maintaining, accessing, and updating objects belonging to the Lesson, People and Results packages.

The School Server also includes a Media Streamer for streaming Lessons to the AV System Client and Student Mobile Clients under the direction of the Lectern Client.

In an alternative embodiment, where a Publisher is concerned about digital rights management for its Content, or where market forces dictate that the Publisher is the most efficient party to assemble the infrastructure for streaming its Content, a or the Media Streamer may be hosted at the Publisher Server.

Figure 11:
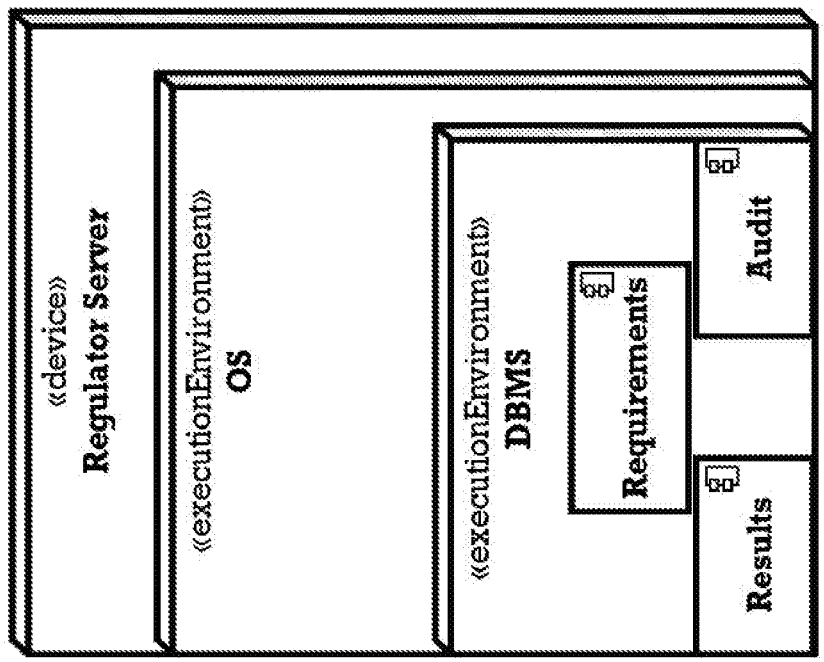
FIG. 11 is a UML 2 deployment diagram depicting an exemplary configuration of the Regulator Server of FIG. 2.

FIG. 11 provides further detail about the configuration of the Regulator Server.

The Regulator Server includes a Database Management System for maintaining, accessing, and updating objects belonging to the Requirements, Results and Audit packages.

Figure 12:
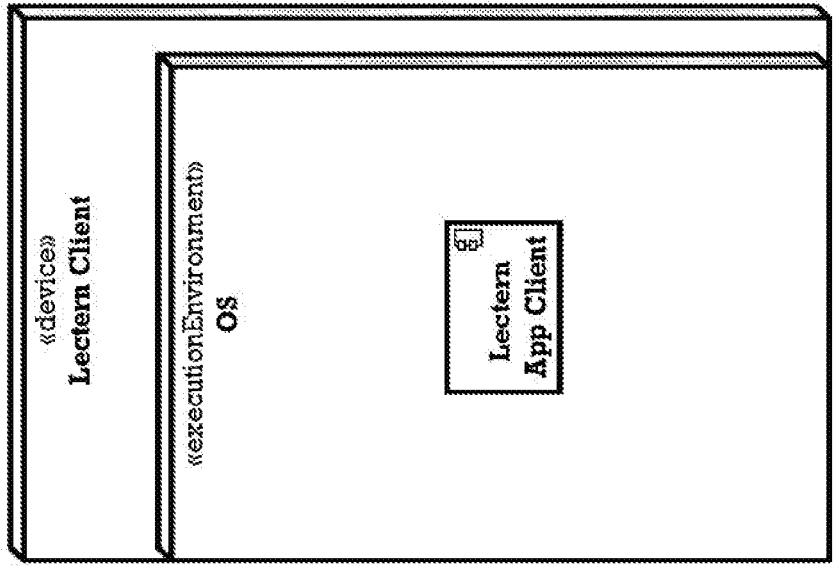
FIG. 12 is a UML 2 deployment diagram depicting an exemplary configuration of the Lectern Client of FIG. 2.

FIG. 12 provides further detail about the configuration of the Lectern Client. The Lectern Client includes a Lectern App Client for exchanging data and services with the Application Server on the Learning Management Server, as will be described further below.

Figure 13:
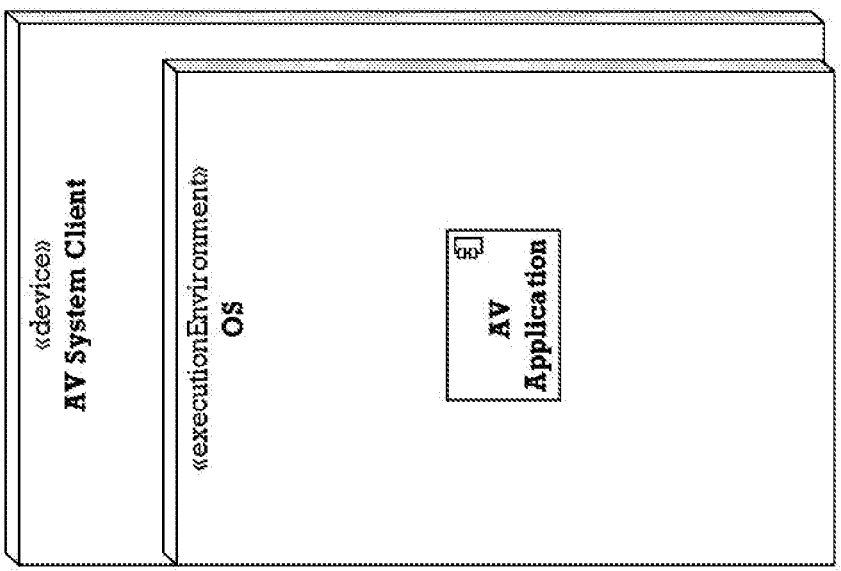
FIG. 13 is a UML 2 deployment diagram depicting an exemplary configuration of the AV System Client of FIG. 2.

FIG. 13 provides further detail about the configuration of the AV System Client. The AV System Client includes a conventional AV application for playing AV media on AV output devices such as projectors, display screens and speakers and for recording, playing back or live-streaming AV media from AV input devices such as cameras and microphones. For example, a Teacher might use the AV System Client to capture a real-time video stream, perhaps microscopic, of a culture slide or crystal development.

Figure 14:
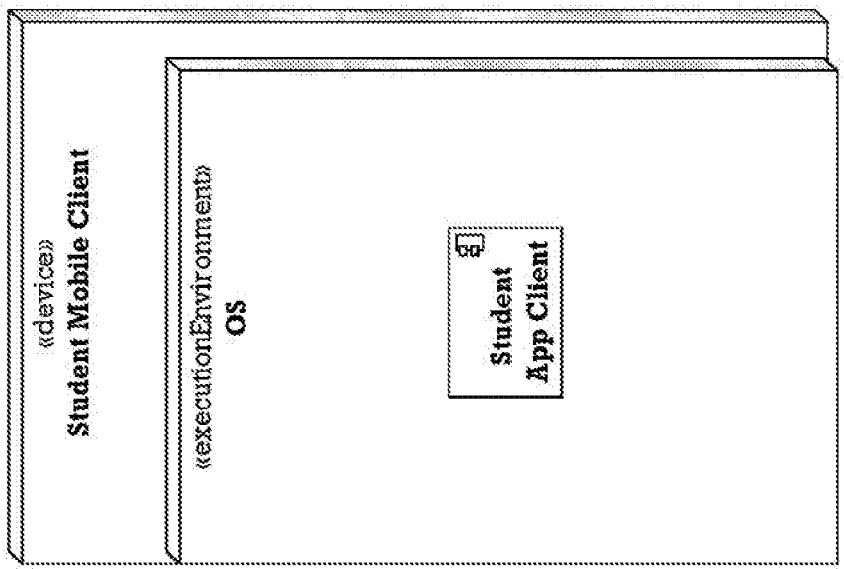
FIG. 14 is a UML 2 deployment diagram depicting an exemplary configuration of the Student Mobile Client of FIG. 2.

FIG. 14 provides further detail about the configuration of the Student Mobile Client. The Student Mobile Client includes a Student App Client for exchanging data and services with the Application Server on the Learning Management Server, as will be described further below.

Figures 15, 16, 17:
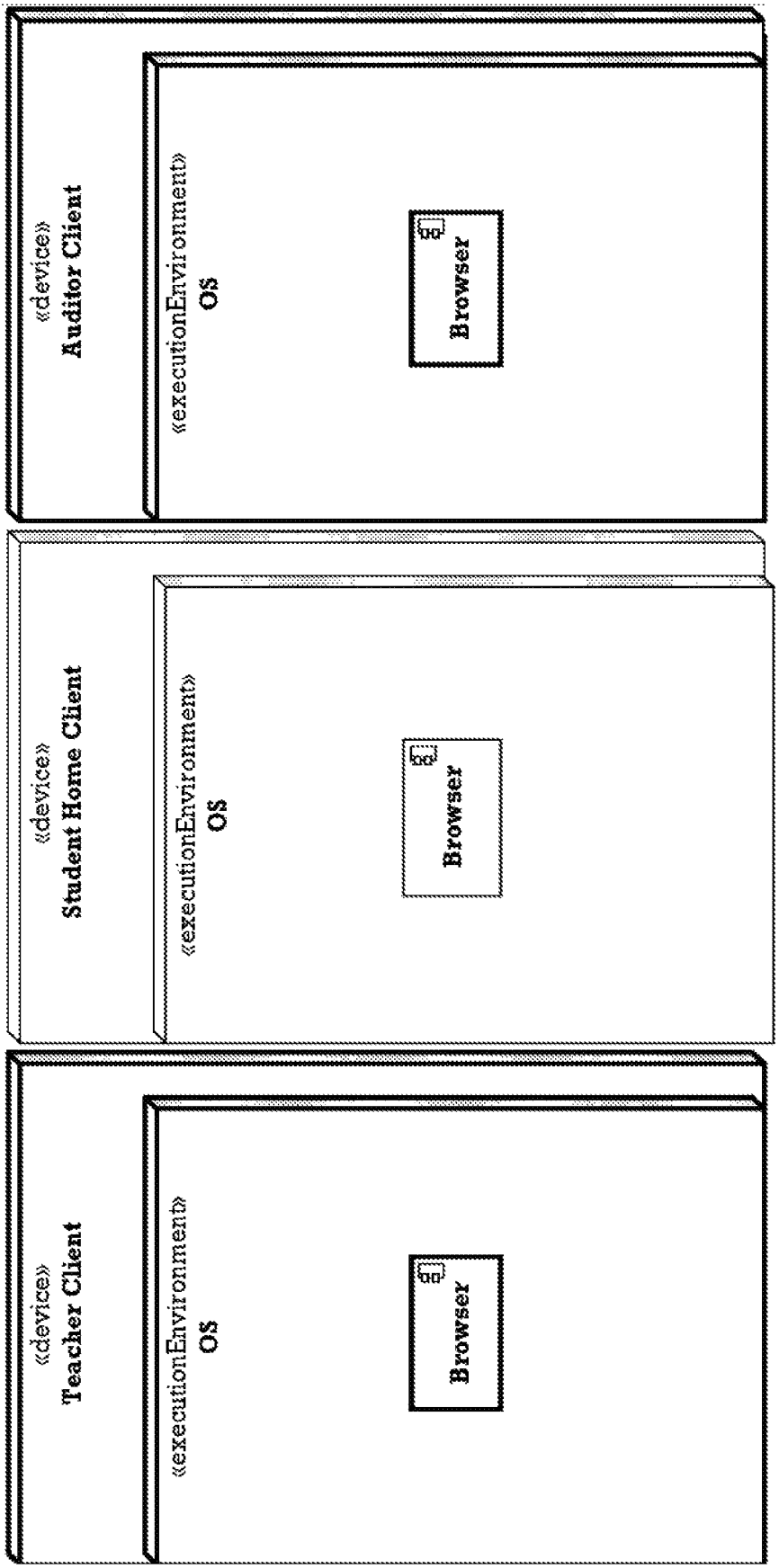
FIG. 15 is a UML 2 deployment diagram depicting an exemplary configuration of the Teacher Client of FIG. 2.
FIG. 16 is a UML 2 deployment diagram depicting an exemplary configuration of the Student Home Client of FIG. 2.
FIG. 17 is a UML 2 deployment diagram depicting an exemplary configuration of the Auditor Client of FIG. 2.

FIGS. 15, 16 and 17 provide further detail about the configuration of the Teacher Client, the Student Home Client and the Auditor Client, respectively. These Clients include a Browser for exchanging data and services with the Web Server on the Learning Management Server. The Browser might be Microsoft® Internet Explorer®, Firefox®, Safari® or Opera® for example.

5. Framework Classes

Figure 18:
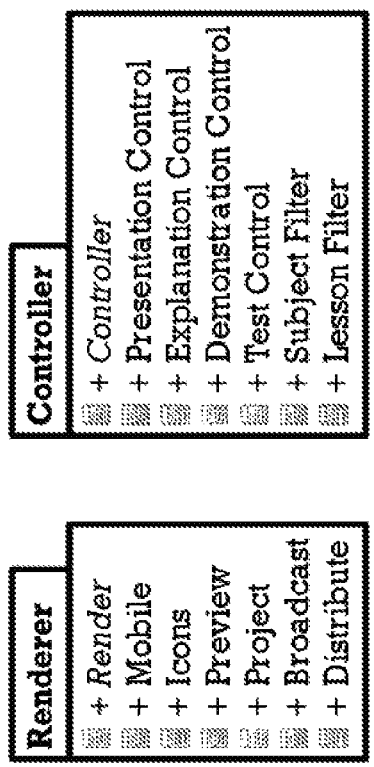
FIG. 18 is a UML 2 package diagram depicting exemplary framework packages for implementing the Education and Training Workflow Management System of FIG. 1, the packages including a Renderer package and a Controller package.

FIG. 18 shows two packages of exemplary framework classes for implementing the System, a Renderer package and a Controller package, as will be described further below. The Controller package may also have classes that allow for multiple subscription models that dictate how the System may be used and what kind of content is available to the user and how it is used. It may also have classes that allow for purchase of the System (upgrading to another subscription level, for example) or free updates to the existing System or its Contents. It may also have classes that allow for integration with external systems. It is important to note that in this System, the Clients will always interact with one of the Servers/services provided by the System itself, which in turn will marshal the required resources from outside or inside, as appropriate to the context.

Figure 19:
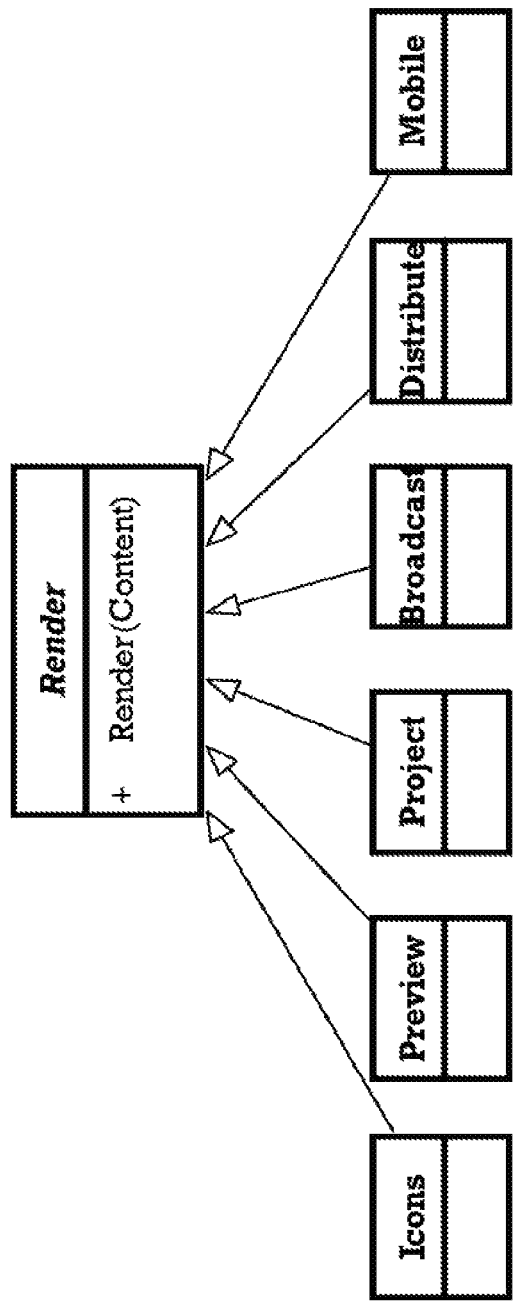
FIG. 19 is a UML 2 class diagram of exemplary framework classes belonging to the Renderer package of FIG. 18, including an Icons class, a Preview class, a Project class, a Broadcast class, a Distribute class and a Mobile class.

FIG. 19 shows the classes of the Renderer package, including a Render abstract class, which is a generalization of an Icons class, a Preview class, a Project class, a Broadcast class, a Distribute class, all of which are accessible on the Lectern Client through the Lectern App Client, and a Mobile class accessible on the Student Mobile Clients through the Student App Client. These classes include a Render (Content) operation that renders Content in a predetermined way on a predetermined Client.

The Icons class renders at the Lectern Client an icon of the Exposition object, Demonstration object and Query object associated with a Topic object to help a Teacher to select between them or between Topic objects for presentation to a Class.

The Preview class renders at the Lectern Client a full-size interactive Content object to help a Teacher to prepare to present Content to a Class.

The Project class renders to the AV System Client a full-size interactive Content object under the control of the Lectern Client to help a Teacher to present Content to the Class.

The Broadcast class renders to all the Student Mobile Clients associated with a Class a full-size interactive Content object under the control of the Lectern Client to help a Teacher to present Content to the Class. Furthermore, a Student App might present Content to the Class, but only upon the Lectern Client approving such an action, where the Student App takes control over the Broadcast operation. It is conceivable that the Student App still functions 'via' the Lectern Client, with the master director Lectern Client enabling the Student App to 'take over' some of the typical Lectern Client functionality for some time. In another scenario, the Lectern Client can help a Teacher or a Student to present Content to only a few, selected members of the Class—a Multicast.

The Distribute class, renders to all the Student Mobile Clients associated with a Class a full-sized interactive Content object under the respective control of each Student Mobile Clients (while enabled from the Lectern Client) to help each Student to engage the Content.

The Mobile class cooperates with the Broadcast and Distribute classes, to render at a Student Mobile Client a full-sized interactive Content object with the interactivity set by the originating Broadcast or Distribute class.

Figure 20:
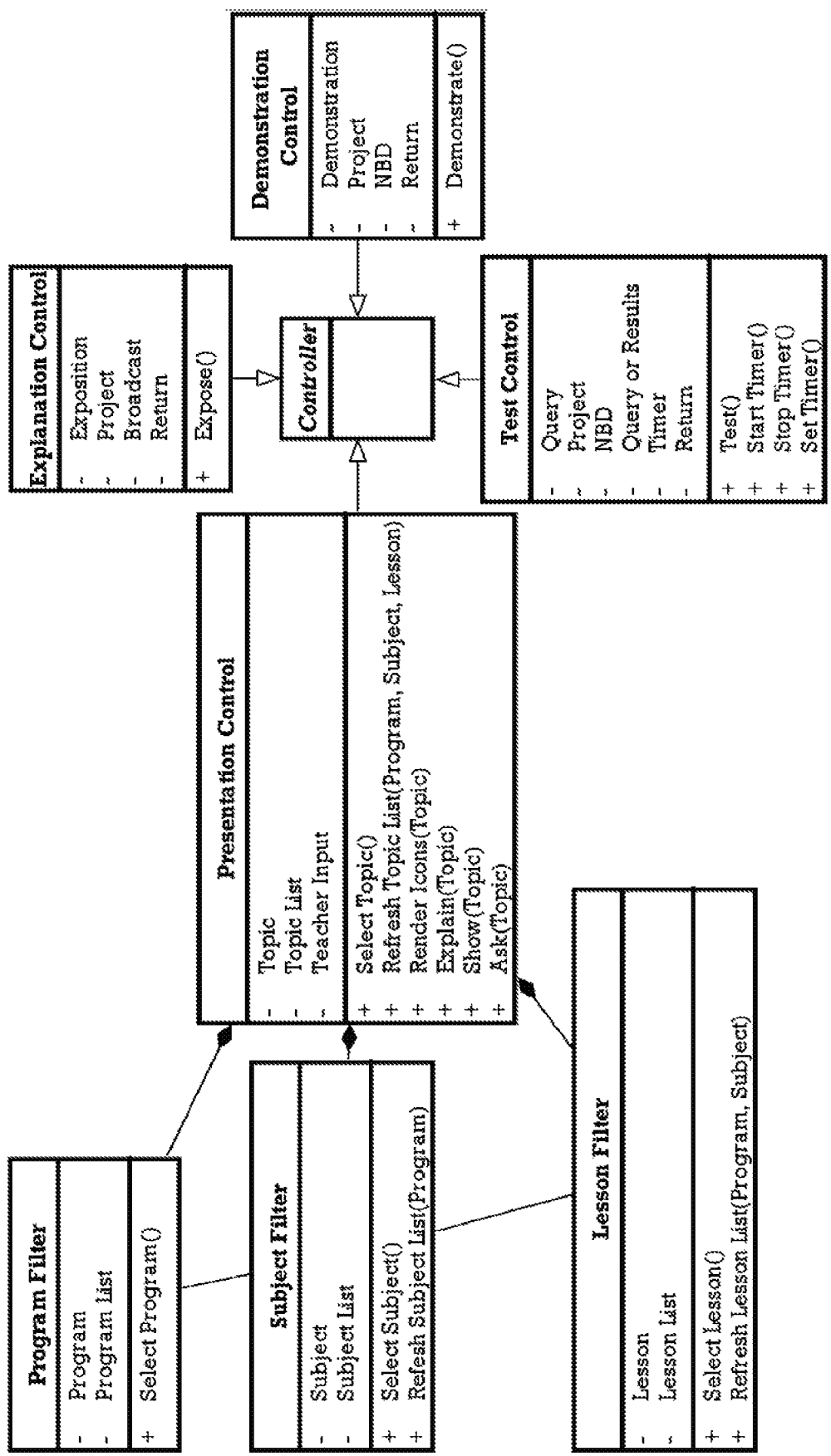
FIG. 20 is a UML 2 class diagram of exemplary framework classes belonging to the Controller package of FIG. 18, including a Presentation Control class, an Explanation Control class, a Demonstration Control class and Test Control class.

FIG. 20 shows the classes of the Controller package, including a Presentation Control class, an Explanation Control class, a Demonstration Control class and a Test Control class, all of which are accessible on the Lectern Client through the Lectern App Client. These classes help a Teacher to present Lessons to Students in a Class using the System.

The Presentation Control class includes a Topic attribute representing the Topic currently being presented and a Topic List attribute representing a shortlist of related Topics as filtered by the Teacher by Program, Subject and Lesson, as will be further described below. The Presentation Control class also includes a Teacher Input attribute representing a queue of commands input by the Teacher.

The Presentation Control class includes a number of operations, including a Select Topic operation, a Refresh Topic List operation, a Render Icons operation, and Explain, Show and Ask operations.

The Select Topic operation enables a Teacher to select a Topic for presentation. The Refresh Topic List operation refreshes the Topic List in accordance with the filters currently set by the Teacher. The Render Icons operation renders at the Lectern Client icons of objects of each of the three classes of Content (Exposition, Demonstration and Test) associated with the current Topic object, doing so by instantiating an Icons object for each of the Content objects. The Explain, Show and Ask operations respectively instantiate an Explanation Control object, a Demonstration Control object and a Test Control object for the corresponding Content object (Exposition, Demonstration or Test) associated with the current Topic object. The Teacher may invoke the Explain, Show and Ask operations in any order and any number of times, including not at all, as thought appropriate to teach the Students.

The Presentation Control class is a composition of a Program Filter class, a Subject Filter class and a Lesson Filter class.

The Program Filter class includes a Program attribute representing the current Program and a Program List attribute representing a list of available Programs. The Program Filter class also includes a Select Program operation to enable a Teacher to select the current Program.

The Subject Filter class includes a Subject attribute representing the Subject currently being taught and a Subject List attribute representing a shortlist of Subjects available in the current Program. The Subject Filter class also includes a Select Subject operation to enable a Teacher to select the current Subject and a Refresh Subject List operation that refreshes the Subject List in accordance with the filters currently set by the Teacher.

The Lesson Filter class includes a Lesson attribute representing the Lesson currently being taught and a Lesson List attribute representing a shortlist of lessons available in the current Subject. The Lesson Filter class also includes a Select Lesson operation to enable a Teacher to select the current Lesson and a Refresh Lesson List operation that refreshes the Lesson List in accordance with the filters currently set by the Teacher.

Those skilled in the art will appreciate that the filtering arrangements taught immediately above and elsewhere throughout this description are exemplary and neither mandatory nor exhaustive. Other arrangements and other dimensions (attributes, metadata) of filtration or sorting will occur to those skilled in the art that still fall within the spirit of the present invention.

The Explanation Control class includes an Exposition attribute representing the Exposition Content object associated with the current Topic being presented, a Project class representing a toggle whether or not the Content will be presented to the AV System, a Broadcast class representing a toggle whether or not the Content will be presented read-only to the Student Mobile Clients associated with the Class, and a Return class representing a toggle whether or not the Teacher has decided to terminate an Explanation session. The Explanation Control class also includes an Expose operation to invoke it.

The Demonstration Control class includes a Demonstration attribute representing the Demonstration Content object associated with the current Topic being presented, a Project class representing a toggle whether or not the Content will be presented to the AV System, a NBD class representing a toggle whether (a) the Content will be presented read-only to the Student Mobile Clients associated with the Class, (b) the Content will be presented interactively to the Student Mobile Clients associated with the Class or (c) neither, and a Return class representing a toggle whether or not the Teacher has decided to terminate a Demonstration session. The Demonstration Control class also includes a Demonstrate operation to invoke it.

The Test Control class includes a Query attribute representing the Test Content object associated with the current Topic being presented, a Project class representing a toggle whether or not the Content will be presented to the AV System, a NBD class representing a toggle whether (a) the Content will be presented read-only to the Student Mobile Clients associated with the Class, (b) the Content will be presented interactively to the Student Mobile Clients associated with the Class or (c) neither, a Query or Results attribute representing a toggle whether to present the Test Query or Student Results, a Timer attribute representing the time remaining for Students to answer a Query, and a Return class representing a toggle whether or not the Teacher has decided to terminate a Test session. Depending on how the Test Control is embodied, the Student Results might be presented to all members of the Class as a Class-wide consolidation or might be presented individually to each Student as the Student's own results. In some embodiments, the Results might be presented simply as the correct answer, or as the correct answer accompanied by the Teacher's explanation of why it is correct.

The Test Control class also includes a Test operation to invoke it as well as Start Timer, Stop Timer and Set Timer operations. In some embodiments, the Test Control class might also include Pause Timer and Resume Timer operations as well that a Teacher can manually invoke during a Test.

Those skilled in the art will recognize that the payload of a Content object to be Presented may be either the content itself or a link to the content, including a link to a node outside the System.

6. Teaching Operations

Figure 21:
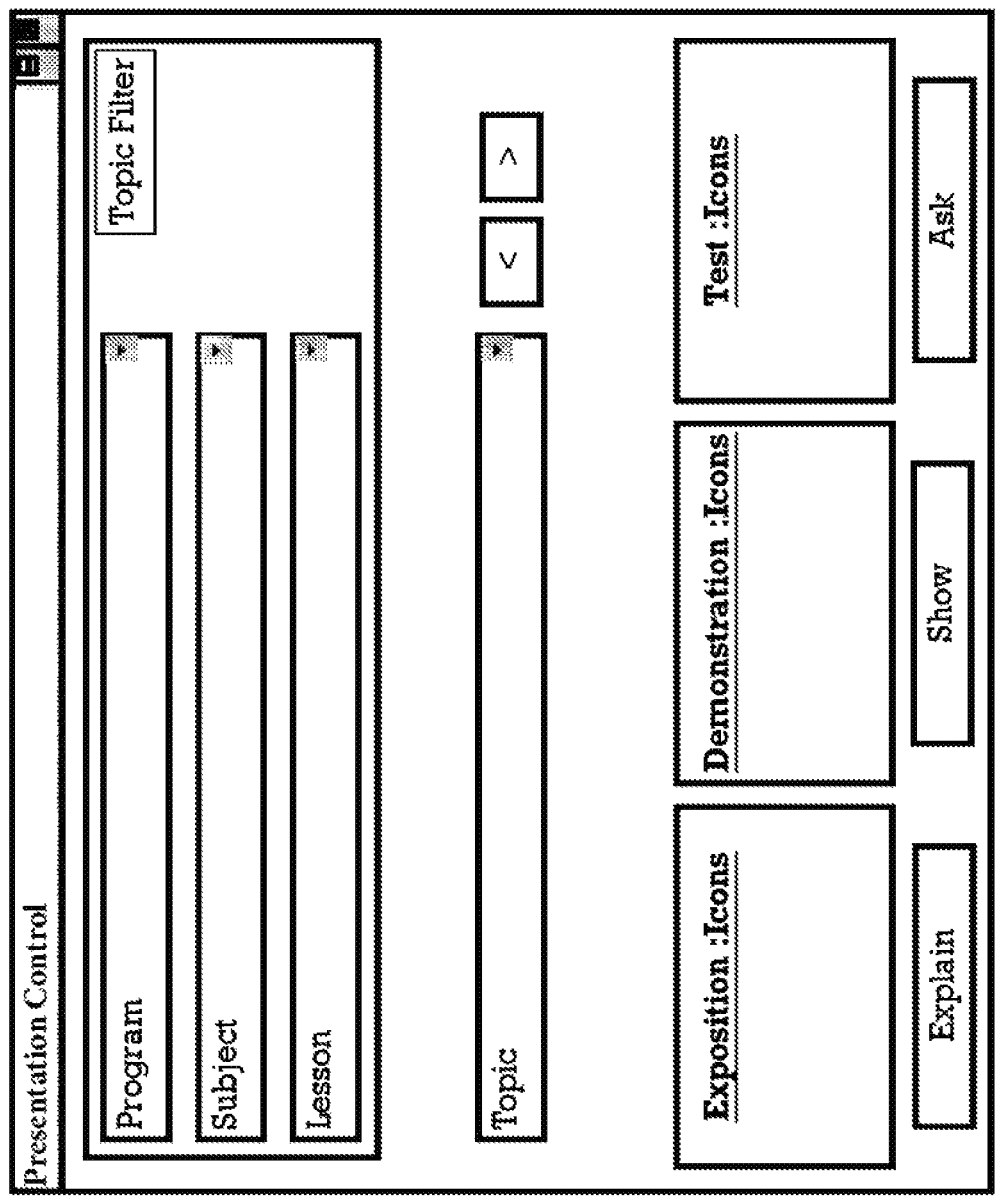
FIG. 21 is a UML 2 user interface diagram of an exemplary user interface for enabling a Teacher at a Lectern Client to interact with objects of the Presentation Control class of FIG. 20.
Figure 22:
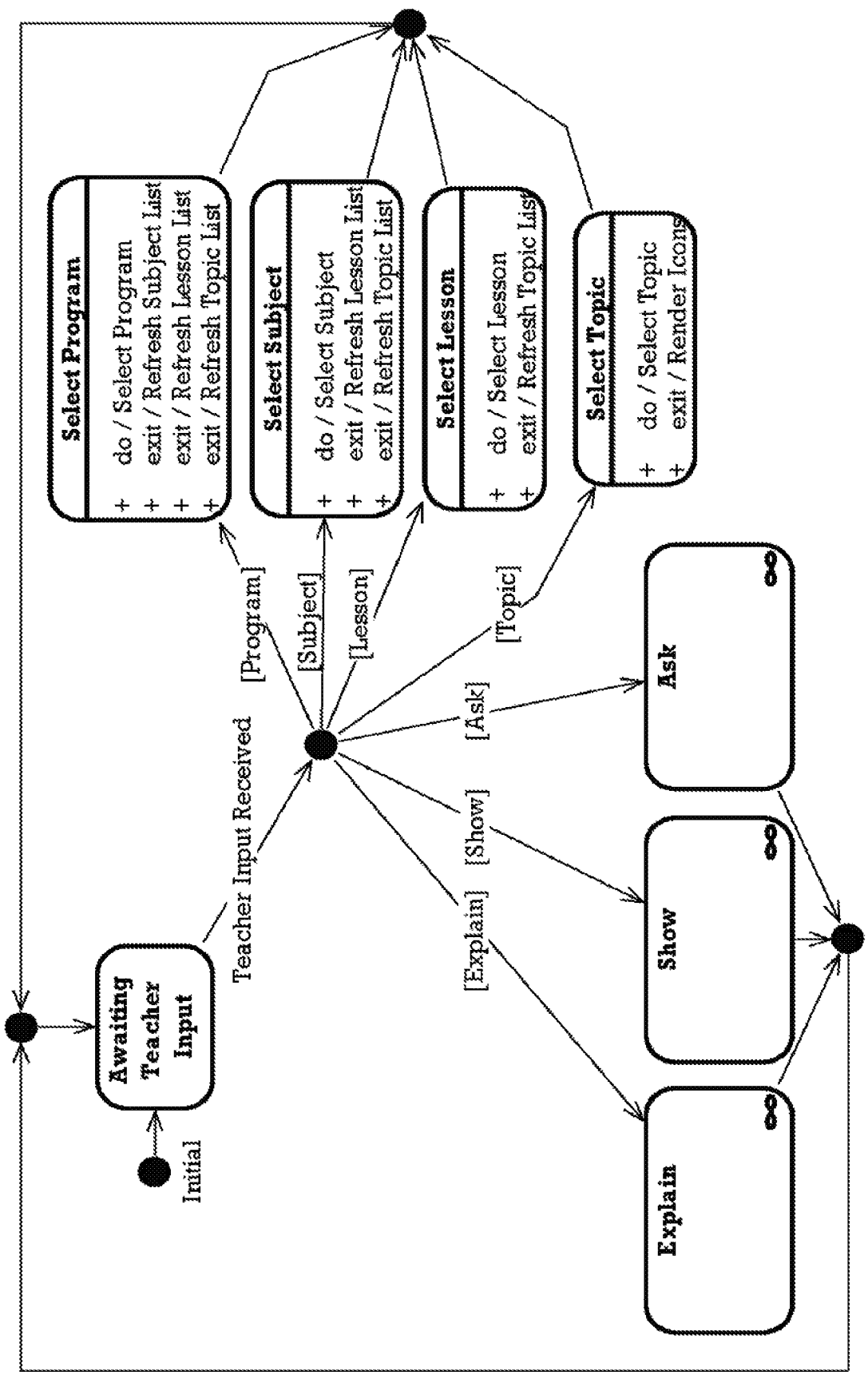
FIG. 22 is a UML 2 an exemplary state machine diagram of the Presentation Control class of FIG. 20.

FIGS. 21 and 22 show how a Teacher would interact with a Presentation Control object after invoking the Present Lesson operation of a Lesson object.

The Presentation Control object would be instantiated in an idle state, Awaiting Teacher Input. With Teacher Input Received, the Presentation Control object would transition to another state.

If the Teacher Input Received involved a Program Filter user interface control, then the Presentation Control object would transition to a Select Program state, in which the Select Program operation was invoked to select the current Program and the Refresh Subject List, Refresh Lesson List and Refresh Topic List operations were invoked to refresh the respective Lists to accord with the current Program. Thereafter, the Program Control object would transition back to the idle state, Awaiting Teacher Input.

If the Teacher Input Received involved a Subject Filter user interface control, then the Presentation Control object would transition to a Select Subject state, in which the Select Subject operation was invoked to select the current Subject and the Refresh Lesson List and Refresh Topic List operations were invoked to refresh the respective Lists to accord with the current Subject. Thereafter, the Program Control object would transition back to the idle state, Awaiting Teacher Input.

If the Teacher Input Received involved a Lesson Filter user interface control, then the Presentation Control object would transition to a Select Lesson state, in which the Select Lesson operation was invoked to select the current Lesson and the Refresh Topic List operation was invoked to refresh the Topic List to accord with the current Subject. Thereafter, the Program Control object would transition back to the idle state, Awaiting Teacher Input.

If the Teacher Input Received involved a user interface control associated with either the Explain, Show or Ask operation, then the respective operation would be invoke and respectively instantiate an Explanation Control object, a Demonstration Control object or a Test Control object. Depending on the implementation of the Presentation Control class, the Presentation Control object would transition back to the idle state, Awaiting Teacher Input, either upon the instantiation or the destruction of the respective Explanation Control object, a Demonstration Control object or a Test Control object. The former approach would, for example, allow a Teacher to interact with the Presentation Control object while the Students were interacting with a Demonstration Control object. The latter approach would ensure that the Teacher and Students were interacting with the same object.

Figure 23:
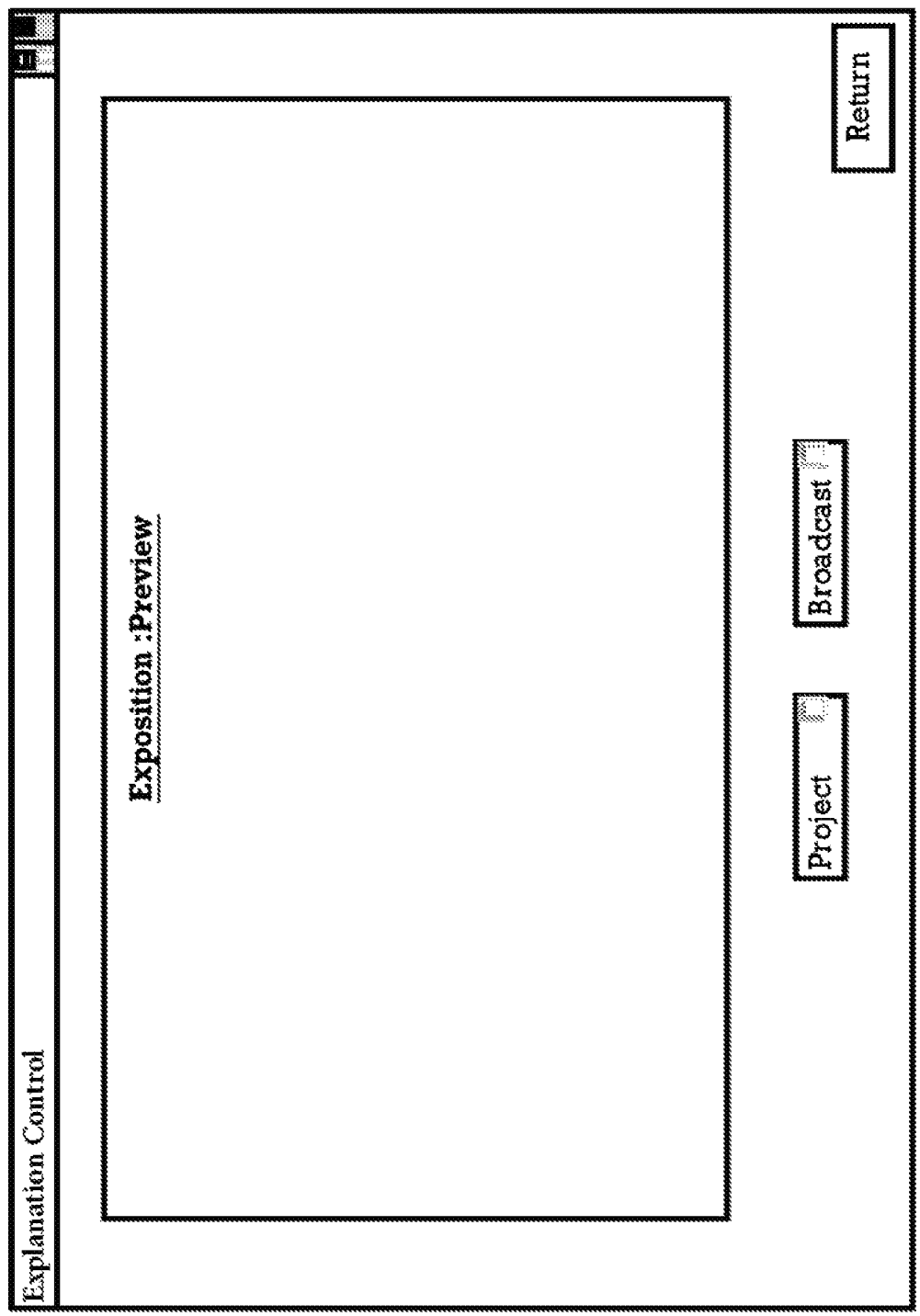
FIG. 23 is a UML 2 user interface diagram of an exemplary user interface for enabling a Teacher at a Lectern Client to interact with objects of the Explanation Control class of FIG. 20.
Figure 24:
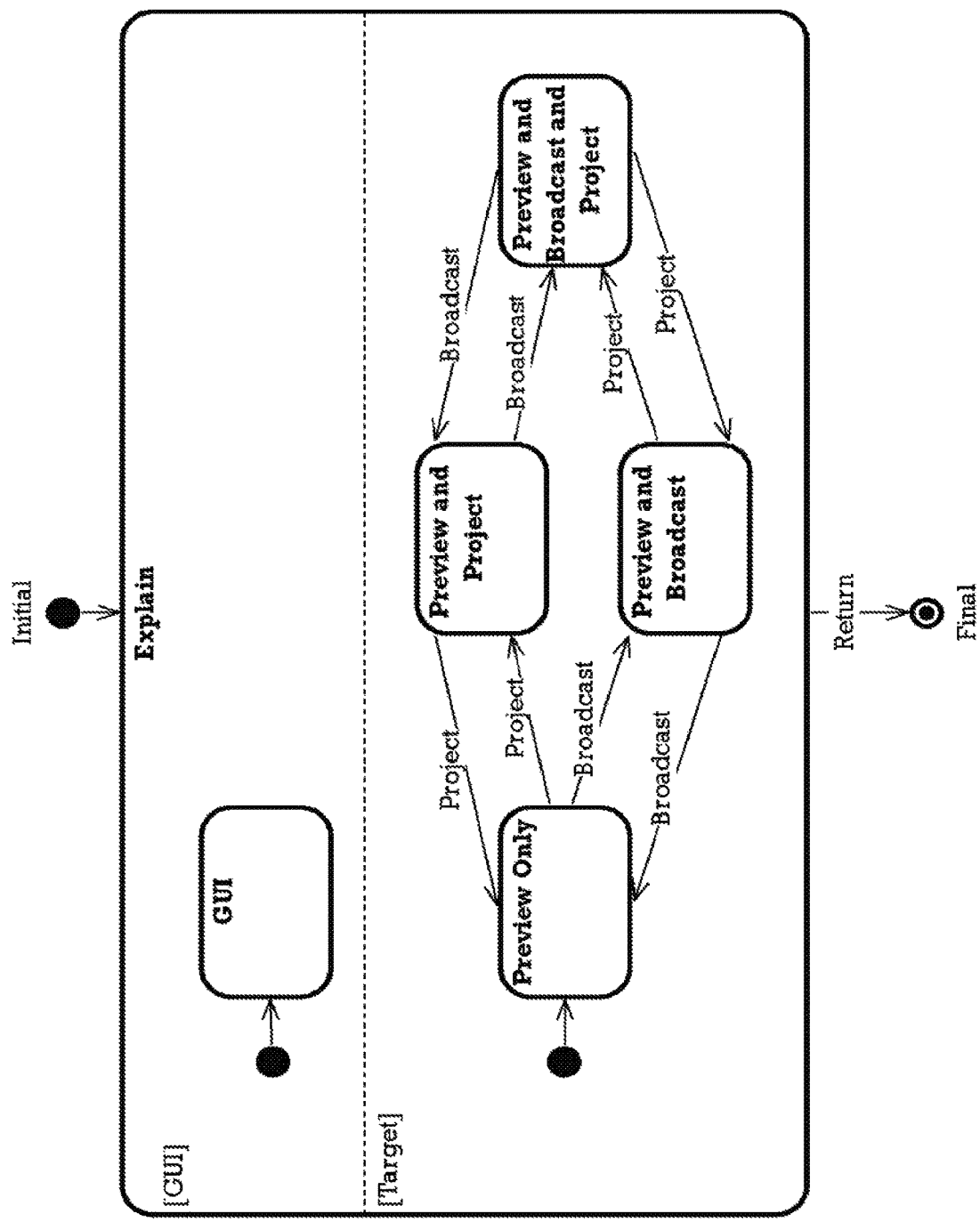
FIG. 24 is a UML 2 an exemplary state machine diagram of the Explanation Control class of FIG. 20.

FIGS. 23 and 24 show how a Teacher would interact with an Explanation Control object.

The Explanation Control object would be instantiated to render the Exposition object associated with the current Topic to a graphical user interface (GUI) and upon instantiation would enter a Preview Only state in which the Exposition object is rendered only as a Preview to the Lectern Client. So rendered, the Teacher would be able to interact privately with the Exposition object through the GUI, for example to focus his thoughts in preparation for presenting the Exposition object to the Class or to format the Exposition object for presentation to the class, such as by pinch&zooming and centering an image before projection/broadcast/distribution.

Depending on the toggle of Project and Broadcast attributes, the Explanation Control object transitions between the Preview Only state, and a Preview and Project state, a Preview and Broadcast state, and a Preview and Broadcast and Project state.

In the Preview and Project state, the Exposition object is rendered to both the Lectern Client and the AV System Client under the control of the Teacher at the Lectern Client.

In the Preview and Broadcast state, the Exposition object is rendered to both the Lectern Client and the Mobile Student Clients under the control of the Teacher at the Lectern Client.

In the Preview and Broadcast and Project state, the Exposition object is rendered to all of the Lectern Client, the AV System Client and the Mobile Student Clients under the control of the Teacher at the Lectern Client.

In any of these states, when the Return attribute is toggled the Explanation Control object is destroyed.

Thus the Explanation Control object helps a Teacher to use the System to present an Exposition object—for example bullet points—to a Class in a centrally controlled manner, keeping everyone focused on the same aspects of the Exposition object as the Teacher explains the Topic.

When the Explanation Control object is in any state other than the Preview Only state, the Teacher's interaction with the Explanation object is recorded as a History object associated with the Subject, Lesson, Topic, Class and Teacher, for example.

Figure 25:
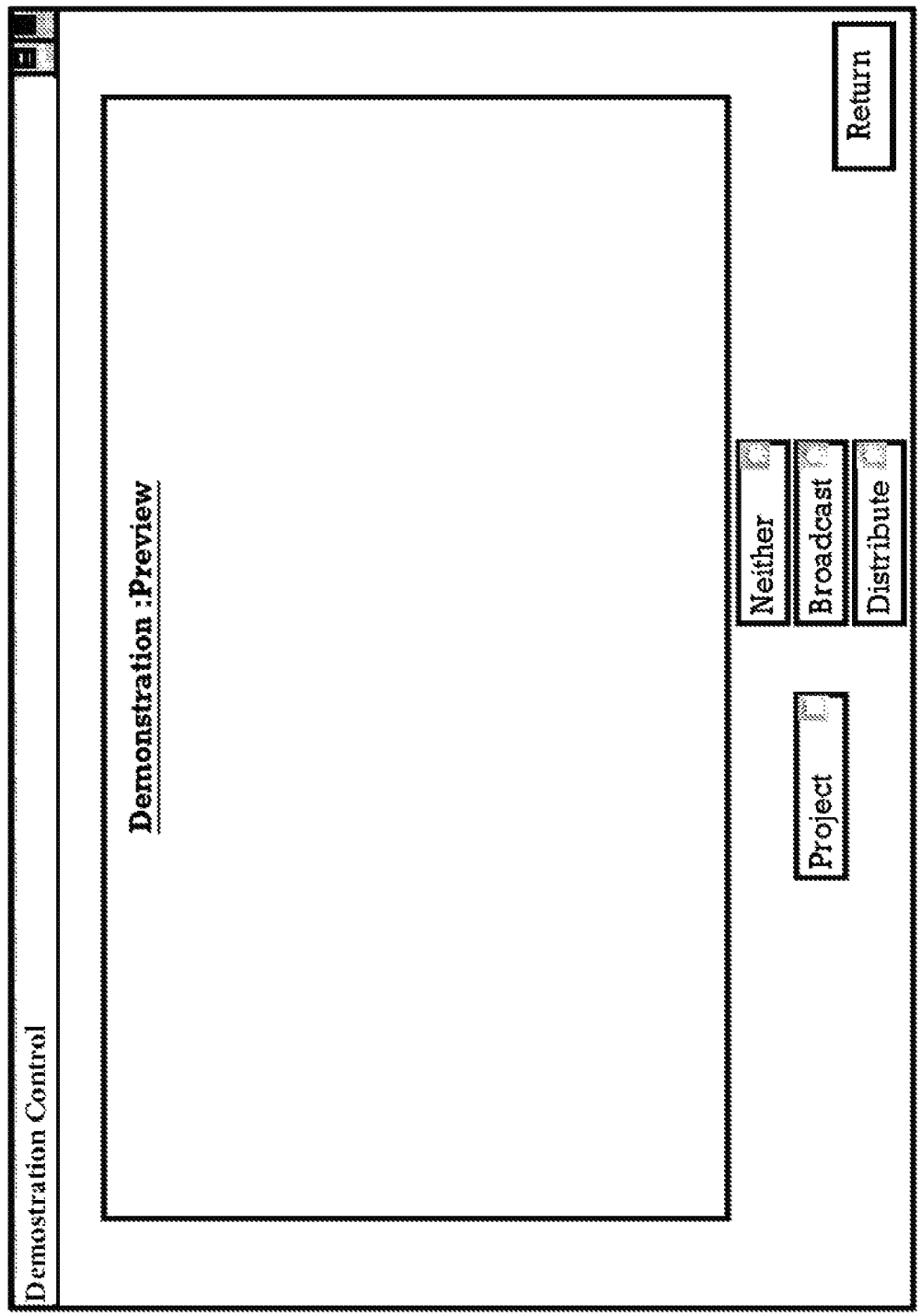
FIG. 25 is a UML 2 user interface diagram of an exemplary user interface for enabling a Teacher at a Lectern Client to interact with objects of the Demonstration Control class of FIG. 20.
Figure 26:
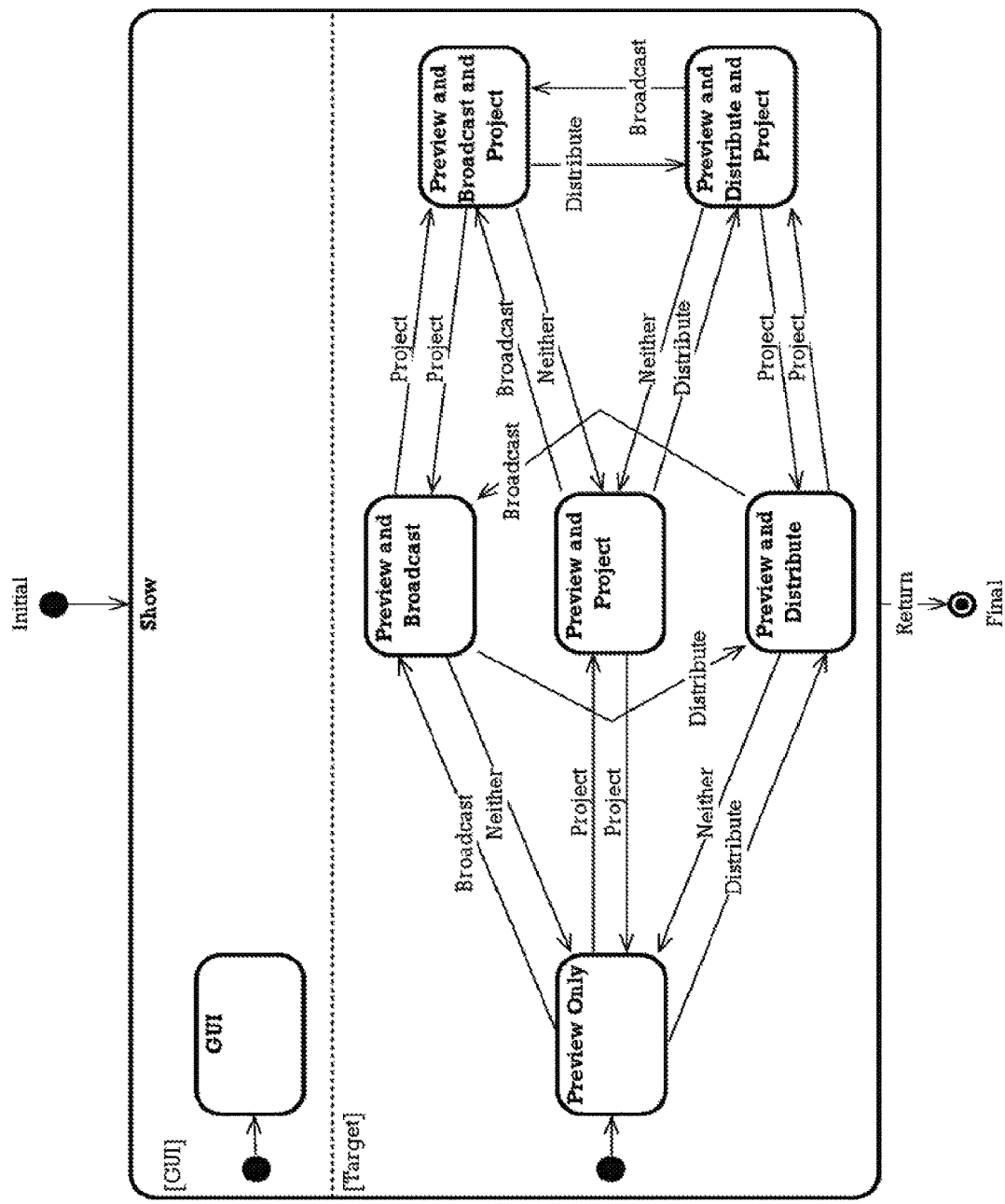
FIG. 26 is a UML 2 an exemplary state machine diagram of the Demonstration Control class of FIG. 20.

FIGS. 25 and 26 show how a Teacher would interact with a Demonstration Control object. The Demonstration Control object behaves similarly to the Explanation Control object, except that (a) it controls the rendering of a Demonstration object instead of an Exposition object and (b) it's inclusion of a tri-state NBD attribute in place of the Broadcast attribute of the Explanation Control object supports additional states for rendering targets, namely a Preview and Distribute state and a Preview and Distribute and Project state.

In the Preview and Distribute state, the Demonstration object is rendered to the Lectern Client under the control of the Teacher at the Lectern Client and to the Mobile Student Clients under the independent control of each of the Students at his own Mobile Student Client.

In the Preview and Distribute and Project state, the Demonstration object is rendered to both the Lectern Client and the AV System Client under the control of the Teacher at the Lectern Client and to the Mobile Student Clients under the independent control of each of the Students at his own Mobile Student Client.

Thus the Demonstration Control object helps a Teacher to use the System to present a Demonstration object—for example an interactive map—to a Class in an interactive manner, providing each Student simultaneously with the opportunity to interact in his own way with the Demonstration object so as to learn in his own particular way or to study those aspects of the Demonstration object that most appeal to him. The Demonstration Control object provides the Teacher with the option at anytime to reestablish central control of the Demonstration object by toggling between a Distribute state and a corresponding Broadcast state, such as between the Preview and Distribute state and the Preview and Broadcast state. Alternatively, the Demonstration Control object provides the Teacher with a less intrusive option to provide guidance to the Class without interrupting Student interaction by demonstrating the desired aspect of the Demonstration object on the AV System Client using one of the Project and Distribute states. Those skilled in the art will recognize that this arrangement might also be accomplished with less child classes of the Render class, for example by combining the Broadcast and Distribute classes and using an attribute to indicate whether input on Student Mobile Devices was disabled (broadcast) or enabled (distribute). In a similar regard, another attribute might be used in place of the Project class to designate whether or not a Content object should be projected using the AV System client.

When the Demonstration Control object is in any state other than the Preview Only state, the Teacher's and Student's interactions with the Demonstration object are recorded as History objects, the History object for the Teacher's interaction being associated with the Subject, Lesson, Topic, Class and Teacher, for example, and the History object for each individual Student's interaction being associated with the Subject, Lesson, Topic, Class and that Student, for example. As described above with respect to Student Groups and Collaborations, History objects for Interactions among groups of Students would be associated with the Subject, Lesson, Topic, Class, the Student Group and each Student who is a member of the Student Group.

Figure 27:
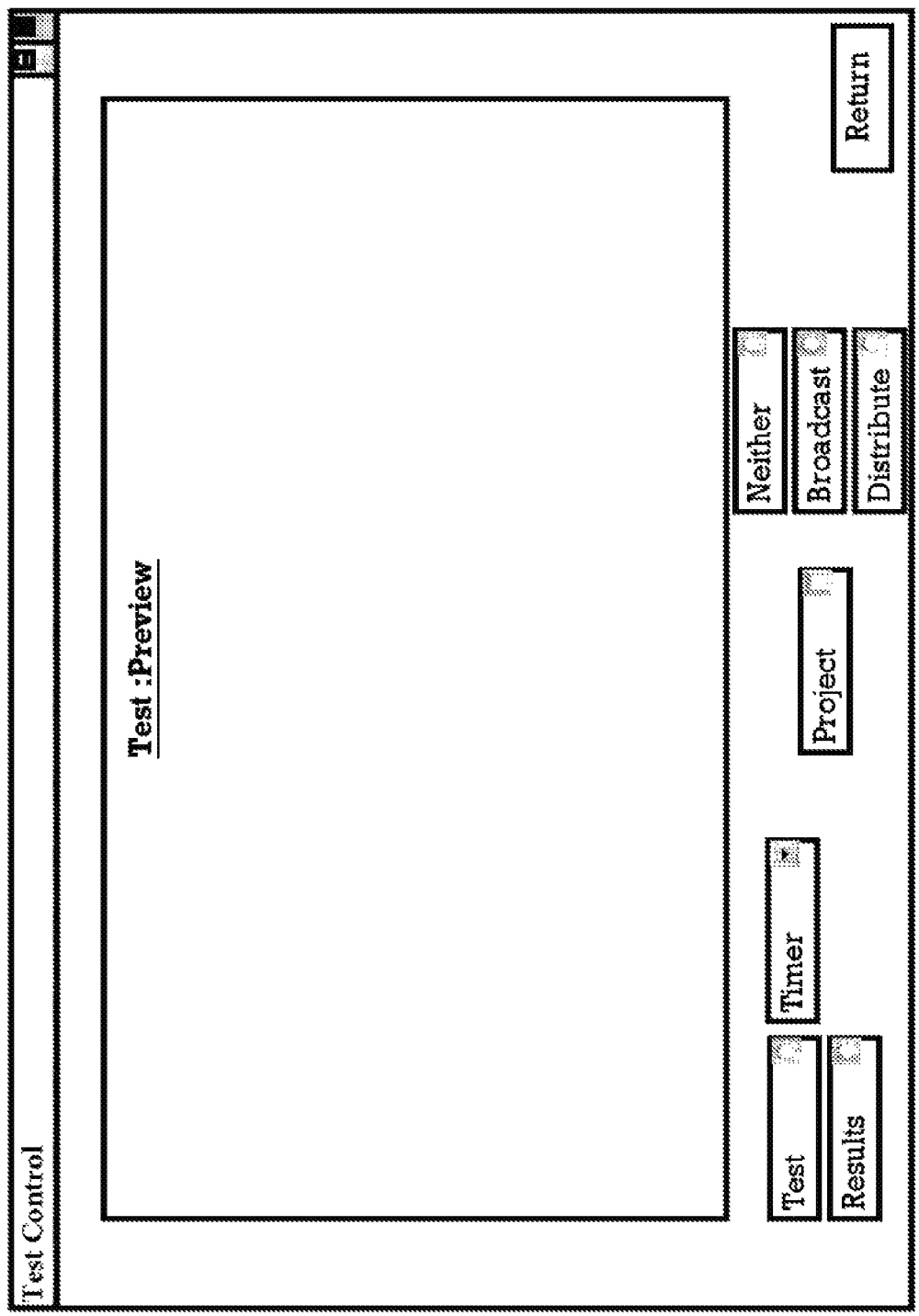
FIG. 27 is a UML 2 user interface diagram of an exemplary user interface for enabling a Teacher at a Lectern Client to interact with objects of the Test Control class of FIG. 20.
Figure 28:
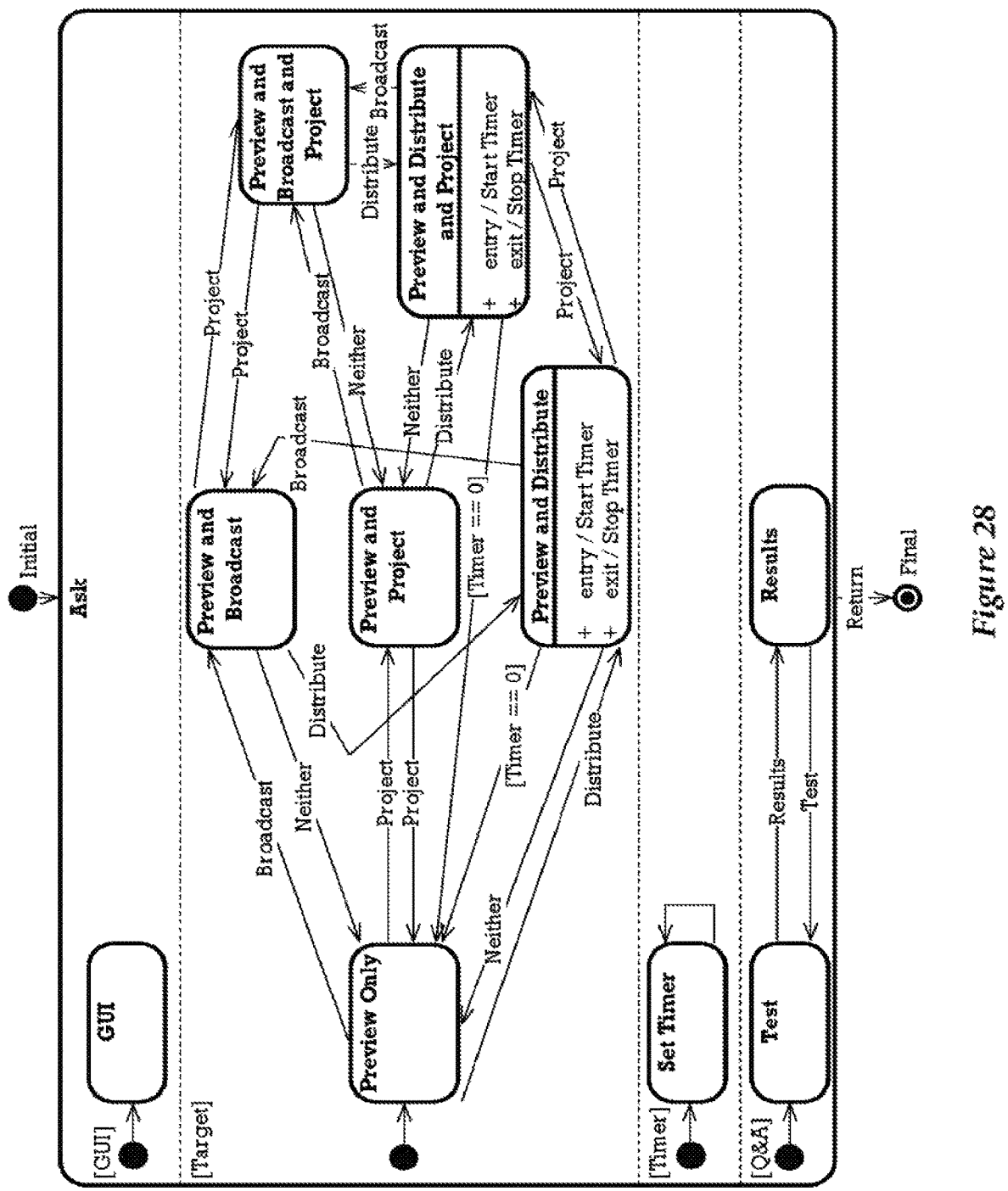
FIG. 28 is a UML 2 an exemplary state machine diagram of the Test Control class of FIG. 20.

FIGS. 27 and 28 show how a Teacher would interact with a Test Control object. The Test Control object behaves similarly to the Demonstration Control object, except that (a) it controls the rendering of a Test object instead of a Demonstration object, (b) it's inclusion of a Query or Results attribute supports the rendering of either a Query object or a Results object corresponding to the current Test object, as toggled by the Query and Results controls on the Test Control user interface and (c) it's inclusion of a countdown Timer attribute provides a time-based trigger for a transition from the Preview and Distribute state and the Preview and Distribute and Project state back to the Preview Only state.

The Teacher can set the Timer attribute to a desired time value using the Timer control on the Test Control user interface. When either of the two Distribute states is entered, the Start Timer operation is invoked to cause the Timer attribute to count down. When either of the two Distribute states is exited, the Stop Timer operation is invoked to cause the Timer attribute to stop counting down. When the Timer attribute has counted down to a value equal to 0, the Test Control object transitions from the current Distribute state to the Preview Only state. Those skilled in the art will recognized that a Timer attribute and attendant operations might also be useful for other Content objects, for example a Demonstration object, to keep Students focused on the learning objectives for a Demonstration and not merely playing with an interactive distraction.

While the Test Control object is in a Distribute state, each of the Students can independently interact with the current Test object (Query object) on his own Student Mobile Client. This interaction is recorded as a History object associated with that the Subject, Lesson, Topic, Class and that Student for example and his particular responses to the Query object are recorded as Response objects associated with that Subject, Lesson, Topic, Class and Student for example.

Figure 29:
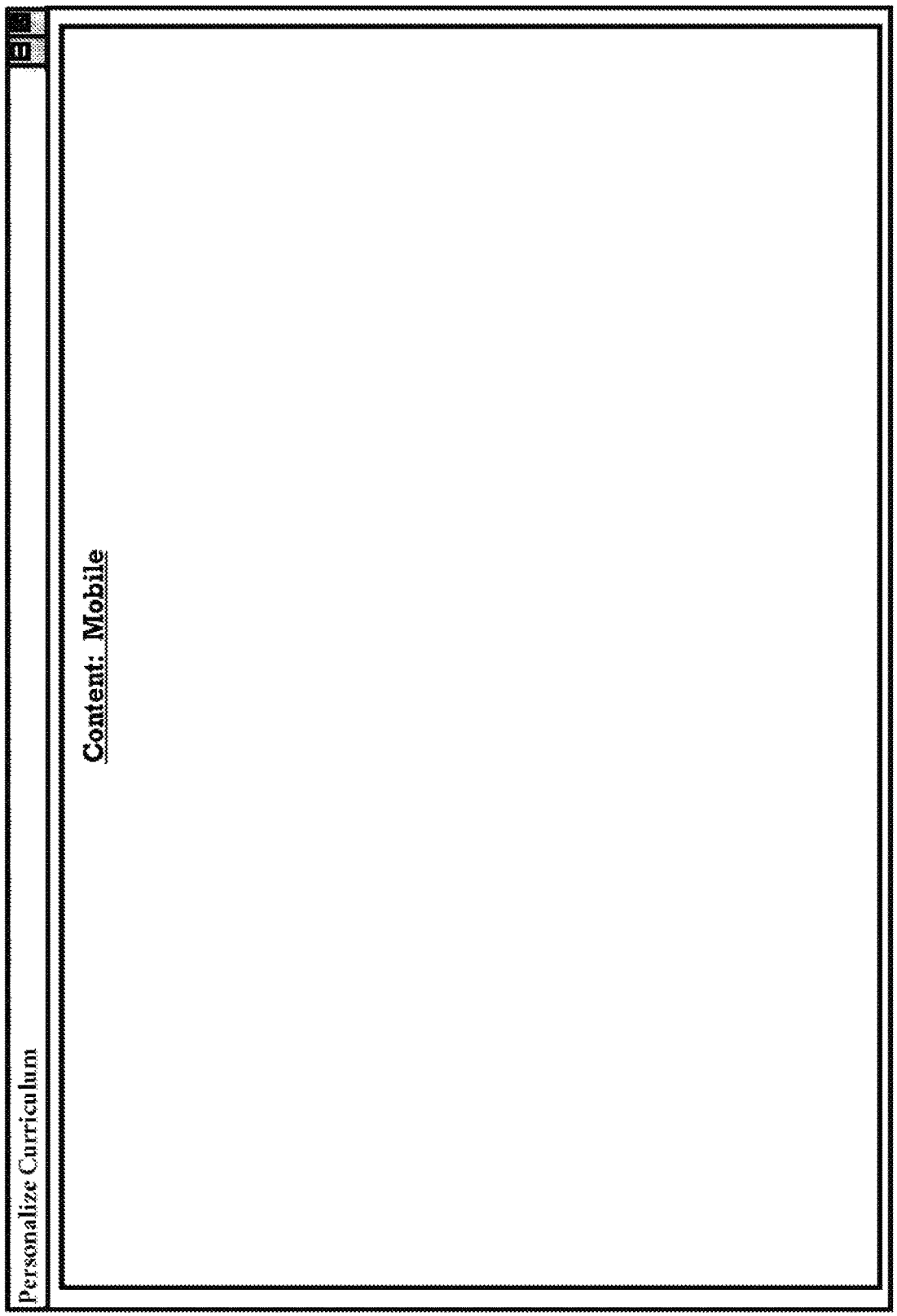
FIG. 29 is a UML 2 user interface diagram of an exemplary user interface for a Personalize Curriculum operation for enabling a Student at a Student Mobile Client to access educational or training Content under the control of the Presentation Control object of FIG. 22.
Figure 30:
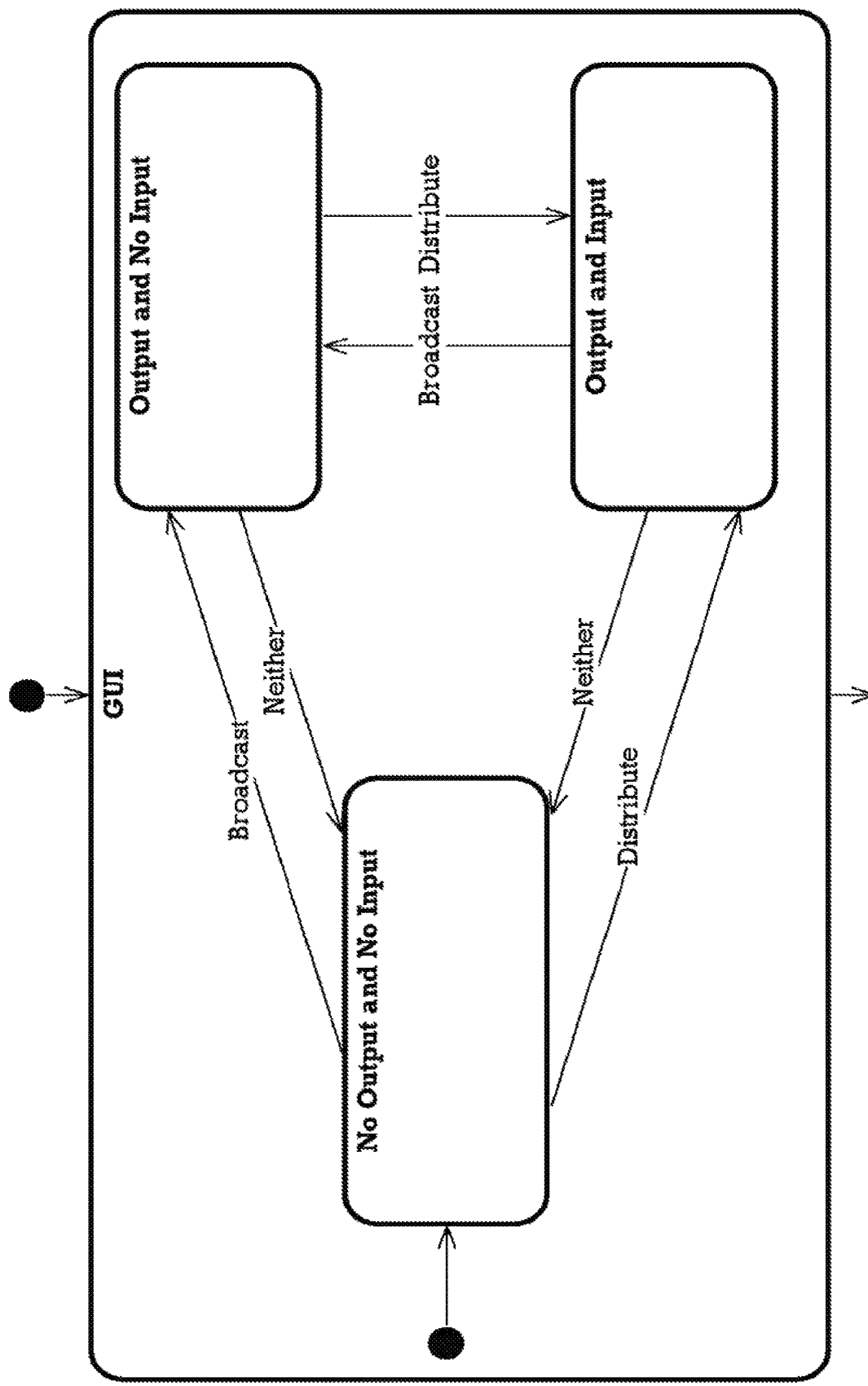
FIG. 30 is a UML 2 an exemplary state machine diagram of the Personalize Curriculum operation of FIG. 29.

FIGS. 29 and 30 how a Student would interact with any kind of Content object during a meeting of a Class using the Student App Client on the Student Mobile Client, invoking the Personalize Curriculum operation for an Interaction object.

The GUI object is instantiated at the Student Mobile Client to accept renderings from the Lectern Client. In coordination with the rendering states at the Lectern Client, the GUI object transitions between a No Output and No Input state when the current Lectern Client Controller object is in Preview Only state, an Output and No Input state when the current Lectern Client Controller object is in one of the Broadcast states, and an Output and Input state when the Lectern Client Controller object is in one of the Distribute states. In this way, under the control of the Teacher at the Lectern Client, the Student Mobile Clients have respectively blank screens, read-only screens and fully interactive screens.

Those skilled in the art will recognize that there is middle ground between fully deactivating and fully activating the input on Student Mobile Clients. One useful middle ground instead of full deactivation would be to accept at the Lectern Client a "Raised Hand" signal originating from Student Mobile Clients. A Notification of a Raised Hand signal would alert a Teacher that a change of pace in the presentation of the Lesson may be warranted. Should a Teacher accept the Raised Hand signal, that event might pause the presentation or might transition the presentation to a new state, for example a state that supports discussion thread/chat or whiteboard recording of questions and answers.

Those skilled in the art will also recognize that, depending on pedagogical preferences, it might be desirable to enable Students to interact with any kind of Content objects (Exposition objects, Demonstration objects or Test objects) and that it might therefore be desirable in some embodiments for the Exposition Control class to enable such, for example by including Distribute states.

Those skilled in the art will further recognize that further kinds of Interaction may sometimes be pedagogically desirable. For example, a Teacher may wish to enable individual Students or Student Groups to control the Teacher's screen (or the Student's or Student Group's screen) for Projection on the AV System Client or Broadcast to the Student Mobile Clients. Such Interactions would be recorded to a History object.

Those skilled in the art will still further recognize that the activation or deactivation of Student Mobile Client input may also be triggered by System events, for example the expiration of a countdown Timer object.

7. Reviewing Operations

Figure 31:
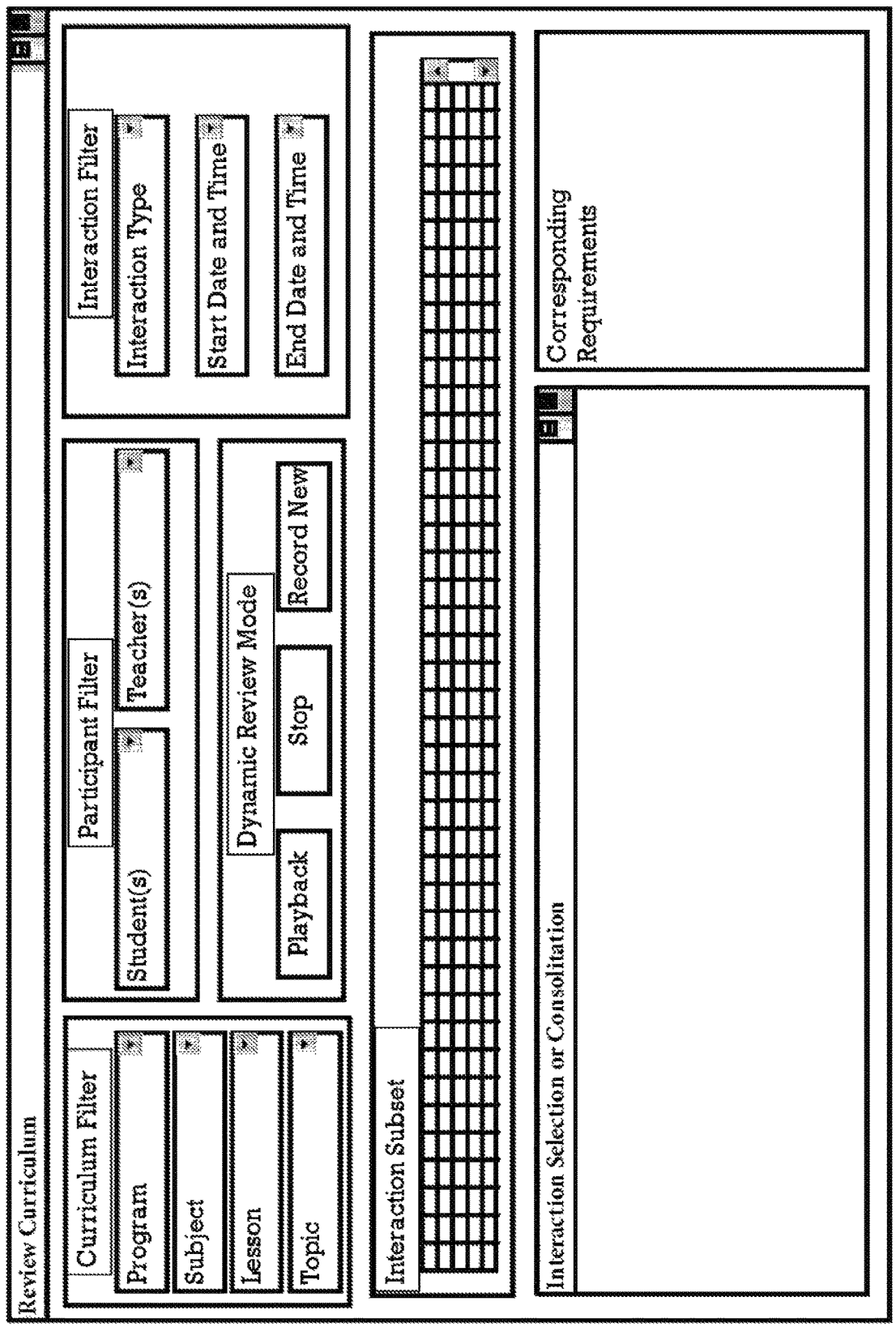
FIG. 31 is a UML 2 user interface diagram of an exemplary user interface for a Review Curriculum operation for enabling a Student at a Student Home Client to review his Interaction with the Lessons taught in a Class.

FIG. 31 shows how a Student would interact with his Interaction objects outside meetings of the Class, for example by connecting the Browser on his Student Home Client to the Learning Management Server and invoking the Review Curriculum operation. The Review Curriculum operation includes filtering capabilities analogous to those described above, such that the Student can filter his universe of Interaction objects by associated Program, Subject, Lesson, Topic, Teacher, or other Students who participated in the Interaction. The Student can also filter by Interaction Type, and by the Start Date and Time and End Date and Time of the Interaction.

This filtration will yield a tabulated Interaction Subset from which the Student can select one or more Interaction objects to review. If the Student makes a single Interaction Selection from the tabulated Interaction Subset, the corresponding Interaction object could be rendered directly. If the Student makes multiple simultaneous Interaction Selections, then a Consolidation might be rendered instead, such that for example depending on implementation if the Student selects multiple Test Results his aggregate Mark might be consolidated for rendering.

Relevant Corresponding Requirements for the Program and/or Subject might be presented as well so that the Student can understand his Interactions in the context of what is expected for successful completion of the Program and/or Subject.

Some types of Interaction object are dynamic in nature, for example Transcript Interactions. To review them, the student can opt to Playback (and Stop the Playback of) these Interaction objects. The Student may also wish to review by interacting anew with Content object previously presented during a meeting of a Class. To do so, he could chose to Record New his new interaction so that his universe of Interaction objects would thereafter include both an object recording his original in-class Interaction with the Content object and an object recording his new review Interaction with the Content object.

Figure 32:
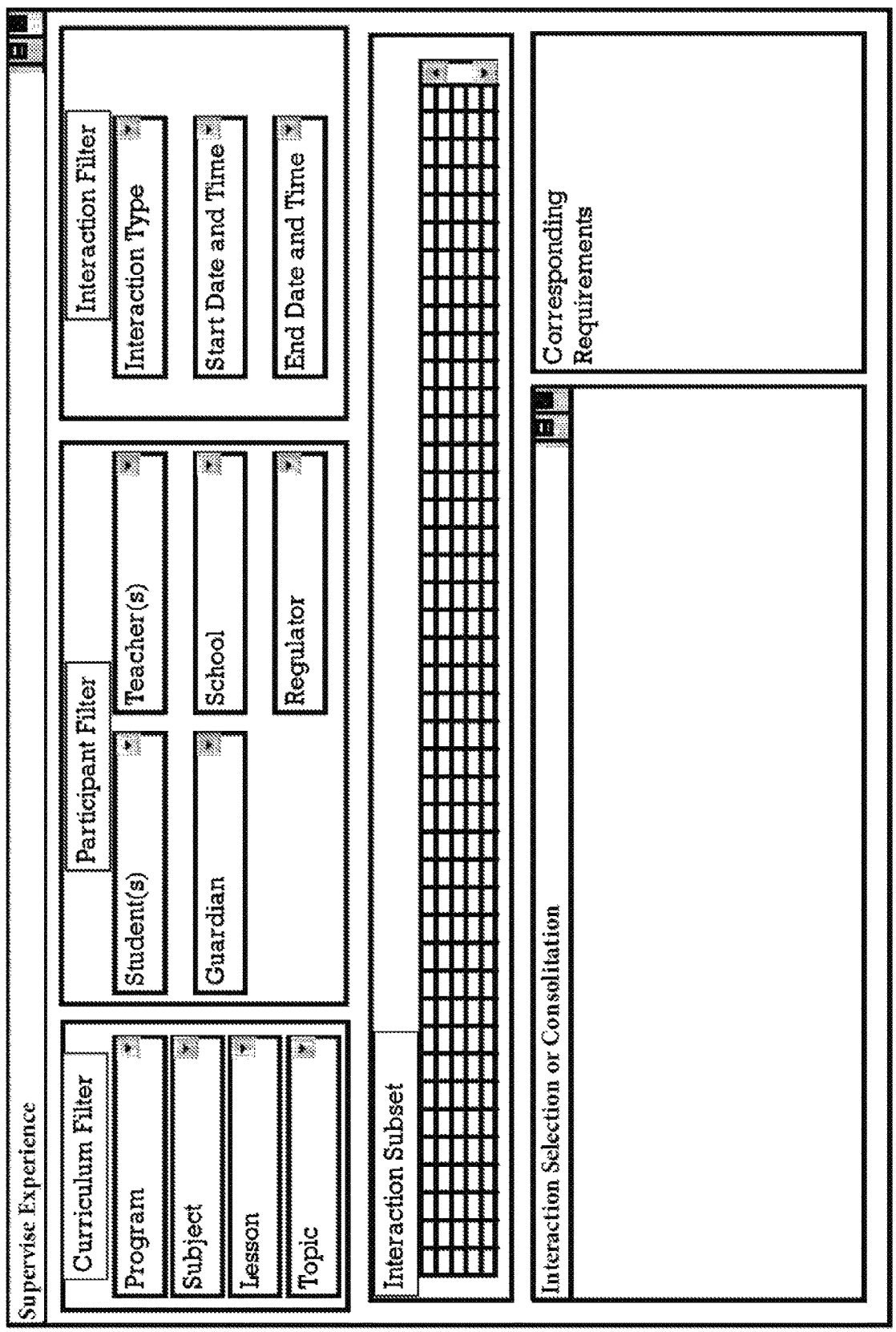
FIG. 32 is a UML 2 user interface diagram of an exemplary user interface for a Supervise Experience operation for enabling a Guardian of a Student at a Student Home Client to review Student's Interaction with the Lessons taught in a Class.

FIG. 32 shows how a Guardian would interact with his Student's Interaction objects, for example by connecting the Browser on his Student Home Client to the Learning Management Server and invoking the Supervise Experience operation.

The Supervise Experience operation and its associated user interface might be very similar to the Review Curriculum operation and its associated user interface. As embodied here, the Supervise Experience operation provides for additional filtering by Guardian, School and Regulator to help a Guardian to conveniently Supervise Experiences of a number of Students under his guardianship.

Figure 33:
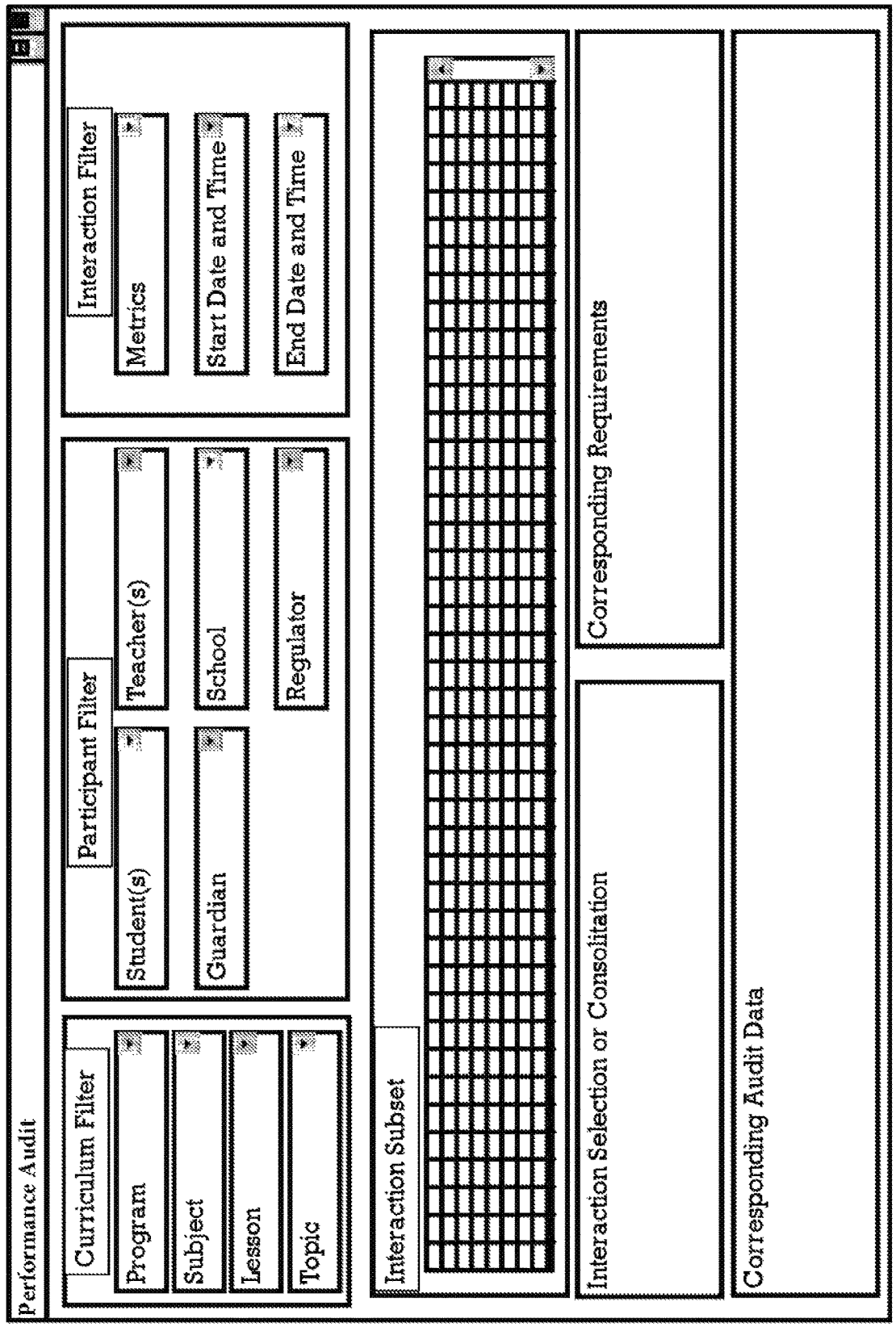
FIG. 33 is a UML 2 user interface diagram of an exemplary user interface for a Performance Audit operation for enabling an Auditor at an Auditor Client to audit the performance of a Student in a Class against corresponding Requirements of a Curriculum.

FIG. 33 shows how an Auditor would conduct a Performance Audit on a Student's Interaction objects, for example by connecting the Browser on his Auditor Client to the Learning Management Server and invoking the Audit Performance operation.

The Audit Performance operation and its associated user interface might be very similar to the Supervise Experience operation and its associated user interface. As embodied here, the Audit Performance operation provides for the creation and modification of Audit objects through the Corresponding Audit Data control in the user interface and focuses on only quantitative Interaction objects by filtering for Metric classes of objects.

Figure 34:
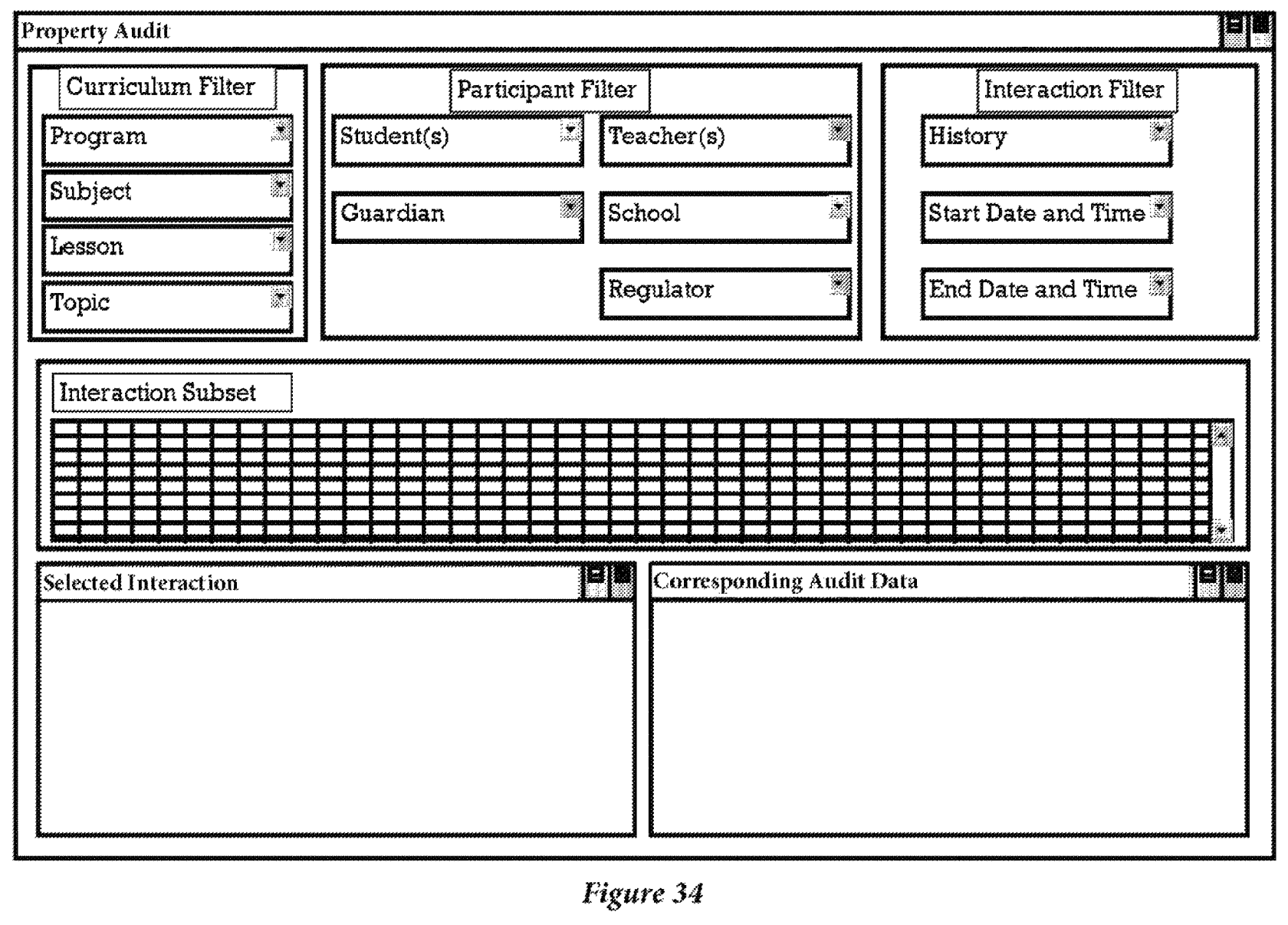

FIG. 34 shows how an Auditor would conduct a Propriety Audit on a Students Interaction objects, for example by connecting the Browser on his Auditor Client to the Learning Management Server and invoking the Audit Propriety operation.

The Audit Propriety operation and its associated user interface might be very similar to the Audit Performance operation and its associated user interface. As embodied here, the Audit Propriety operation focuses on only qualitative Interaction objects by filtering for History classes of objects.

8. Regulatory Operations

Figure 35:
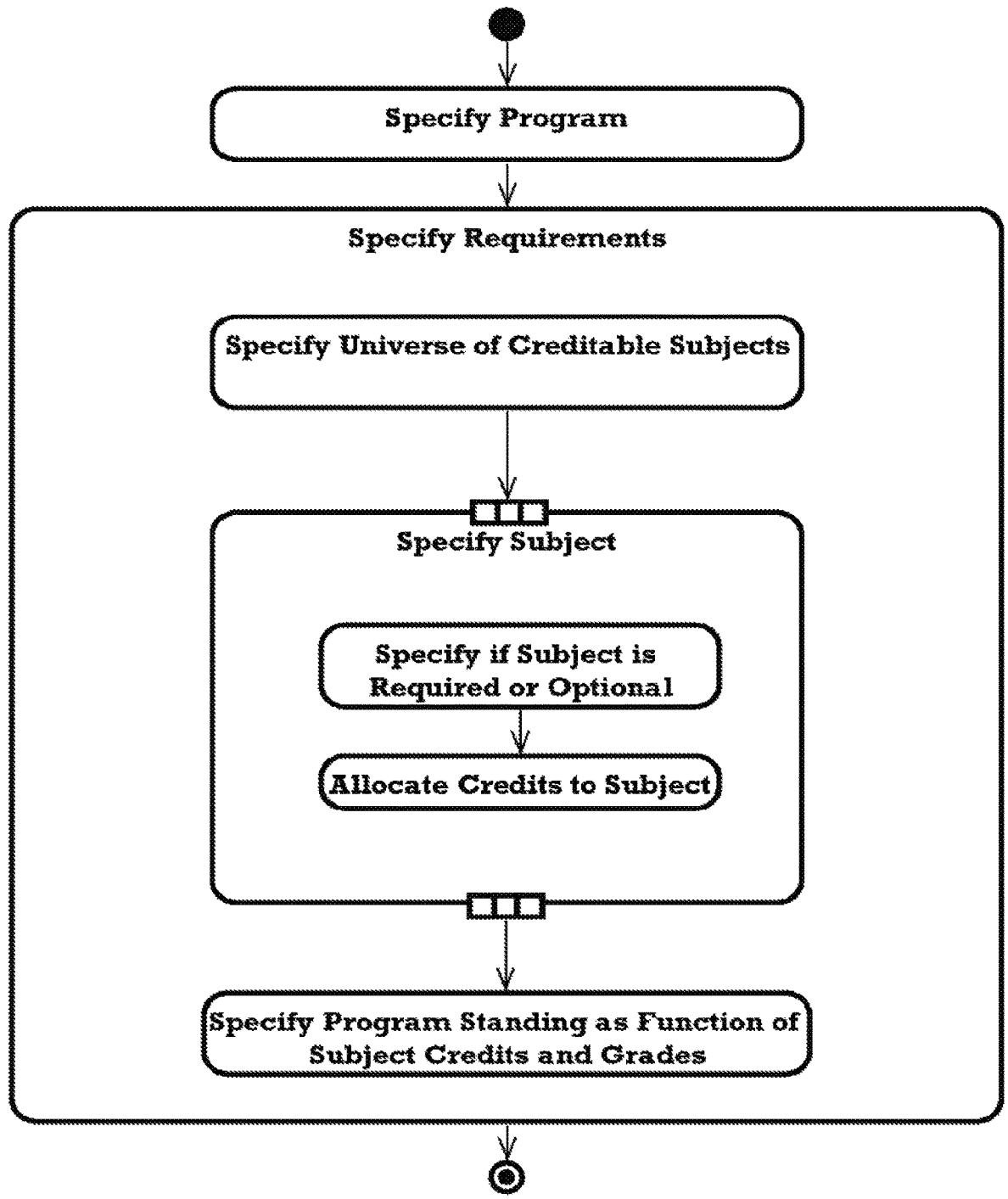
FIG. 35 is a UML 2 activity diagram of an exemplary method for a Regulate Program operation enabling a Regulator at a Regulator Server to regulate a Program in a Curriculum.

FIG. 35 shows one method for how a Regulator would set the Requirements attribute for a Program object by invoking the Regulate Program operation at the Regulator Server.

In a Specify Program activity, the Regulator would specify the Program, which might be as simple as setting the name of a new Program object or selecting the name of an existing Program object. This activity might include specifying other aspects of the Program object as well, for example prerequisites.

In a Specify Requirements composite activity, the Regulator would specify the Requirements for successful completion of the Program. In the embodiment illustrated, this composite activity would include a Specify Universe of Creditable Subjects activity, a Specify Subject activity, and a Specify Program Standing as Function of Subject Credits and Grades activity.

In the Specify Universe of Creditable Subjects activity, the Regulator would specify those Subjects the completion of which would advance a Student toward completion of the Program.

For each Subject in the Specified Universe of Creditable Subjects, the Regulator would perform the Specify Subject activity, in which the Regulator would Specify if the Subject is Required or Optional and would Allocate Credits to the Subject.

Finally, the Regulator would perform the Specify Program Standing as Function of Subject Credits and Grades activity to define the criteria for successful completion of the Program, which might for example include a minimum number of credits for required Subjects, a minimum number of credits for optional Subjects, and a minimum grade in specific Subjects and/or in aggregate. This activity might be influenced by or performed in concert with Publishers so that the weighting is not inconsistent with the amount and kind of relevant Content available to Students.

Those skilled in the art will recognize that other activities could be useful in regulating a Program and that once a Program has been setup a Regulator might want to revise its Requirements by performing only some of the foregoing activities.

Figure 36:
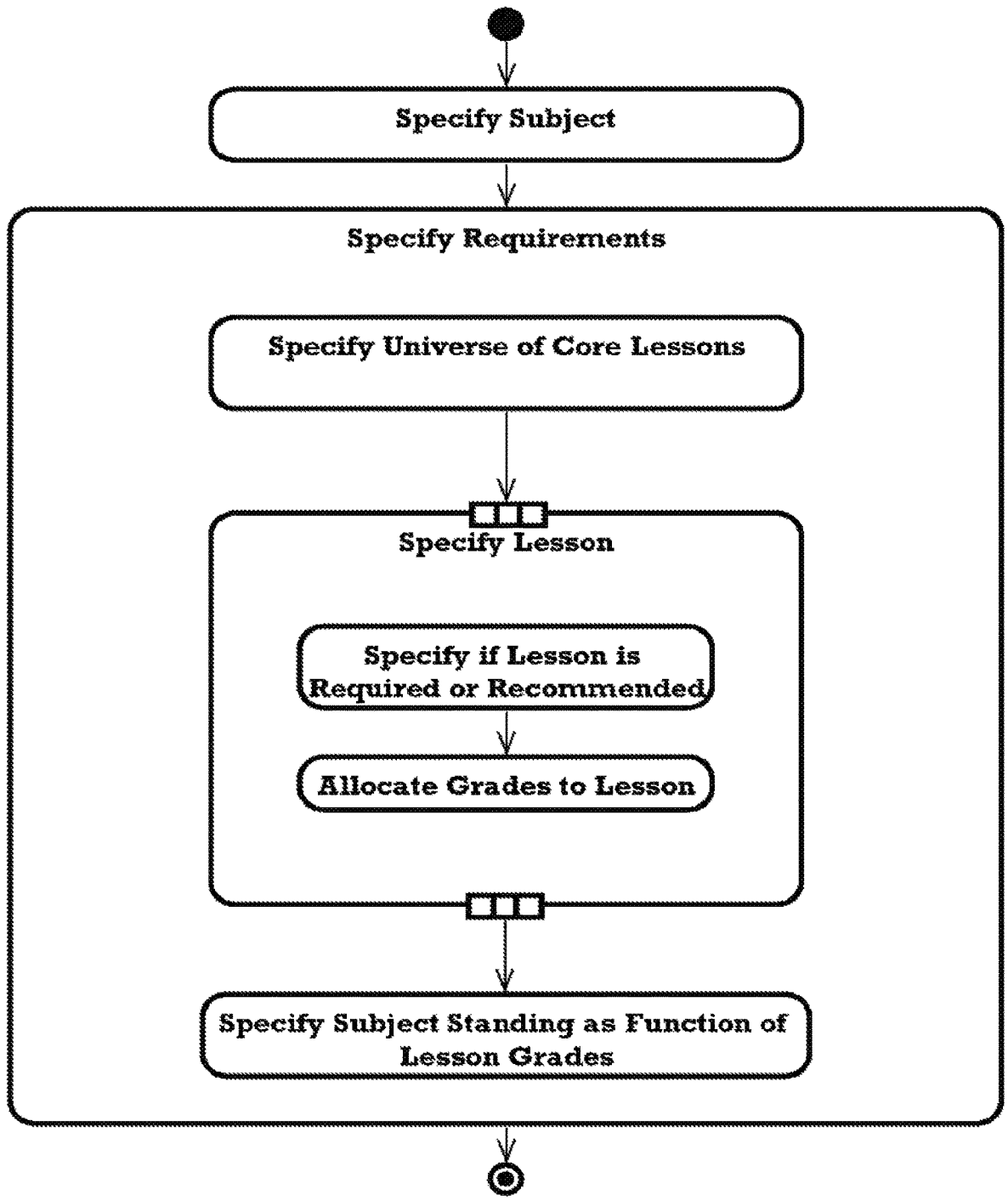
FIG. 36 is a UML 2 activity diagram of an exemplary method for a Regulate Subject operation enabling a Regulator at a Regulator Server to regulate a Subject in a Curriculum.

FIG. 36 shows one method for how a Regulator would set the Requirements attribute for a Subject object by invoking the Regulate Subject operation at the Regulator Server.

In a Specify Subject activity, the Regulator would specify the Subject, which might be as simple as setting the name of a new Subject object or selecting the name of an existing Subject object. This activity might include specifying other aspects of the Subject object as well, for example prerequisites.

In a Specify Requirements composite activity, the Regulator would specify the Requirements for successful completion of the Subject. In the embodiment illustrated, this composite activity would include a Specify Universe of Core Lessons activity, a Specify Lesson activity, and a Specify Subject Standing as Function of Lesson Marks activity.

In the Specify Universe of Core Lessons activity, the Regulator will specify those Lessons the completion of which would advance a Student toward completion of the Subject.

For each Lesson in the Specified Universe of Core Lessons, the Regulator would perform the Specify Lesson activity, in which the Regulator would Specify if the Lesson is Required or Recommended and would Allocate Grades to the Lesson.

Finally, the Regulator would perform the Specify Subject Standing as Function of Lesson Grades activity to define the criteria for successful completion of the Subject, which might for example include a minimum Grade for specific required Lessons and a minimum aggregate for all Lessons. This activity might be influenced by or performed in concert with Publishers so that the weighting is not inconsistent with the amount and kind of relevant Content available to Students.

Those skilled in the art will recognize that other activities could be useful in regulating a Subject and that once a Subject has been setup a Regulator might want to revise its Requirements by performing only some of the foregoing activities.

9. Lesson Planning Operations

Figure 38:
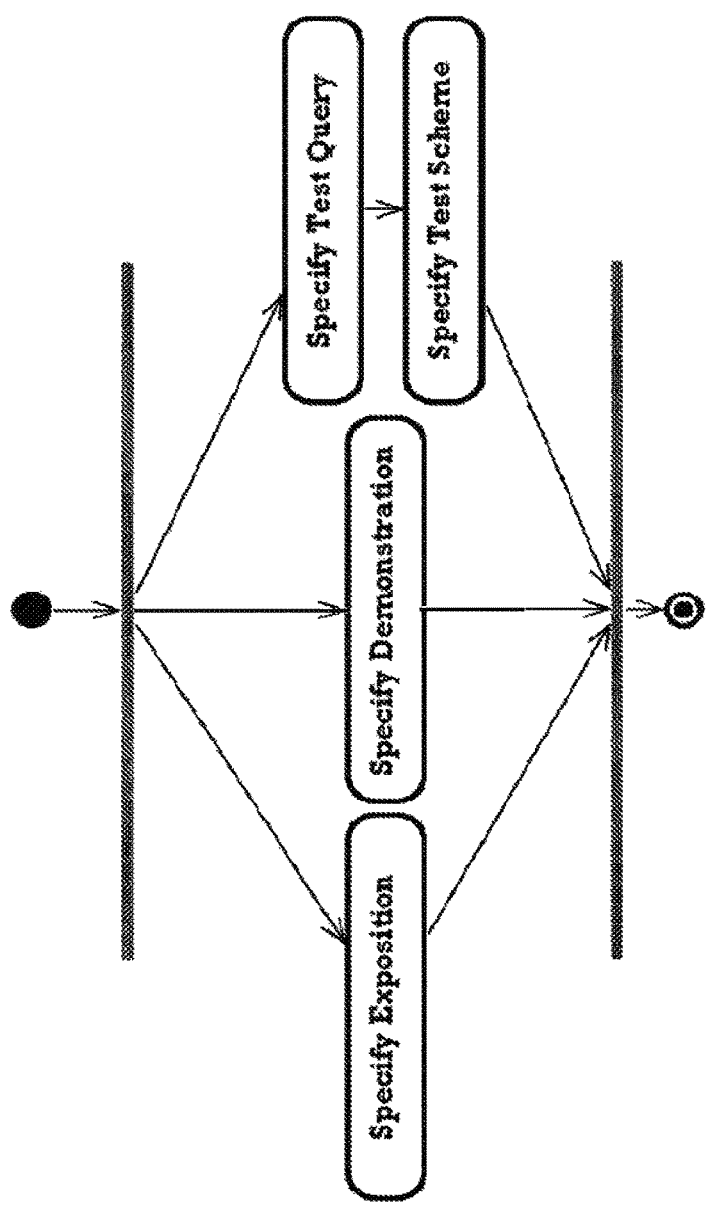
FIG. 38 is a UML 2 an exemplary activity diagram detailing a Specify Content activity in the method of the Prepare Lesson operation of FIG. 35.
Figure 37:
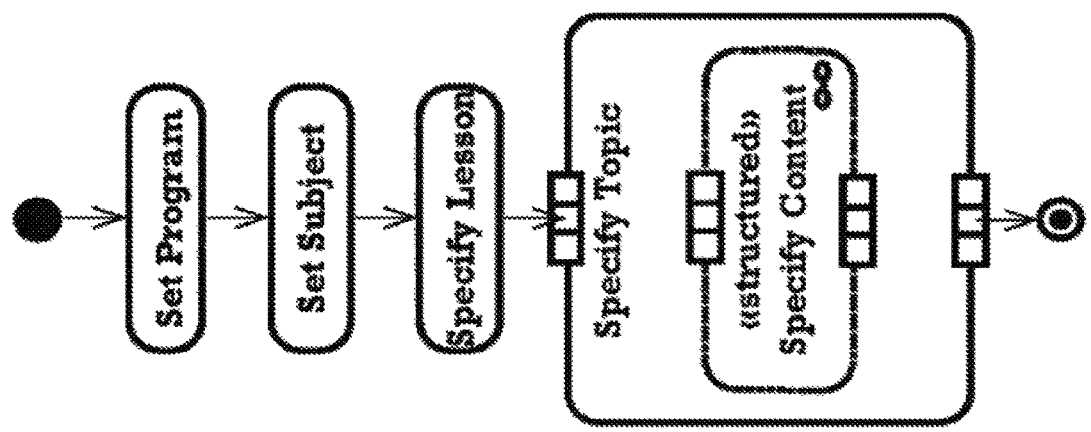
FIG. 37 is a UML 2 activity diagram of an exemplary method of a Prepare Lesson operation for enabling a Teacher at a Teacher Client or a Lectern Client to prepare a Lesson in a Curriculum.

FIGS. 37 and 38 show one method of how a Teacher would prepare or revise a Lesson object by invoking the Prepare Lesson operation, for example by connecting the Browser on his Teacher Client to the Learning Management Server or by activating the Lectern App Client on the Lectern Client.

In Set Program and Set Subject activities, the Teacher would identify existing Program(s) and Subject(s) that the Lesson object would support.

In a Specify Lesson activity, the Teacher would specify the Lesson which might be as simple as setting the name of a new Lesson object or selecting the name of an existing Lesson object. This activity might include specifying other aspects of the Lesson object as well, for example instructions for other Teachers who might present this Lesson.

In a Specify Topic activity, the Teacher would specify one or more Topic objects to support the Lesson. This activity might be as simple as setting the name of a new Topic object or selecting the name of an existing Topic object to reuse with the current Lesson. This activity might include specifying other aspects of the Topic object as well, for example notes on how past Students responded to the Topic.

For each Topic object, there is a Specify Content activity, in which the Teacher would specify Content objects to communicate the Topic, for example an Exposition object, a Demonstration object and/or a Test object. The Teacher might create these Content objects or might simply associate freely available Content objects or Content objects licensed from a Publisher to the Topic object. For the Test objects, there are both Specify Test Query and Specify Test Scheme activities, the former specifying the question(s) to be posed to the Students and the former specifying (including for automatic marking by the System) a mapping of Student Responses to Student Marks and Subject grading Requirements.

Those skilled in the art will appreciate that multiple Teachers could invoke the Prepare Lesson operation concurrently or consecutively to collaborate on the preparation of a particular Lesson or to customize different versions of a particular Lesson.

Those skilled in the art will also recognize that it may be beneficial to provide for additional attributes for the Lesson, Topic or Content classes. For example, it might be helpful to track the time that each of these objects is expected to take, thus providing a way for the Teacher to evaluate how much content should go into one Lesson or one meeting of a Class. The actual meeting may or may not mandate that this time specification be adhered to. The time spent presenting each of these objects could be separately recorded and subsequently, reports might be generated to identify the actual time spent in comparison to the time anticipated by the teacher. This data may be useful to an Auditor, Regulator or Teacher, for example, to adjust the Lesson, Topic or Content for maximum efficacy.

10. Publishing Operations

FIG. 39-FIG. 44 show a variety of methods for how a Publisher would make publications available to the System by invoking the Publish Curriculum operation at the Publisher Server.

Figure 39:
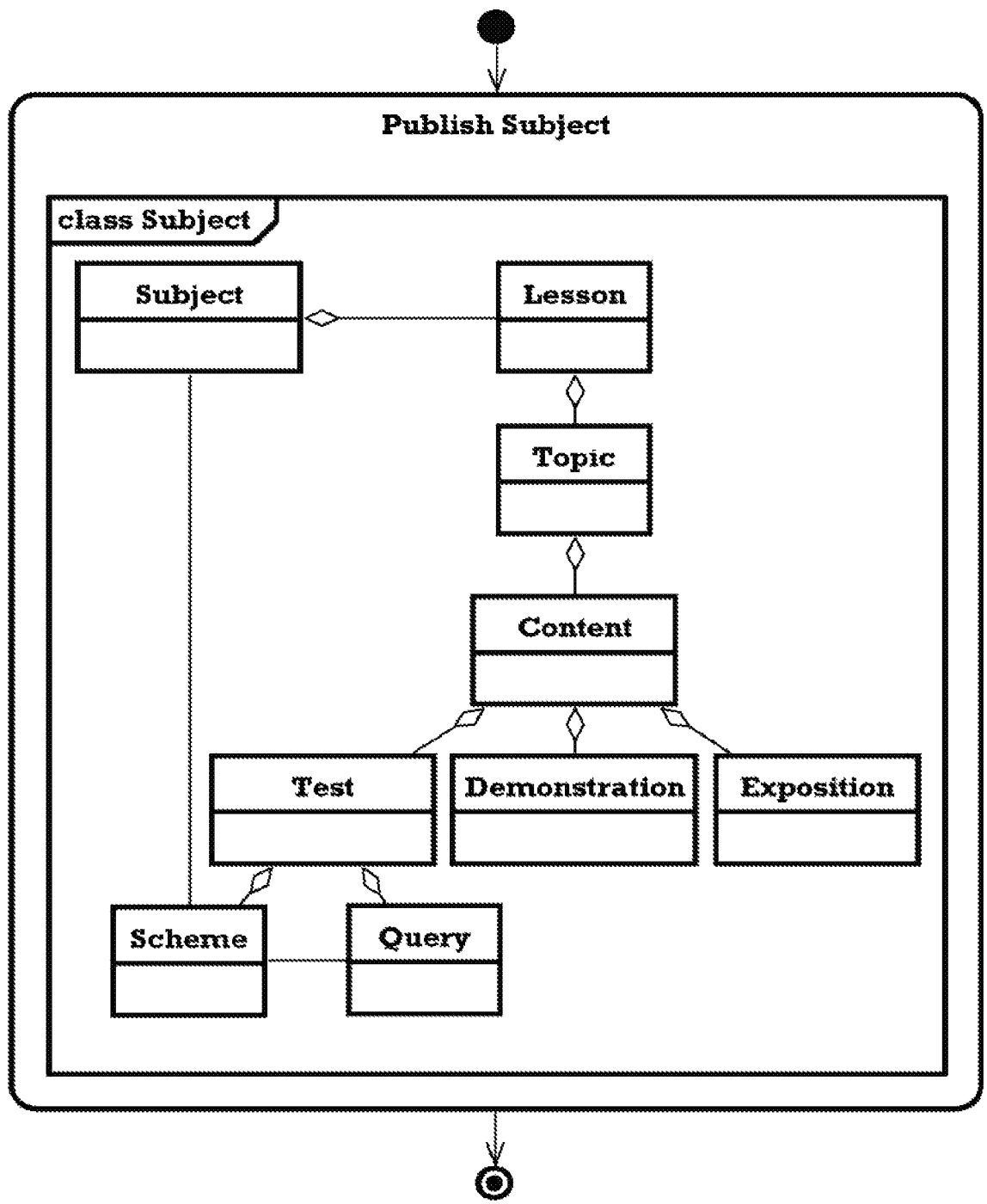
FIG. 39 is a UML 2 activity diagram of an exemplary Publish Subject method of a Publish Curriculum operation for enabling a Publisher at a Publisher Server to publish a Subject in a Curriculum.

FIG. 39 shows a comprehensive method to Publish Curriculum, in which the Publisher publishes a complete family of objects for a particular Subject, including Lesson objects, Topic objects and Content objects including Exposition, Demonstration and Test objects. By taking this comprehensive approach and working closely with a Regulator, the Publisher can provide Scheme objects (and the Regulator can certify the Scheme objects) to enable fully automatic marking of Test objects in that Scheme objects map Student Response objects comprehensively to the grading Requirements for the Subject as a whole. In a less automated embodiment, such correlations may be provided informationally as attributes.

Figure 40:
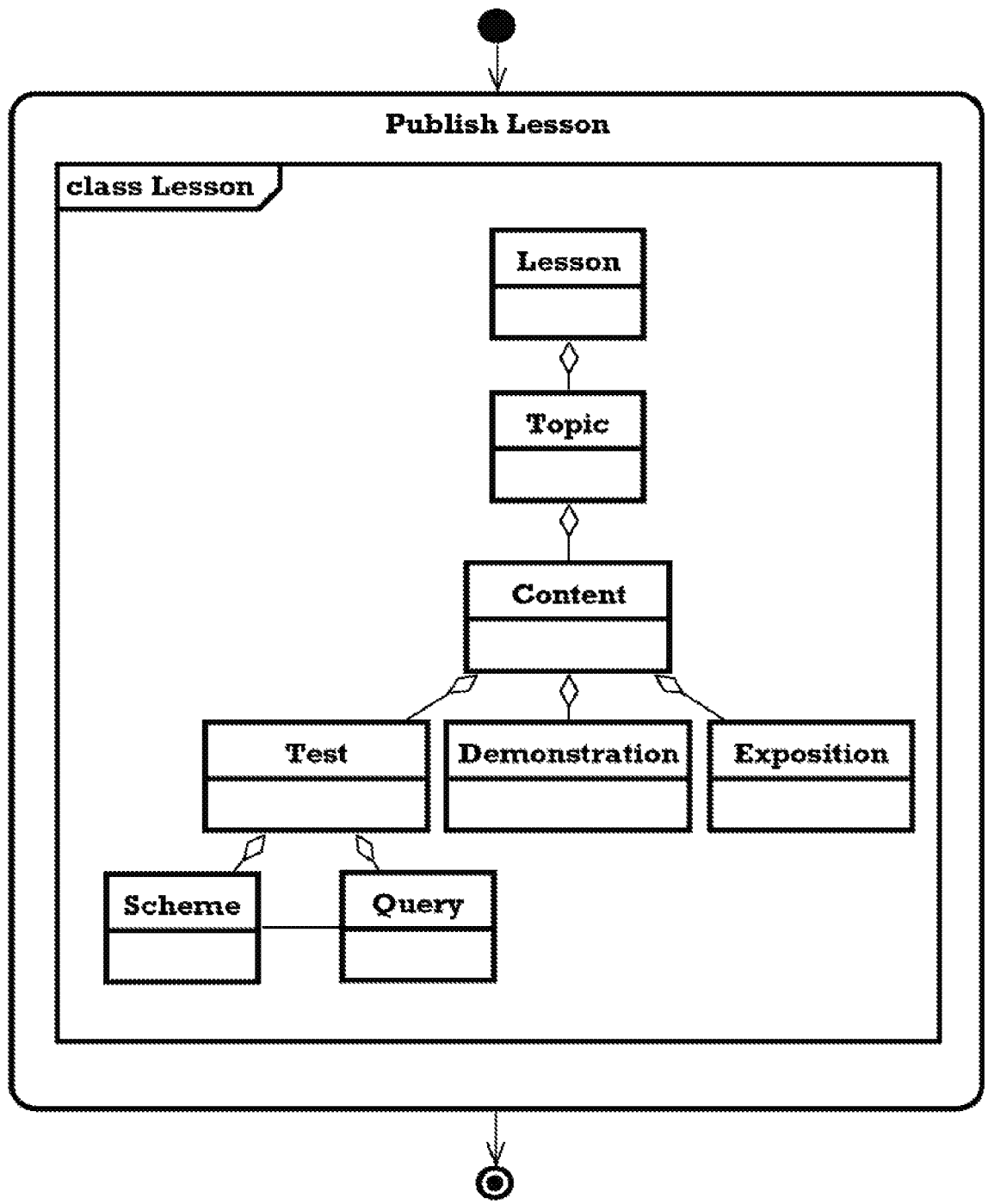
FIG. 40 is a UML 2 activity diagram of an exemplary Publish Lesson method of a Publish Curriculum operation for enabling a Publisher at a Publisher Server to publish a Lesson in a Curriculum.

FIG. 40 shows a slightly more modest method to Publish Curriculum, in which the Publisher publishes a complete family of objects for a discrete Lesson. In this discrete Lesson approach, the Scheme objects can automate marking at the Lesson level but may not map to the grading Requirements for a Subject as a whole. In a less automated embodiment, such correlations may be provided informationally as attributes.

Figure 41:
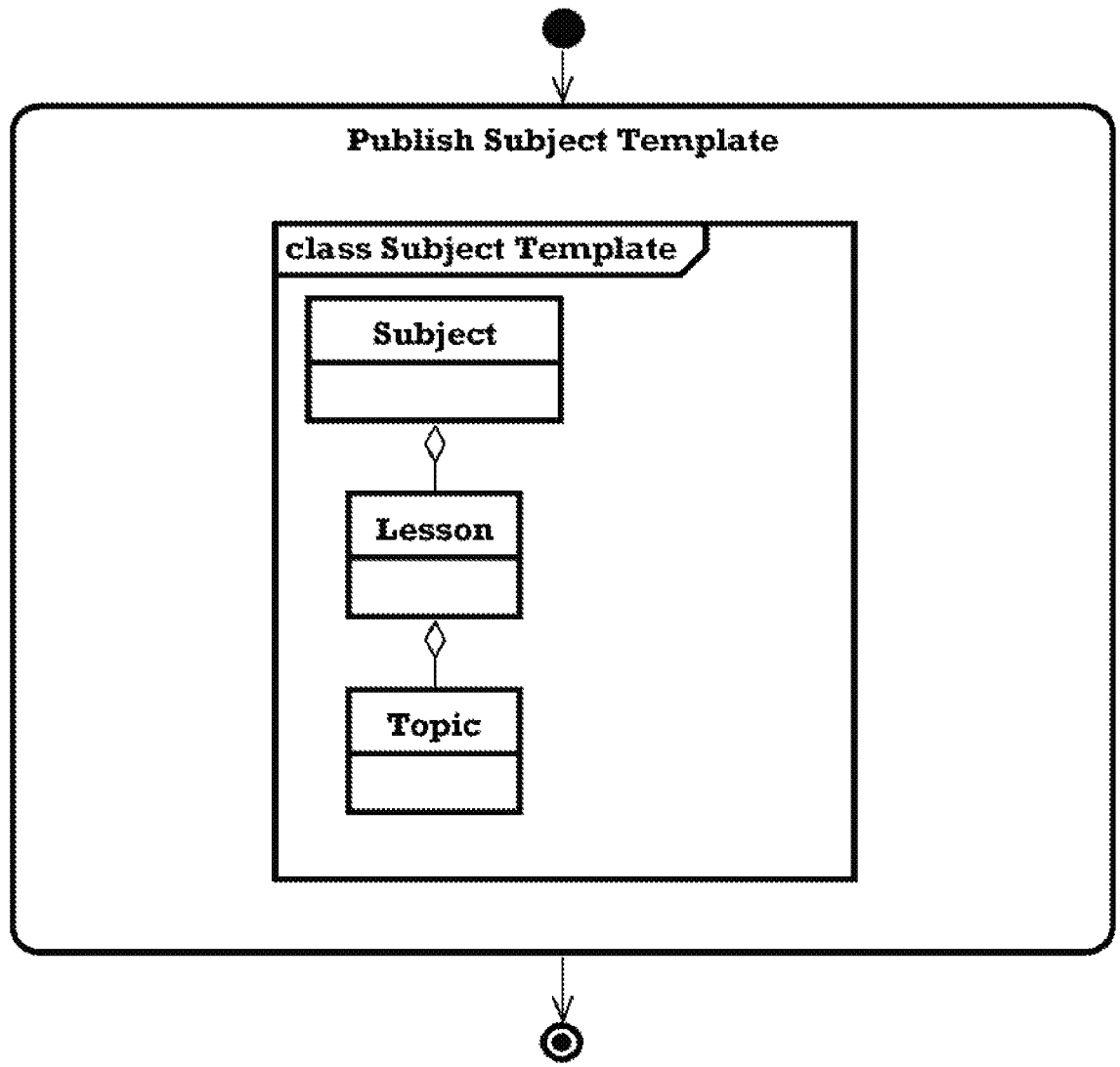
FIG. 41 is a UML 2 activity diagram of an exemplary Publish Subject Template method of a Publish Curriculum operation for enabling a Publisher at a Publisher Server to publish a Subject Template in a Curriculum.

FIG. 41 shows another method to Publish Curriculum, in which the Publisher publishes a Subject Template, being a logical arrangement of Lessons (Regulator-required, Regulator-recommended and Publisher-supplementary) and supporting Topics without Content objects, such that a Teacher is provided with a detailed outline for a Subject but follows his own pedagogy in creating or selecting Content objects to elucidate the Topics.

Figure 42:
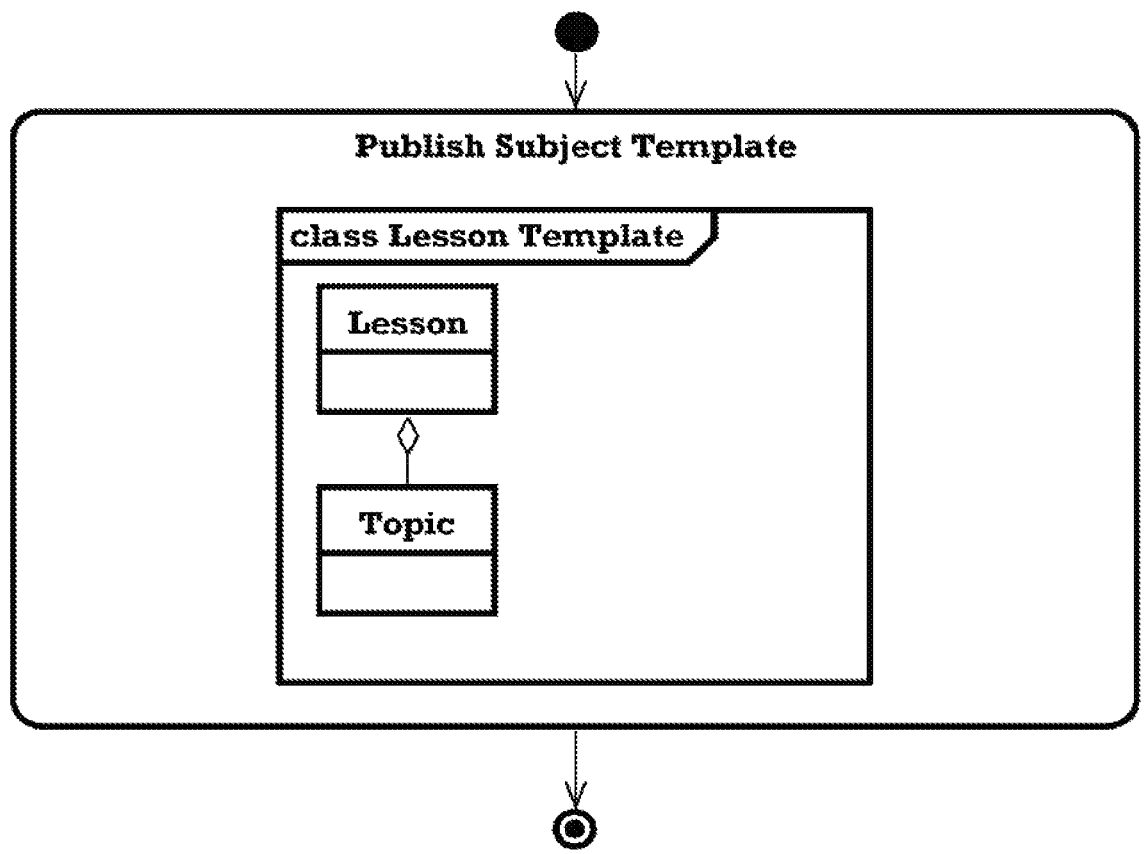
FIG. 42 is a UML 2 activity diagram of an exemplary Publish Lesson method of a Publish Curriculum operation for enabling a Publisher at a Publisher Server to publish a Lesson Template in a Curriculum.

FIG. 42 shows a more modest method to Publish Curriculum, in which the Publisher publishes a Lesson Template, being a logical arrangement of Topics without Content objects, such that a Teacher is provided with a detailed outline for a Lesson but follows his own pedagogy in creating or selecting Content objects to elucidate the Topics.

Figure 43:
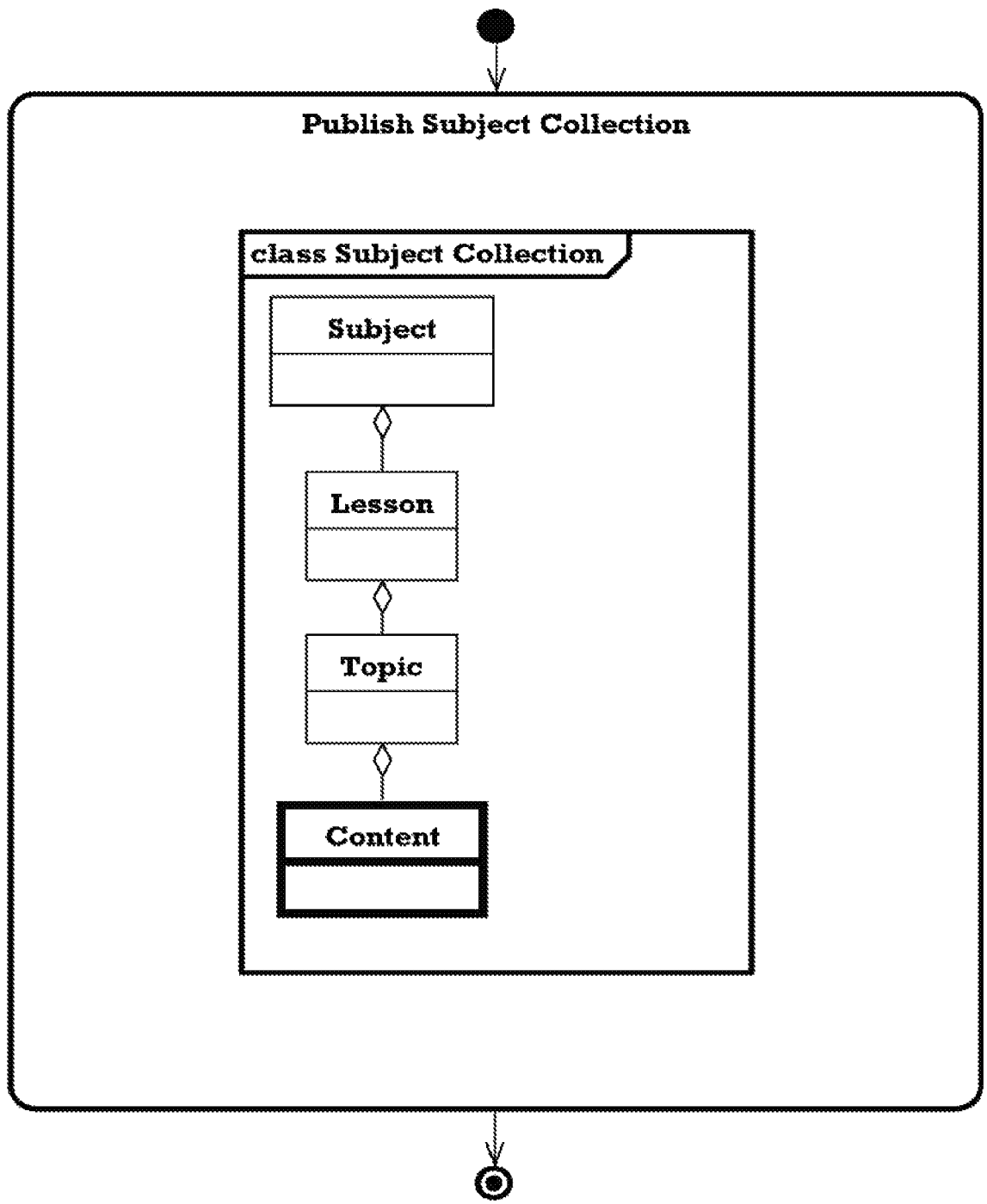
FIG. 43 is a UML 2 activity diagram of an exemplary Publish Subject Collection method of a Publish Curriculum operation for enabling a Publisher at a Publisher Server to publish a Subject Collection in a Curriculum.

FIG. 43 shows yet another method to Publish Curriculum, in which the Publisher publishes a Subject Collection of Content objects, being a Collection of Content objects specifically selected by the Publisher for their ability to elucidate Lessons and Topics in a particular Subject. In this method, no Subject, Lesson or Topic objects are published, but the Content objects may be provided in such a way as to easily sort, filter or otherwise associate them (for example using metadata tags) with Lessons or Topics that are commonly taught in a Subject or that have been Required for a Subject by a Regulator. Those skilled in the art will recognize that such Content objects might be Exposition objects, Demonstration objects, Test objects or a combination.

Figure 44:
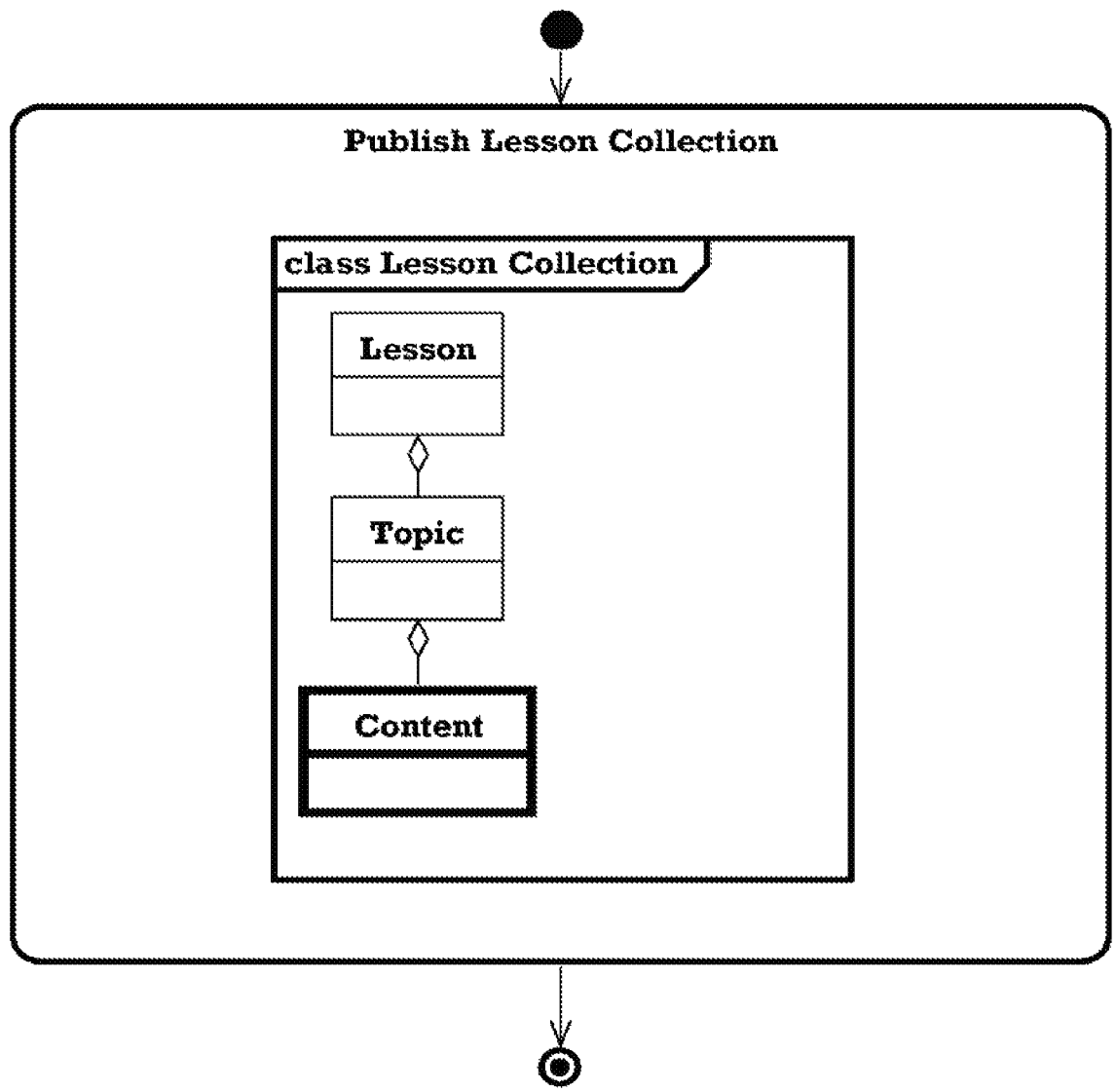
FIG. 44 is a UML 2 activity diagram of an exemplary Publish Lesson Collection method of a Publish Curriculum operation for enabling a Publisher at a Publisher Server to publish a Lesson Collection in a Curriculum.

FIG. 44 shows a more modest method to Publish Curriculum, in which the Publisher publishes a Lesson Collection of Content objects, being a Collection of Content objects specifically selected by the Publisher for their ability to elucidate Topics in a particular Lesson. In this method, no Lesson or Topic objects are published, but the Content objects may be provided in such a way as to easily sort, filter or otherwise associate them (for example using metadata tags) with Topics that are commonly taught in a Lesson. Those skilled in the art will recognize that such Content objects might be Exposition objects, Demonstration objects, Test objects or a combination.

Those skilled in the art will recognize from the above six examples of methods to Publish Curriculum that there are many other methods that can be implemented by modifying or combining the methods of these examples.

Those skilled in the art will also recognize that a Publisher may use the System to publish Content as unrelated to any particular Program, Subject, Lesson or Topic—extra-curricular content—that a Teacher may find useful for unanticipated purposes and may integrate into Lessons or otherwise as the Teacher sees fit.

DESCRIPTION SUMMARY

Thus, it will be seen from the foregoing embodiments and examples that there has been described a way to manage education and training workflows.

Those skilled in the art will recognize that the System helps to provide a certification of learning outcomes, as specified in Curriculum Requirements set by a Regulator (a certifying body) that includes a set of objectives defined to realize a Program goal—whether it be an educational program, a training program or more informally a set of outcomes defined by a trainer/instructor/regulator to define an ad-hoc program including extra-curricular learning. The System fosters the Interaction of Students with the specified Program/Subjects/Lessons/Topics/Content and documents those Interactions to evidence when and how these outcomes have been satisfied during the training/education process. Testing Schemes map Student Responses to Lesson Marks and Subject grade Requirements, for either automatic marking or standards-based manual marking. An Auditor can audit the performance (and more broadly propriety) of the Student Interactions against the Curriculum Requirements. And so the System can certify that desired outcomes have been achieved when a Program has been completed successfully and thus a 'degree' or 'certificate' has been earned or a particular extra-curricular activity has simply been completed.

While specific embodiments of the invention have been described and illustrated, such embodiments should be considered illustrative of the invention only and not as limiting the invention as construed in accordance with the accompanying claims.

It will be understood by those skilled in the art that various changes, modifications, additions, deletions and substitutions can be made to the foregoing embodiments without departing from the principle and scope of the invention expressed in the claims made herein.

Very useful embodiments of the invention could be created with less expansive or coarser grained class structures or network topologies. For example, a simpler but still useful System might focus only on Teachers preparing Lessons that include Publisher Content and presenting Lessons to Students, and in that regard omit the Regulator Server, School Server, Auditor Client and Guardian Client and have a Curriculum without Programs and Subjects.

Similarly, very useful embodiments of the invention could be created by incorporating its teachings into more expansive or finer grained class structures or network topologies.

Class structures in accordance with the teachings of the invention can be usefully integrated into systems having different hierarchies through the use of metadata tags, for example as attributes of the Lesson class.

While the invention has been described as having particular application for managing education and training workflows, those skilled in the art will recognize it has wider application.

The invention claimed is:

1. A method comprising:
uploading, by a host processor, to a remote server and from a teacher device a payload of a content object to be presented;
providing, by the host processor, a link to the remote server for a client device to access the payload of the content object to be presented, such that the teacher device and the client device are configured to interact, while the teacher device and the client device are simultaneously reviewing different displayed interactive pages of the payload of the content object,
wherein the remote server receives a request from a browser on the client device to connect the browser to the remote server,
wherein the remote server re-directs the client device to a URL that contains the content object,
wherein the remote server transmits to the browser of the client device the payload of the content object to be presented,
wherein the client device performs first reviews and first controls of first displayed interactive pages of the payload of the content object simultaneously as the teacher device, but independent of the teacher device that is separately and simultaneously performing second reviews and second controls of second displayed interactive pages of the payload of the content object, and
wherein the first reviews, the first controls and the first displayed interactive pages of the payload of the content object are different from the second reviews, the second controls and the second displayed interactive pages of the payload of the content object.

2. The method of claim 1, wherein the payload of the content object is a live stream, and the client device performs the first reviews and the first controls of the functionality of the first displayed interactive pages of the live stream, independent of the teacher device that is separately and simultaneously performing the second reviews and the second controls of the functionality of the second displayed interactive pages of the live stream.

3. The method of claim 1, wherein the payload of the content object includes multiple payloads.

4. The method of claim 1, wherein the payload of the content object includes layers of payloads, and the client device accesses first displayed interactive pages of one or more of the layers of the payloads, independent of the teacher device that is separately and simultaneously accessing second displayed interactive pages of one or more of the layers of the payloads, wherein the first displayed interactive pages of one or more of the layers of the payloads are different from the second displayed interactive pages of one or more of the layers of the payloads.

5. The method of claim 1, wherein the payload of the content object includes layers of payloads presented simultaneously on a same screen, and the client device performs first controls and first views of first displayed interactive pages of one or more of the layers of the payloads presented simultaneously on the same screen, independent of the teacher device that is separately and simultaneously performing second controls and second views of second displayed interactive pages of one or more of the layers of the payloads.

6. The method of claim 1, wherein the host processor also controls the payload, independent of the teacher device that is separately and simultaneously controlling the payload.

7. The method of claim 1, wherein the client device performs first reviews and first controls of first displayed interactive pages of the functions of at least one of marking up an image in real time, actions on a whiteboard, viewing a document, viewing a question object, viewing an outcome of a question object, viewing an explanation screen or viewing a show object, independent of the teacher device that is separately and simultaneously performing second reviews and second controls of second displayed interactive pages of the functions, wherein the first reviews, the first controls and the first displayed interactive pages are different from the second reviews, the second controls and the second displayed interactive pages.

8. The method of claim 1, further comprising uploading, by the host processor, annotations on top of a frame in a transparent layer over the payload of the content object.

9. The method of claim 1, further comprising uploading, by the host processor, annotations on top of a frame in a transparent layer over the payload of the content object, wherein the annotations include marking up an image in real time.

10. The method of claim 1, further comprising uploading, by the host processor, annotations on top of a frame in a transparent layer over the payload of the content object, wherein the remote server transmits to the browser the annotation with the payload to be presented.

11. The method of claim 1, wherein the client device controls, independent of the teacher device, the functions of viewing a show object comprising at least one of a media item or a video.

12. The method of claim 1, wherein the client device performs first reviews and first controls of first displayed interactive pages of the functions of viewing an outcome of a question object that comprises at least one of an individual response, a summary response, or objects that include responses that are drawn, independent of the teacher device that is separately and simultaneously performing second reviews and second controls of second displayed interactive pages of the functions, wherein the first reviews, the first controls and the first displayed interactive pages are different from the second reviews, the second controls and the second displayed interactive pages.

13. The method of claim 1, wherein the host processor includes a web server to exchange data with a browser on at least one of a student home client, a student mobile client, a teacher client, a lectern client, a regulator server or an auditor client.

14. The method of claim 1, further comprising receiving, by the host processor, a review curriculum operation that filters interaction objects by at least one of program, subject, lesson, topic, teacher, other students who participated in the interaction, interaction type, start date and time of the interaction, or end date and time of the interaction.

15. The method of claim 1, further comprising receiving, by the host processor and from a browser on a guardian client, a supervise experience operation that filters by at least one of guardian, school or regulator.

16. The method of claim 1, further comprising supplementing, by the host processor, the payload of the content object with media from at least one of a publisher network or an internet site.

17. The method of claim 1, further comprising receiving, by the host processor and from a browser on an auditor client, an audit performance operation that conducts a performance audit on student interaction objects.

18. The method of claim 1, further comprising receiving, by the host processor and from a browser on an auditor client, an audit proprietary operation that conducts a proprietary audit on student interaction objects.

19. The method of claim 1, further comprising receiving, by the host processor and from a browser on a teacher client, a prepare lesson operation that at least one of prepares or revises a lesson object.

20. The method of claim 1, wherein the browser is an app.

21. The method of claim 1, wherein the link is a uniform resource locator (URL).

22. The method of claim 1, wherein the providing, by the host processor, the link comprises providing a refreshed link.

23. The method of claim 1, wherein the providing, by the host processor, the link comprises providing a refreshed link, wherein the refreshed link includes data about a current location of a video.

24. A system comprising:
a host processor; and
a tangible, non-transitory memory configured to communicate with the processor,
the tangible, non-transitory memory having instructions stored thereon that, in response to execution by the processor, cause the processor to perform operations comprising:
uploading, by the host processor, to a remote server and from a teacher device a payload of a content object to be presented;
providing, by the host processor, a link to the remote server for a client device to access the payload of the content object to be presented, such that the teacher device and the client device are configured to interact, while the teacher device and the client device are simultaneously reviewing different displayed interactive pages of the payload of the content object,
wherein the remote server receives a request from a browser on the client device to connect the browser to the remote server,
wherein the remote server re-directs the client device to a URL that contains the content object,
wherein the remote server transmits to the browser of the client device the payload of the content object to be presented,
wherein the client device performs first reviews and first controls of first displayed interactive pages of the payload of the content object simultaneously as the teacher device, but independent of the teacher device that is separately and simultaneously performing second reviews and second controls of second displayed interactive pages of the payload of the content object, and
wherein the first reviews, the first controls and the first displayed interactive pages of the payload of the content object are different from the second reviews, the second controls and the second displayed interactive pages of the payload of the content object.

\* \* \* \* \*